(12) United States Patent
De Swarte et al.

(10) Patent No.: US 10,275,130 B2
(45) Date of Patent: Apr. 30, 2019

(54) FACILITATING TRANSITIONING BETWEEN VIEWING NATIVE 2D AND RECONSTRUCTED 3D MEDICAL IMAGES

(71) Applicant: General Electric Company, Schenectady, NY (US)

(72) Inventors: Nicolas De Swarte, Buc (FR); Corine Ingold Foko, Buc (FR); Nizar Odeh, Budapest (HU); Antoine Aliotti, Buc (FR); Patrice Hervo, Buc (FR); Jean Labarre, Buc (FR)

(73) Assignee: General Electric Company, Schenectady, NY (US)

( * ) Notice: Subject to any disclaimer, the term of this patent is extended or adjusted under 35 U.S.C. 154(b) by 144 days.

(21) Appl. No.: 15/593,994

(22) Filed: May 12, 2017

(65) Prior Publication Data

US 2018/0329609 A1 Nov. 15, 2018

(51) Int. Cl.
| | |
|---|---|
| *G06F 3/0484* | (2013.01) |
| *G06T 17/10* | (2006.01) |
| *G06T 11/20* | (2006.01) |
| *G06F 17/30* | (2006.01) |
| *G06T 19/00* | (2011.01) |

(52) U.S. Cl.
CPC .......... *G06F 3/04842* (2013.01); *G06F 17/30* (2013.01); *G06T 11/206* (2013.01); *G06T 17/10* (2013.01); *G06T 19/00* (2013.01); *G06T 2200/24* (2013.01); *G06T 2210/41* (2013.01)

(58) Field of Classification Search
CPC ... G06F 3/04842; G06T 11/206; G06T 17/10; G06T 2200/24; G06T 2210/41
See application file for complete search history.

(56) References Cited

U.S. PATENT DOCUMENTS 5,954,650 A * 9/1999 Saito ................. G06T 11/00
   382/128
7,489,810 B2 2/2009 Owen
(Continued)

OTHER PUBLICATIONS

OsiriX, http://www.osirix-viewer.com/, Last accessed Mar. 7, 2017, 8 Pages.
(Continued)

*Primary Examiner* — Manuchehr Rahmjoo
(74) *Attorney, Agent, or Firm* — Amin, Turocy & Watson, LLP

(57) ABSTRACT

Medical imaging systems are provided that facilitate transitioning between viewing native and reconstructed medical images in the same viewport. In one embodiment, a method comprises retrieving indexed image metadata describing native medical images associated with a medical imaging data set selected for viewing. The method further comprises grouping the native medical images into one or more sets of related images, and for each set of the one or more sets of related images, sorting the related images into one or more subsets of 3D compatible images that can respectively be used to generate one or more 3D representations. The method further comprises generating a data model identifying the one or more sets of related images and the one or more subsets of 3D compatible images, and employing the data model to facilitate transitioning between rendering the native medical images and the one or more 3D representations in the same viewport.

21 Claims, 37 Drawing Sheets

(56) References Cited

U.S. PATENT DOCUMENTS

| | | |
|---|---|---|
| 8,078,000 B2 | 12/2011 | Bohm et al. |
| 2009/0008076 A1 | 3/2009 | Bernard et al. |
| 2015/0269785 A1* | 9/2015 | Bell .................... G06T 19/003 345/427 |

OTHER PUBLICATIONS

"Centricity Universal Viewer," GE Healthcare, http://www3.gehealthcare.com/en/products/categories/healthcare_it/medical_imaging_informatics_-_ris-pacs-cvis/universal_viewer, Last accessed Mar. 7, 2017, 1 Page.

"Advanced Visualization Powered by AW," GE Healthcare, http://www3.gehealthcare.com/en/products/categories/advanced_visualization, Last accessed Mar. 7, 2017, 1 page.

"Universal Viewer Zero Footprint Client," GE Healthcare, 2013, 6 Pages.

International Search Report and Written Opinion for Corresponding PCT application No. PCT/US2017/038923 dated Oct. 30, 2017; 11 pages.

\* cited by examiner

LOCAL DEVICE DEPLOYMENT

FACILITATING TRANSITIONING BETWEEN VIEWING NATIVE 2D AND RECONSTRUCTED 3D MEDICAL IMAGES

TECHNICAL FIELD

This application generally relates to medical imaging and more particularly to medical imaging visualization systems that facilitate transitioning between viewing native two-dimensional (2D) and reconstructed three-dimensional (3D) medical images.

BACKGROUND

The standard of care has changed during the last decade as radiologists have adopted reconstructed 3D medical image reading in their routine practice. These reconstructed medical images facilitate evaluating and describing complex anatomy, injuries and pathologies. However, native 2D medical images that have been captured from medical imaging devices remain essential as their interpretation tends to be faster. They are also the primary data that clinicians will review with the guarantee that what they're viewing is coming directly from acquisition systems, avoiding partial volumes or inaccurate reconstruction artifacts.

There are many medical viewer applications that exist on the market which allow visualization of native 2D medical images. Similarly, there are several applications which allow reconstruction of these images to create 3D representations. The issue that exists today is in the convergence of capabilities between these two separated applications.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

SUMMARY

Figure 1:
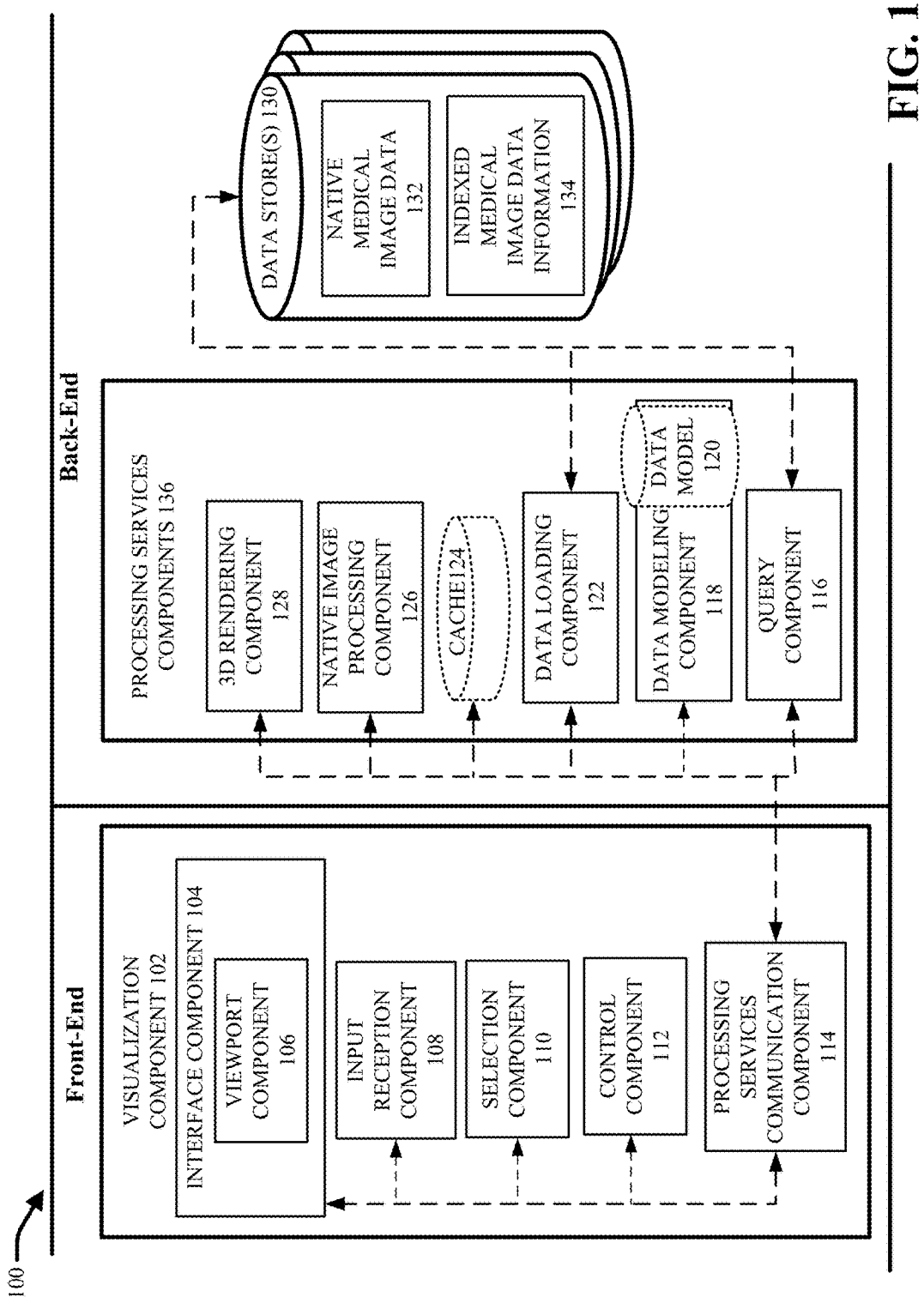
FIG. 1 illustrates an example native/reconstructed medical imaging system facilitates transitioning between viewing native and reconstructed medical images in accordance with various aspects and embodiments described herein.

The following presents a summary to provide a basic understanding of one or more embodiments of the invention.

This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate transitioning between viewing native and reconstructed medical images in the same viewport.

In one embodiment a system is provided that comprises a memory that stores computer executable components and a processor that executes computer executable components stored in the memory. The computer executable components can comprise a query component configured to retrieve indexed image data information describing native medical images associated with a medical imaging data set selected for viewing in a GUI in association with a medical imaging viewing session. The components can further comprise a data modeling component configured process the indexed image data information to group the native medical images into one or more sets of related images, and for each set of the one or more sets of related images, sort the related images into one or more subsets of 3D compatible images that can respectively be used to generate one or more 3D representations. The data modeling component can further generate a data model comprising first information identifying the one or more sets of related images and second information identifying the one or more subsets of 3D compatible images. The computer executable components can further comprise a visualization component configured to employ the data model to facilitate transitioning between rendering, in the GUI, the native medical images and the one or more 3D representations.

In another embodiment, a method is provided that comprises retrieving, by a system comprising a processor, indexed image data information describing native medical images associated with a medical imaging data set selected for viewing in a GUI in association with a medical imaging viewing session. The method further comprises generating, by the system, a data model based on the indexed metadata by grouping the native medical images into one or more sets of related images, and for each set of the one or more sets of related images, sorting the related images into one or more subsets of 3D compatible images that can respectively be used to generate one or more 3D representations. The system further incorporates first information in the data model identifying the one or more sets of related images and second information in the data model identifying the one or more subsets of 3D compatible images. The method further comprises employing, by the system, the data model to facilitate transitioning between rendering, in the GUI, the native medical images and the one or more 3D representations.

In another embodiment a machine-readable storage medium, comprising executable instructions that, when executed by a processor, facilitate performance of operations. These operations can comprise receiving, in response selection of a medical imaging study for viewing, a data model comprising first information identifying a medical image series associated with the medical imaging study, and generating a GUI with a viewport displaying a native medical image associated with the medical image series, wherein the native medical image depicts a body part. The operations further comprise receiving an updated version of the data model comprising second information identifying a subset of native medical images in the series that can be used to generate one or more 3D models of the body part, and activating one or more 3D rendering functions of the GUI based on the receiving the updated version of the data model, wherein the one or more 3D rendering functions provide for transitioning between rendering the native medical image and the one or more 3D models in the viewport. In various implementations, the one or more 3D rendering functions comprise a thickness modification function that provides for increasing a thickness of the native medical image. According to these implementations, the operations can further comprise, based on reception of input indicating an increase to the thickness replacing the native medical image with a 3D model of the one or more 3D models that corresponds to a volume of the body part defined by the thickness. Furthermore, in various embodiments, the executable instructions can comprise an extensible coding format that provides for seamlessly adding additional operations associated with rendering native and three-dimensional images of various modalities within with the same graphical user interface.

Other embodiments and various non-limiting examples, scenarios and implementations are described in more detail below. The following description and the drawings set forth certain illustrative embodiments of the specification. These embodiments are indicative, however, of but a few of the various ways in which the principles of the specification can be employed. Other advantages and novel features of the embodiments described will become apparent from the following detailed description of the specification when considered in conjunction with the drawings.

DETAILED DESCRIPTION

By way of introduction, the subject disclosure is directed to systems, methods, apparatuses and computer readable media that provide a medical imaging visualization application that provides for seamlessly transitioning between viewing native and reconstructed medical images in the same display area or viewport of a GUI. In accordance with various embodiments, the medical imaging visualization application behaves by default as a native image viewer. In this regard, the visualization application can be configured to load native medical images associated with various types of imaging studies of any modality (e.g., x-ray, a computerized tomography (CT), mammography (MG), magnetic resonance imaging (MRI), etc.) and immediately display the native medical images in the GUI as they come out of the acquisition system. For example, in one or more embodiments, after a particular data set is selected for viewing (e.g., a particular imaging study or group of imaging studies for a particular patient), the visualization application can be configured to initially render one or more native medical images for the data set in one or more viewports of the GUI. To do so, the visualization application relies on a data model describing the content of the native input medical images for the data set. In one or more implementations, the visualization application can be configured to generate (e.g., as a back-end operation) this data model from information indexed in a query-able database, which is what allows the initial display to be fast, reliable and robust. Another essential characteristic of this data model is that it is compatible with 3D rendering, meaning that it sorts the native medical images present in the studies into coherent image sets with an associated volumetric geometry, allowing the set to be later rendered as a 3D reconstruction or 3D volume. In some implementations, the data model 120 can be a JSON data model allowing for web-based rendering of native and reconstructed medial images.

Along with the query to support the initial native image display, the visualization application also triggers background retrieve tasks that will fetch the relevant pixel data for the images in the coherent sets from an external data store and load the pixel data into memory (e.g., a cache of the back-end servers) accessible to native and 3D rendering services employed by the visualization application. As a result, the native images can be immediately rendered and 3D reconstructions associated with the displayed native medical images can be efficiently generated and displayed on the fly. For example, in association with the initial rendering of one or more native medical images in the GUI at the initiation of a medical imaging viewing session, various back-end operations can be initiated that involve identifying subsets of native medical images compatible with 3D rendering, determining the geometric volumes for 3D reconstructions that can be generated with the 3D compatible images, and retrieving the pixel data to generate the 3D reconstructions.

As the background tasks are completed and the system is ready to generate and provide 3D reconstructions associated with the displayed native images, the visualization application can allow the user to transition between viewing a native medical image to a 3D reconstruction associated with the native medical image. For example, the visualization application can notify the user that 3D reconstructions associated with one or more of the displayed native medical images are available for viewing. The visualization application can further provide various control functions via the GUI that allow the user to transition between viewing the native medical images and the 3D reconstructions. For example, in various implementations, the control functions can include a thickness modification function that allows the user to increase the thickness of a displayed native medical image. Based on receiving input increasing the thickness, the visualization application can direct a (back-end) 3D rendering component to generate and/or provide a 3D reconstruction associated with the displayed native medical image that has a volume corresponding to the amount increase to the thickness. The visualization application can further render the 3D reconstruction in the GUI.

In some embodiments the GUI can be context-sensitive and reactive. In this regard, the controls functions included in the GUI can get richer as volumes become available in the back-end. For instance, in some implementations, the thickness modification control function can only appear or become activated if a selected native medical image set can be viewed in 3D and/or when it is actually available to be rendered in 3D. In one embodiment, for a first time user, the subject visualization application can run in a tutorial mode, wherein the GUI will explicitly point out to the user the new GUI controls as they become available.

As used herein, a native medical image refers to an image captured by a medical imaging capture device or medical imaging acquisition device. For example, the medical imaging capture device can include but is not limited to: a conventional X-ray device, a digital radiography (DX) X-ray device, a X-ray angiography (XA) device, a panoramic X-ray (PX) device, computerized tomography (CT) device, a mammography (MG) device (including a tomosynthesis device), a magnetic resonance imaging (MRI) device, an ultrasound (US) imaging device, a color flow doppler (CD) device, a position emission tomography (PET) device, a single-photon emissions computed tomography (SPECT) device, a nuclear medicine (NM) imaging device, and the like. Most of these medical imaging devices are configured to capture 2D native medical images. Thus in most implementations, the native medical images will be 2D. However, in some implementations, one or more of the above noted medical imaging devices or future medical imaging device may be capable of generating native 3D medical images. Thus in some implementations, the native medical images can include 3D images.

As used herein, a reconstructed medical image refers to a computer generated medical image generated based on one or more native medical images. A reconstructed medical image generally refers to a 3D model generated based on several combined native medical images. For example, a 3D reconstructed medical image can include one or more meshes of triangles, quads, point clouds, and/or n-gons. A 3D reconstructed medical image can also include curved surfaces such as non-uniform rational basis splines (NURBS), which are a function of two parameters mapped to a common surface area in three-dimensional space. In some aspects, a 3D reconstructed medical image can have associated color, texture or material properties. The terms 3D image, 3D model, 3D reconstruction, 3D visualization, and 3D rendering are used herein interchangeably. In some implementations, a reconstructed medical image can also include a reconstructed 2D image generated based on one or more native medical images. For example, in various implementations, a user may want to view a 2D medical image depicting an area or region of a body part that is not provided by an original native medical image capture. For instance, a user may want to view an area or portion of a body part from a perspective or orientation that is not provided by an original native medial image capture. In this regard, a reconstructed 2D medical image can be generated from the desired perspective/orientation based on image data (e.g., pixels) included in two or more native medical images captured from one or more different perspectives/orientations relative to the desired orientation. In another example, a user may want to view a 2D version of a native medical image that includes visual enhancements or modifications. According to this example, a native 2D medical image that is somehow visually modified can be considered a reconstructed medical image.

For example, in various implementations, a reconstructed medical image can include a single volume visualization generated as a multiplanar reconstruction (MPR), a curved MPR, a maximum intensity projection (max-IP), a minimum intensity projection (min-IP), an average intensity projection (avg-IP), a volumetric rendering (VR), or a surface shaded display (SSD). MPR uses the 3D data to show other planes that were not acquired directly during the acquisition, such as sagittal and coronal cross-sections reconstructed from the axial images. Since the entire volume data is available, it is possible to achieve any required plane and it is even possible to obtain a curved plane, parallel to any anatomical structure. Curved MPR can also be used for the analysis of vessels where the plane of the cut is parallel to the vessel, thus showing the anatomical details of the vessel. When cutting perpendicular to the vessel, the real dimensions of the vessel can be measured. Max-IP is a reconstruction whereby in the view angle selected, the maximal intensity value along the line perpendicular to the view represents this line of pixels in a 2D presentation of the reconstructed body. Variations of max-IP include min-IP and avg-IP, wherein the minimal or average value along the view line is representing the line. These types of reconstruction can be used to demonstrate organs filled with air in CT examinations, such as airways and sinuses. VR reconstructions take the entire volume of data, calculate the contributions of each voxel (volume pixel) along a line from the viewer's eye through the data set, and displays the resulting composite for each pixel of the display. SSD is a process by which the apparent surfaces are determined within the volume of data and the resulting surface is displayed. Surface contours are usually modeled as a number of overlapping polygons derived from the boundary of the selected region of interest. A virtual light source is computed for each polygon and the object is displayed with the resulting surface shading. In various embodiments, a version of MPR referred to herein as thick slab MPR can be used to generate 3D reconstructions in response to increasing or decreasing the thickness of a displayed visualization. With thick slab MPR, multiple thin MPR views are combined with a predefined rendering algorithm (e.g., MIP, MinIP, AvgIP, VR, color enhanced VR, etc.).

A reconstructed medical image can also include a multi-volume visualization, wherein two or more volumes are displayed in the same 3D visualization. For example, a multi-volume visualization can include an MPR slice with an integrated or overlaid 3D volume or mask generated from the same series. In some implementations, a 3D reconstructed medical image can include two or more volumes generated from images captured with different imaging modalities. In these implementations, the different image modalities can provide different visual features of the visualization (e.g., color, texture, depth, etc.). For example, 3D visualization can include a 3D volume generated from PET images with 3D features integrated therein or thereon generated from CT image data. In another example, a 3D medical image visualization can include native 2D image (e.g., an X-ray image), with a volumetric overly depicting some additional anatomical features generated from other image data of a different modality (e.g. CT). In some implementations, a 3D reconstructed medial image can include endoscopic views. For example, an endoscopic view can include a VR of the inside of a vessel or similar anatomic structure based on centerline tracking. An endoscopic view can also include a dissection view of a vessel or similar anatomic structure rendered as a flat, unfolded view based on centerline tracking. Reconstructed medical images can also include visualizations providing a straightened curved reformation along a trace, stereotactic surface projection, triangular meshes, cinematic rendering, visualization of DTI fibers, and the like. In some embodiments, a reconstructed medical image can also include a four-dimensional (4D) flow visualization, providing a vector graph, velocity MIP, streamlines, time-resolved pathlines, and the like. For example, in some implementations, a 3D reconstructed medical image can be viewed in association with a time series, thus providing a 4D viewing experience. In this regard, the times series can include all type of multi-phase acquisition (perfusion but also diffusion, DTI, etc.).

In various embodiments, the particular types of native and reconstructed medical images capable of being used with the subject medical imaging systems, methods and computer-readable media can vary so long they complies with the digital imaging and communications in medicine (DICOM) standard. DICOM is the worldwide standard for handling, storing, printing, and transmitting information in medical imaging. It includes a file format definition and a network communications protocol. DICOM is used worldwide to store, exchange, and transmit medical images. For example, DICOM incorporates standards for the various imaging modalities such as radiography, ultrasonography, computed tomography, magnetic resonance, mammograph, and the like. DICOM includes protocols for image exchange (e.g., via portable media such as DVDs), image compression, 3D visualization, image presentation, and results reporting.

As used in this disclosure, the term "user," and the like refers to a person, entity, system, or combination thereof that interfaces with subject native/reconstructed medical imaging systems using a suitable computing device. In addition, the term "patient" is used throughout the subject disclosure to refer to a person from which native medical image are captured. However, it should be appreciated that the patient can include a human, an animal, or another being from which native medical images can be capture.

The above-outlined embodiments are now described in more detail with reference to the drawings, wherein like reference numerals are used to refer to like elements throughout. In the following description, for purposes of explanation, numerous specific details are set forth in order to provide a thorough understanding of the embodiments. It may be evident, however, that the embodiments can be practiced without these specific details. In other instances, well-known structures and devices are shown in block diagram form in order to facilitate describing the embodiments.

Referring now to the drawings, FIG. 1 illustrates an example native/reconstructed medical imaging system 100 facilitates transitioning between viewing native and reconstructed medical images in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 and/or the components of the system 100 can be employed to use hardware and/or software to solve problems that are highly technical in nature, that are not abstract, and that cannot be performed as a set of mental acts by a human, e.g., analyzing and retrieving relevalnt DICOM data from remote various sources, indexing and processing the DICOM data in a manner that makes it compatible with 3D rendering, generating and rendering reconstructed medical images based on user interaction with displayed native medical images, transitioning between rendering native medical images and reconstructed medial images in the same viewport, and the like. Further, some of the processes performed can be performed by specialized computers for carrying out defined tasks related to native and reconstructed medial image rendering by a single application. System 100 can provide a variety of technical improvements to native medical and reconstructed medical imaging applications. For instance, system 100 can provide seamless workflows associated with viewing both native and reconstructed medical images in the same viewport without having to synchronize two separate applications. For example, by providing a single application that is compatible with both native and reconstructed image rendering, in the front-end conversions between data models is not necessary. Further at the viewport level, an additional synchronization application program interface (API) layer needed to propagate changes events between the two applications can be eliminated. This elimination of synchronization between two separate applications provides a significant advantage because such synchronization is bug-prone, as it is often difficult to avoid event buffering issues. Further, such an API also makes it challenging to implement the subject native to reconstructed medical imaging transitioning control functions, such as aforementioned thickening slider. Additionally, complex window management hacks are required if the two applications are not based on the same GUI technical stack (ie non web-based applications). Further, in the employing a single application to view native and reconstructed medial images, a single set of images can be loaded for usage by the native and 3D rendering processes of the application, as opposed to loading of separate data sets for use by separate applications. As a result, as significant improvement in efficient usage of network bandwidth and resources can be achieved.

System 100 and/or components of system 100 or other systems described herein can be employed to solve new problems that arise through advancements in technology, computer networks, the Internet, and the like in association with medical imaging visualization applications. For example, the design for both the front-end and the back-end code of the subject application is extensible. In this regard, the various components of system 100 can provide computer executable instructions in an extensible coding format that provides for seamlessly adding additional operations associated with rendering native and 3D images of various modalities within with the same graphical user interface. Accordingly, the subject native/reconstructed medical imaging application can facilitate implementation of new clinical applications that will benefit from the design ability to switch seamlessly from native medical images to reconstructed medial images of various modalities, including the various native and reconstructed medical imaging modalities described herein, as well as newly developed native and reconstructed medical imaging modalities.

The native/reconstructed medical imaging system 100 can be configured to provide various services associated with accessing, viewing and interacting with native medical images and 3D reconstructed versions of the native medical images. In various implementations, these services are embodied in a native/reconstructed medical imaging software application, such as a web-application, a cloud-application, a thin client application, a thick client application, a native client application, a hybrid client application, or the like. For example, in the embodiment shown, the native/reconstructed medical imaging system 100 includes various front-end and back-end components. In this regard, the front-end components can include those associated with the presentation layer of the native/reconstructed medical imaging application and the back-end components include those associated with the data access layer of the native/reconstructed medical imaging application. For example, the font-end components can include a visualization component 102 that provides for generating a GUI that provides for viewing and interacting with various types of native medical images (e.g., DICOM images) as well as transitioning between viewing the native medical images and reconstructed 3D representations of the native medical images. The back-end processing components can include various processing services components 136 that enable the features and functionalities of the GUI.

The back-end components also include one or more data stores 130 that include native medical image data 132. For example, the one or more data stores 130 can store native medical image data 132 for a plurality of patients and healthcare organizations. This native medical image data 132 can include native medical images captured via a variety of medical imaging devices, including but not limited to: a conventional X-ray device, a digital radiography (DX) X-ray device, a X-ray angiography (XA) device, a panoramic X-ray (PX) device, computerized tomography (CT) device, a mammography (MG) device (including a tomosynthesis device), a magnetic resonance imaging (MRI) device, an ultrasound (US) imaging device, a color flow doppler (CD) device, a position emission tomography (PET) device, a single-photon emissions computed tomography (SPECT) device, a nuclear medicine (NM) imaging device, and the like In various embodiments, the native medical image data 132 is stored according to the DICOM standard or data model. In this regard, the respective native medical images can be stored according to the DICOM file format. For example, DICOM files contain a file header portion, a File Meta Information portion, and a single service-object pair (SOP) instance. The header is made up of a 128 byte preamble, followed by the characters DICM, all uppercase. Following the header is the File Meta Information. This portion follows a tagged file format, and contains information or metadata about the file, such as the patient it belongs to (e.g., patient name, patient identification number, patient birth date, etc.), the study it belongs to (e.g., study universal identifier (UID), study date, referring physician, accession number, etc.), the series and study it belongs to (e.g., series UID, series number, modality type, etc.), and the like. This metadata allows the DICOM filed to be queried and indexed.

For example, in the DICOM model, a patient can have one or more studies, (sometimes referred to as exams or procedures). Each study can consist of one or more series. A series generally equates to a specific type or modality of data, or the position of a patient on the acquisition device. Each series can contain one or more DICOM object instances which are most commonly native medical images, but can also include reports, waveform objects, and the like. All of this information is contained in each DICOM object of a study. Therefore, if a study is performed on a patient, containing two series, each with ten instances, all of the instances will be associated with metadata identifying the patient it belongs to, the study it belong to, the series it belongs to, and variety of other potential information about the images or instance.

In various embodiments, in addition to information (e.g., metadata) identifying the patient, study, and/or series associated with a native medical image, the native medical images included in the native medical image data 132 can also be associated with information describing characteristics or attributes of the images, including but not limited to: acquisitions attributes, position attributes, image number, image type, bits allocated, bits, stores, high bit, number of pixel rows and columns, samples per pixel, planar configuration, pixel representation, photometric interpretations, pixel data, window width, window center, pixel width, pixel height, pixel orientation, image resolution, and the like. The metadata can also include information regarding the specific capture view or portion of the body part included in the native medical image. For example, in some implementations, information regarding the capture view or portion of the body part can include an image number (e.g., if the image is associated with a sequence or series of images of the body part), a defined orientation of the image relative to the body of the patient (e.g., axial, coronal, sagittal, right, left, etc.), the capture axis, and the like. In addition, the native images can be associated with metadata that defines its 3D coordinate plane position relative to a 3D coordinate space and/or the body of the patient. For example, the body part depicted in a native image can be associated with a 3D coordinate space and each native image could be associated with information defining the position of the plane represented by the native image relative to the coordinate space, and the orientation or angle of the plane relative to the coordinate space. The metadata associated with a native image can also include information regarding the medical imaging acquisition equipment (e.g., manufacturer, institution name), the body part included in the native medical image, whether the image includes contrast injection and the like.

In some embodiments, the one or more data stores 130 can also include indexed medical image data information 134. The indexed medical image data information 134 can include indexed information that identifies, organizes and relates the various characteristics and attributes of the native medical image data 132 described above. For example, the indexed medical image data information 134 can include a table or other suitable data structure that organizes the respective native medical images included in the one or more data stores 130 based on their associated metadata. For example, the indexed medical data information can include information that identifies instances of native medical images included in the one or more data stores 130 and their respective locations. For each identified native medical image, the indexed medical data information 144 can also include indexed metadata, including but not limited to: information that identifies the patient from which the native medical image was captured, the body part included in the native medical image, the medical imaging study involving the image, the series associated with the image, the capture date/time, the medical imaging capture device that captured the native medical image or the type of medical image, whether the image includes contrast injection, the specific capture view or portion of the body part included in the native medical image (e.g., an image number relative to a series or sequence of images, a capture orientation of the image relative to the body of the patient, the capture axis, its 3D coordinate plane position relative to a 3D coordinate space and/or the body of the patient, etc.), pixel features (e.g., number of rows of pixels, number of columns of pixels, pixel width, pixel height, pixel representation, pixel orientation, image resolution, etc), and the like. In various embodiments, the indexed medical image data information 134 can be organized and indexed according to the DICOM model and tag hierarchy.

The deployment architecture of the subject native/reconstructed medical imaging system 100 can vary. However, it should be appreciated that although not shown, the native/reconstructed medical imaging system 100 can be communicatively coupled to at least one memory that stores the computer executable components (e.g., the visualization component 102, the processing services components 136 and the one or more data stores 130). Further the native/reconstructed medical imaging system 100 can be communicatively coupled to at least one processor that executes the computer executable components. In various embodiments, the native/reconstructed medical imaging system 100 can be deployed in a cloud architecture, a virtualized enterprise architecture, or an enterprise architecture wherein one the front-end components and the back-end components are distributed in a client/server relationship. With these embodiments, the features and functionalities of the native/reconstructed medical imaging system 100 can be deployed a web-application, a cloud-application, a thin client application, a thick client application, a native client application, a hybrid client application, or the like, wherein one or more of the front-end components are provided at a client device (e.g., a mobile device, a laptop computer, a desktop computer, etc.) and one or more of the back-end components are provided in the cloud, on a virtualized server, a virtualized data store, a remote server, a remote data store, a local data center, etc., and accessed via a network (e.g., the Internet). For example, in one or more exemplary embodiments, the front-end and back end-components of the native/reconstructed medical imaging system 100 can be deployed as a web-application that can be accessed by a client device using a suitable browser. In this regard, the visualization component 102 can provided for web-based renderings of native and reconstructed medical images. However it should be appreciated however that the native/reconstructed medical imaging system 100 is not limited to this architectural configuration. For example, in another embodiment, the native/reconstructed medical imaging system 100 can be deployed on a single local device (e.g., a desktop computer), as a local web-based application. Various example deployment architectures for the subject native/reconstructed medical imaging system 100 are described infra with reference to FIGS. 16-21.

While the various components of native/reconstructed medical imaging system 100 are illustrated as separate components, it is noted that the various components can be comprised of one or more other components. Further, it is noted that the embodiments can comprise additional components not shown for sake of brevity. Additionally, various aspects described herein may be performed by one device or two or more devices in communication with each other. For example, one or more components and/or data stores of the subject native/reconstructed medical imaging system 100 can be located on separate (real or virtual) machines and accessed via a network (e.g., the Internet).

In accordance with one or more embodiments, the native/reconstructed medical imaging system 100 can include visualization component 102, processing services components 136 and one or more data stores 130. These front-end and back-end components can collectively form (and/or be employed by) a native/reconstructed medical imaging application that provides for viewing and interacting with native and reconstructed medical images. Unlike conventional medical imaging visualization applications which provide for only viewing native medical images or reconstructed medical images, the subject native/reconstructed medical imaging application can provide for viewing both native and reconstructed medical images in the same display area (e.g., viewport) and seamlessly transitioning between viewing the native and reconstructed medical images in the same display area.

In particular, the subject native/reconstructed medical imaging application can allows a user to access and review relevant native medical images included in the one or more data stores 130 (e.g., as native medical image data 132), thereby providing the features and functionalities of a native image viewer application. In addition, unlike traditional native viewer imaging applications, the subject native/reconstructed medical imaging application can also provide for viewing 3D representations of the native medical images in the same display area or viewport. To do so, the visualization component 102 relies on a data model (e.g., data model 120) describing the content of the native medical images included in a patient imaging study or set of medical image data selected for viewing. The data model is also compatible with 3D rendering. In this regard, the data model can include information that sorts the native medical images in the selected data set into coherent image subsets with an associated volumetric geometry, thereby allowing the subset to be later rendered as a 3D model. In one or more implementations, this data model can be generated by the data modeling component 118 of the one or more processing services components 136 based on the indexed medical image data information 134 and/or the metadata associated with the native medical image data 132 included in the one or more data stores 130. A detailed description of the data model 120 and the mechanisms employed by the data modeling component 118 to generate the data model 120 are described infra with reference to FIGS. 2, 4 and 5.

In one or more embodiments, the visualization component 102 can include various front-end presentation layer components, including but not limited to: interface component 104, input reception component 108, selection component 110, control component 112 and processing services communication component 114.

The interface component 104 can be configured to define and/or generate a GUI that provides for viewing and interacting with native and reconstructed medical images. The GUI can be presented or displayed via a display of a suitable client device. In various implementations, the interface component 104 can include viewport component 106 and viewport component 106. The viewport component 106 can be configured to generate one or more viewports in the GUI and display (e.g., using JavaScript/HTML5) appropriate representations of the data model (e.g., data model 120) based on user input received via the input reception component 108. In various implementations, a medical imaging data set selected for viewing (e.g., such as a data set associate with a particular patient or study) can include different sets or groups of related images, such as different sets or groups of related images associated with different DICOM series. In accordance with these implementations, the viewport component 106 can be configured to render each of the different groups or sets of related images in different viewports.

The viewport component 106 can be configured to adapt the GUI over the course of a viewing session based on updates to the data model 120 and in response to user interaction with the GUI. In one or more embodiments, the viewport component 106 can be configured to manage the synchronization of multiple viewport instances showing either native medical images or 3D views associated with the native medical images by propagating changes to the data model 120.

The input reception component 108 can be configured to receive and interpret user input associated with interaction with the GUI that is generated and rendered by the interface component 104. In particular, the input reception component 108 can receive and interpret commands selecting control icons and using the functionality of the respective control icons to interact with the native and reconstructed medical images displayed in the GUI. For example, in various implementations, the input reception component 108 can receive user input relative to a native medical image displayed in a viewport of the GUI that can cause the interface component 104 to replace the native medical image with a reconstructed medical image associated with the native medical image. In another example, in an implementation in which the GUI includes two or more viewports displaying native or reconstructed medical images, the input reception component 108 can receive input associated with interaction with the two or more viewports simultaneously. In some embodiments in which two or more viewports respectively display different native or reconstructed medical images, the input reception component 108 can receive user input associated with interaction with a visualization included in one of the viewports and automatically apply the input to change or modify the visualizations included in the other viewports. For instance, the input reception component 108 can receive user input that involves applying an annotation or mark on a native or reconstructed medical image in one viewport and automatically apply the annotation or mark to the visualizations in the other viewports.

The selection component 110 can be configured to determine and/or select the appropriate native medical image or 3D representation for displaying in the GUI based on received user input by addressing the data model 120 and either the native image processing services (e.g., the native image processing component 126) or 3D rendering services (e.g., the 3D rendering component 128). In particular, based on received user input selecting or indicating a medical image data set for viewing, the selection component 110 can employ the data model 120 to determine what native medical images to display in the GUI and how to display them (e.g., in a single viewport, in two or more different viewports, etc.). The selection component 110 can further call or otherwise direct the native image processing component 126 to process and return the appropriate native 2D images for displaying in the GUI. In addition, based on received input indicating a desire to transition from viewing a native 2D image to viewing a 3D representation associated with the image, the selection component 110 can employ the data model 120 to identify or determine the 3D compatible information associated with the image. For example, this 3D compatible information included in the data model can identify a subset of native medical images that make up a volume associated with the image and/or the geometric parameters for volume. The selection component 110 can further call on or otherwise direct the 3D rendering component 128 to generate and return the appropriate 3D representation for displaying in the GUI based on the 3D compatible information for the image in the data model.

The control component 112 can provide a variety of front-end (e.g., web-based) control functions allowing users to interact with the displayed views and to switch seamlessly between native and 3D reconstructions. These control functions can be provided by one or more control icons or widgets in the GUI. For example, the control icons can include one or more icons that allow users to provide input selecting native medical images and/or reconstructed medical images for viewing. The control icons can also include one or more icons that allow users to provide input that controls transitioning between viewing a native medical image to viewing a reconstructed medical image, and vice versa. For example, in various implementations, the control functions can include a thickness modification function that allows the user to increase the thickness of a displayed native medical image. Based on receiving input increasing the thickness, the selection component 110 can direct the 3D rendering component 128 to generate, based on the 3D compatible information in the data model, a 3D reconstruction associated with the displayed native medical image that has a volume corresponding to the amount increase to the thickness (e.g., a thick slab MPR visualization). The interface component 104 can further render the 3D reconstruction in the GUI. In some implementations, the thickness control function can provide for seamlessly switching between a native medical image to different types of 3D renderings of the native medical image, including but not limited to: a minimum intensity projection (min-IP), a maximum intensity projection (max-IP), and average intensity projections (avg-IP) and a volume rendering (VR). The control functions can also allow a user to right-click menu items and/or reference lines to create reformatted views from a native slice and control their orientation.

In some embodiments the GUI can be context-sensitive and reactive. In this regard, viewport component 106 can be configured to adapt the GUI be modifying, activating, and/or adding controls functions as 3D compatible features become available in the back-end. For instance, in some implementations, the thickness modification control function can only appear or become activated if a selected native medical image set can be viewed in 3D and/or when it is actually available to be rendered in 3D.

The processing services communication component 114 can connect the front-end visualization components (e.g., the interface component 104, the input reception component 108, the selection component 110 and the control component 112) to the various back-end processing services components 136. In the embodiment shown, these processing services components 136 can include but are not limited to: query component 116, data modeling component 118, data loading component 122, native image processing component 126 and 3D rendering component 128.

In one or more embodiments, the query component 116 can be configured to issue one or more queries to the one or more data stores 130 to retrieve information needed by the data modeling component 118 to generate the data model 120. For example, based on reception of input indicating or selecting an image data set for viewing in association with initiation of a new medical imaging viewing session, the query component 116 can be configured to query (e.g., via a plug-in design) the one or more data stores 130 to retrieve indexed information (e.g., indexed medical image data information 134) describing the native medical images associated with the medical imaging data set selected for viewing. As described in greater detail with reference to FIGS. 2, 4 and 5, the data modeling component 118 can further process the indexed information to generate the data model 120 that facilitates rendering of the native images as well generating and rendering 3D reconstructions associated with the native images (e.g., when the data set is 3D compatible). The resulting data model 120 can include information that identifies and groups sets related native medical images (e.g., wherein each set corresponds to a DICOM series), identifies and groups subsets of 3D compatible native images that can be used to generated a 3D representation, and further defines geometric volumes for the 3D compatible native images. The data modeling component 118 can further provide the data model 120 to the selection component 110 or otherwise make the data model accessible to the selection component 110 (e.g., via the processing services communication component 114). The selection component 110 can then employ the data model 120 to facilitate rendering and transitioning between rendering the native medical images and the one or more 3D representations.

For example, in one or more embodiments, the selection component 110 can be configured to interpret the user input in association with application of the one or more control functions to select or determine a new visualization for rendering in the primary display area that accounts for the change/adaptation imparted by the user input. In particular, based on the user input and/or the currently displayed visualization (e.g., either a native medical image or a reconstructed medical image), the selection component 110 can determine whether the input prompts a transition to a new native medical image or a new reconstructed medical image. For example, based on the control function applied by the user and whether the currently displayed visualization is a native medical image or a 3D reconstructed image, the selection component 110 can determine if the user input indicates a transition from a native image to another native image, from a native image to a reconstructed image, from a reconstructed image to native image, or from a reconstructed image to another reconstructed image.

In one implementation, if the user input indicates the new visualization should be a native medical image, based on the currently displayed visualization (e.g., either a native medical image or a reconstructed medical image) and the information included in the data model 120 describing the content of the available native medical images in the data set and relating coherent subsets of the native images to 3D volumes, the selection component 110 can select and retrieve the appropriate native medical image from the cache 124 for rendering in the GUI. In some implementations, selection component 110 can also call on the native image processing component 126 to perform 2D image processing of the native medical image (e.g., handling of compression, resolution, modality LUTs, etc.) prior to providing the native medical image to the interface component 104 for displaying in the GUI.

In another implementation, if the user input indicates the new visualization should be a reconstructed medical image, the selection component 110 can direct the 3D rendering component 128 to generate the reconstructed medical image (e.g., a 3D model or representation) on the fly based on the 3D compatible information included in the data model 120. For example, based on the currently displayed visualization (e.g., either a native medical image or a reconstructed medical image) and the information included in the data model 120 describing the content of the available native medical images in the data set and relating coherent subsets of the native images to 3D volumes, the selection component 110 can determine visual and spatial parameters for the new 3D reconstruction. For example, the selection component 110 can determine the subset of coherent 3D compatible native images to form the new 3D reconstruction and the corresponding volume to be represented by the 3D reconstruction. In some implementations, depending on orientation of the currently displayed visualization and whether the user input indicated a change to this orientation, the selection component 110 can also determine parameters regarding the orientation for rendering the new 3D reconstruction. The selection component 110 can further direct the 3D rendering component 128 to generate the new 3D reconstruction according to the parameters using the pixel data for the 3D compatible subset of native images stored in the cache 124. The 3D rendering component 128 can further perform the suitable image processing functions needed to generate the new 3D reconstruction (e.g., filtering, 3D segmentation, 3D registration and the like).

Along with the query to retrieve indexed information needed to generate the data model 120, the query component 116 can further be configured to retrieve the actual native medical images included in the selected data set from the one or more data stores 130 (e.g., from the native medical image data 132). In some implementations, the retrieved native medical image data can include all relevant native medical images including prior studies for a given patient. In other implementations, the retrieved native medical image data can include the relevant pixel data for coherent sets or subsets of native medical images that can be used to generate 3D representations. The data loading component 122 can further load the retrieved native medical image data into a local cache (e.g., cache 124) so that it can be readily available for processing by the image processing services (e.g., by the native image processing component 126 and the 3D rendering component 128) and rendered in the GUI (e.g., by the front-end visualization component 102).

The back-end processing services components 136 can also provide a service fabric allowing the deployment of multiple image processing services co-located on the same hardware, working on the same data set shared in RAM. These image processing services can include native image processing component 126 configured to perform various native image processing functions, including but not limited to: handling of compression, multi-resolution, modality LUTs, and the like. These image processing services can also include 3D rendering component 128 configured to perform various 3D rendering services to generate 3D reconstructions from 3D compatible subsets of native medical images. These 3D rendering functions can include but are not limited to, filtering, 3D segmentation, 3D registration and the like. All back-end services are containerized and scale-able, allowing the proposed solution to support many concurrent users.

Figure 2:
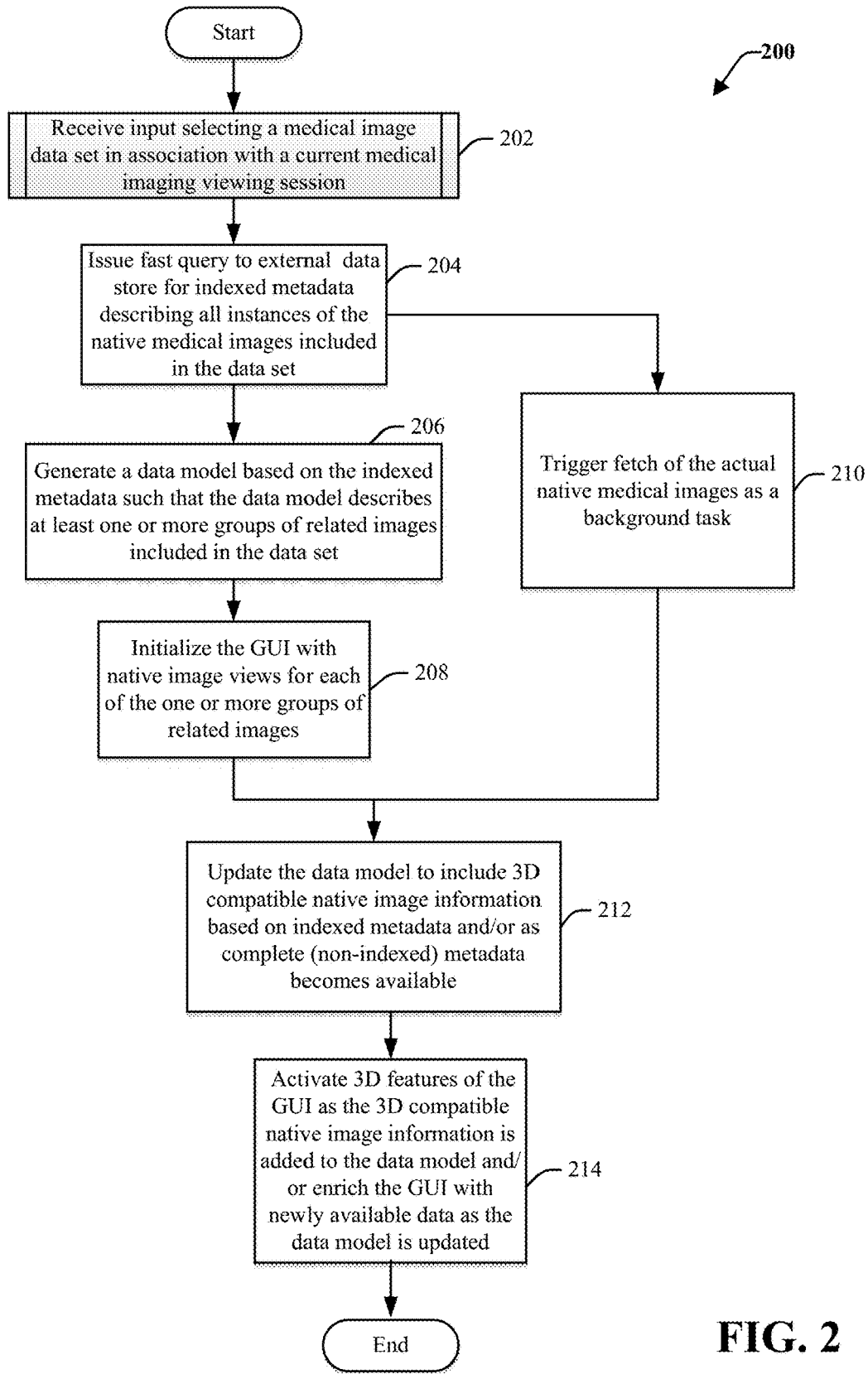
FIG. 2 illustrates a flow diagram of an example process employed by the native/reconstructed medical imaging system to facilitate transitioning between viewing native and reconstructed medical images in the same viewport in accordance with various aspects and embodiments described herein.

FIG. 2 illustrates a high level flow diagram of an example process 200 employed by the native/reconstructed medical imaging system 100 to facilitate transitioning between viewing native and reconstructed medical images in the same viewport in accordance with various aspects and embodiments described herein.

With reference to FIGS. 1 and 2, in accordance with process 200, at 202, the native/reconstructed medical imaging system 100 can initially receive input selecting a medical image data set for viewing in association with a current medical imaging viewing session (e.g., via input reception component 108). For example, in one or more embodiments, the native/reconstructed medical imaging application can allow a user to initiate a medical imaging viewing session by opening the native/reconstructed medical imaging application and providing input (e.g., via the GUI) selecting a particular medical image data set for viewing during the viewing session. For example, the initial input can include input identifying or indicating a particular patient, a particular imaging study, a particular group of imaging studies, or the like. By way of example, process 200 is described in association with reception of initial input selecting a medical image data set encompassing patient John Doe's recent brain study.

At 204, based on the initial data set selection, the native/reconstructed medical imaging system 100 can be configured to issue a fast query (e.g., via query component 116) to one or more external data stores (e.g., one or more data stores 130) for indexed metadata describing all instances of the native medical images included in the data set. For example, based on the data set selection, the processing services communication component 114 can call on or otherwise direct the query component 116 to query the indexed medical image data information 134 to identify all instances of the native medical images included in the selected data set. For example, these native medical images can include all images for patient John Doe that are included in his recent brain imaging studies. The query component 116 can further retrieve the relevant indexed metadata for the native medical images included in the selected data set.

At 210, as a background task, the query component 116 can also fetch the actual native medical images from their respective locations in the one or more data stores 130 (e.g., stored as native medical image data 132). The data loading component 122 can further load the fetched native medical images into a local cache (e.g., cache 124) so that they are readily accessible and available for rendering by the visualization component 102 and processing by the native image processing component 126 and 3D rendering component 128. In some implementations, the particular native medical images that the query component 116 retrieves and/or the order in which the query component 116 fetches the actual native medical images and can be based on the logical groups and/or subgroups of native medical images determined by the data modeling component 206 and defined by the data model. This scheduling feature is described infra with respect to FIG. 12 and the data scheduling component 1202.

At 206, the data modeling component 118 can generate the data model 120 based on the indexed metadata such that the data model describes at least one or more groups of related images included in the data set. For example, many native medical imaging studies involve capturing of sequence or series of native medical images (e.g., CT scans, MRI scans, and the like) of different parts or views of the patient's body part using various type of medical imaging device, modality or technique. Each of these groups or sets of related images are referred to in the DICOM model as a DICOM series. For example, in the DICOM model, a patient can have one or more studies, (sometimes referred to as exams or procedures). Each study can consist of one or more series. A series generally equates to a specific type or modality of data, or the position of a patient on the acquisition device. Each series can contain one or more DICOM object instances which are most commonly native medical images, but can also include reports, waveform objects, and the like. All of this information is contained in each DICOM object of a study. Thus in various implementations, if at 206 the indexed metadata includes information identifying different series of native medical images included in the selected data set. Based on the indexed metadata, the data modeling component 118 can be configured to sort the native medical images into groups or sets or related native medical images belonging to each series and generate a data model with information that identifies and organizes the different groups of images corresponding to each series.

At 208, the 2D/3D imaging visualization system 100 then initializes (e.g., via the visualization component 202) the GUI with native image views for the one or more groups of related images. For example, in implementations in which the selected data set is associated with two or more DICOM series (e.g., groups of related images), the viewport component 106 can generate a viewport for each series. The viewport component 106 can further display an initial native image in each viewport for the series. For example, the first displayed native image can include the first image in the series, the middle image in the series, a user selected image, or another predefined initial image associated with the series. In other implementations, the viewport component 106 can generate and display a single viewport in the primary display area of the GUI for one of the series and further generate information in the GUI identifying the additional series. The user can then select another series for viewing in the primary display area if desired, view two or more viewports in the primary display area if desired, or the like. At this stage, the subject 2D/3D imaging visualization application behaves as a native image viewer and the user can quickly and immediately be presented with native medical images directly as they appear out of the acquisition system.

In the meantime, at 212 the data modeling component 118 can continue to develop and update the data model to include 3D compatible native image information based on the indexed metadata and/or as complete (non-indexed) metadata becomes available. For example, the in some implementations, the indexed medical image data information 134 may not include the appropriate metadata for the native medical images needed to generate 3D compatible data for the images. With these implementations, the data modeling component 118 can identify the missing information from the actual image files when retrieved from the native medical image data 132. For example, with respect to selection of a data set including cardiac imaging data for patient, the initial DICOM data retrieved by the query component 116 from the indexed medical image data information (e.g., via a C-FIND operation) may include only limited, basic series level information that does not allow the data modeling component 118 to determine cardiac phases. However, the query component 116 can subsequently perform an additional query to retrieve headers or full DICOM files (e.g., via a C-MOVE operation) providing the information needed to determine the cardiac phases.

The 3D compatible information can include information that enables a group of related native medical images to be rendered as a 3D model or volume. In particular, in order for 3D rendering component 128 to generate and render a 3D medical image, the data modeling component 118 can further develop the data model to include information that sorts or groups the native medical images into subgroups or subsets of 3D images compatible with 3D rendering and/or includes geometric information that defines how the native images in the subgroups or subsets can be combined to generate a defined geometric volume. For example, the metadata associated with native medical images (e.g., in the indexed medical image data information 134 and/or associated with the actual native medical images) according to the DICOM model is not formatted for 3D rendering. In this regard, each individual native image included in the native medical image data 132 and/or as described in the indexed medical image data information 134 is a self contained entity that is associated with metadata bout that image alone. For example, the metadata associated with each native medical image can include information regarding what patient it belongs to, what study it belongs to, what series it belongs to, what type of image or modality it is, what orientation or perspective it is, what image number it has, pixel information, etc. However, 3D medical models or reconstructions are generated based on a collection or group of related images that are 3D compatible and that have been geometrically aligned and processed in a manner such that the respective pixels included in the collective images can form a 3D volume. Thus the initial processing associated with generating 3D models from native medical images involves identifying and grouping the native images into subset or subgroups of the native medical images that are 3D compatible and further determining geometric properties between the images included in the subset.

For instance, in order for the 3D rendering component 128 to able to build a 3D volume out of a set of native medical images (also referred to herein as native image instances), all instances need to be coherent in that they share the same characteristics (e.g., number of rows, number of columns, pixel width, pixel height, pixel representation, orientation). In addition, there cannot be duplicate instances at the same position along the acquisition axis. For example, in some implementations, a DICOM series can include multiple versions of same or similar images. For example, with a CT acquisition, the image study can involve capturing of a first set of images with no contrast injection and a second set of images with contrast injection. The results of the CT acquisition are generally stored and indexed as a single DICOM series. However, the 3D rendering purposes, the series should be grouped into two subgroups of images, one including images with contrast injection and one including images without contrast injection. Each subgroup of images can be used to generate separate 3D models. However, all images in the series cannot be grouped together to form a single 3D model because collective images are not coherent (e.g., because they include redundant images of the same view or slice of the body part, one with contrast injection and one without). In another example, cardiac imaging acquisitions often involve duplicate subsets of native images in for a single series, wherein each subset is associated with a different temporal phase. According to this example, each subset in the series respectively associated with each temporal phase can be used to generate a different 3D representation.

In addition to determining coherent subsets of 3D compatible native images, the data modeling component 118 can also be configured to process the metadata associated with the native medical images in the subset to determine geometric properties that define the 3D model that can be generated from the subset of images. This processing step can involve for example computing the 3D volume geometry represented by the collective pixels included in the subset of coherent images. In one or more embodiments, the data modeling component 118 can determine the volume geometry by uniformly arranging each native image in equal spaces or distances relative to one another along the same acquisition axis (e.g., the z-axis). (In other words the spaces between volume slices should be made constant). When it is not the case in a subgroup of 3D compatible native images, the data modeling component 118 can define a constant space between the images, which will be used by the 3D rendering component 128 to interpolate native slices to construct the volume.

Thus in various embodiments, at 212, the data modeling component 118 can perform the initial processing associated with generating 3D models from native medical images by identifying and grouping the native images into subset or subgroups of the native medical images that are 3D compatible and further determining 3D geometric properties between the images included in the subset. For each series, the data modeling component 118 can further add information to the data model 120 identifying the 3D compatible coherent subsets or subgroups of native medical images associated therewith and/or geometric information regarding the geometric volume represented by images in the subgroup. In the meantime, as a background task (e.g., at 212), the data loading component 122 can continue to load the actual native medical images for each 3D compatible subset into the cache 124 so that they can later be processed by the 3D rendering component 128 to generate 3D representations based on the 3D compatible information in the data model.

In one or more implementations, once this 3D compatible native image information is added to the data model and/or once the actual native images included in the one or more 3D compatible subsets are received in the cache 124 and available for processing by the 3D rendering component 128, the visualization component 102 can enable transitioning between viewing the native medical images to viewing 3D reconstructions associated with the native medical images. For example, at 214, the visualization component 102 can further add or activate (e.g., via the interface component 104) 3D features of the GUI as the 3D compatible native image information is added to the data model and/or enrich the GUI with newly available data as the data model is updated. For example, in various implementations, the front-end visualization GUI can be context-sensitive and reactive, meaning that the controls will get richer as 3D volumes become available in the back-end. In this regard, as the data model is updated with information that can be used by the 3D rendering component 128 to generate and render 3D reconstructions associated with native medical images that are displayed in the GUI (and/or as the actual native images included in a 3D compatible subset are loaded in to the cache 124 and become accessible to the 3D rendering component 128), the interface component 104 can add one or more controls to the GUI the allow the user to switch from viewing the native image to viewing a reconstructed version of the native medical image in the same viewport. In particular, the interface component 104 can activate and/or provide one or more control functions that allow a user to view a reconstructed version (e.g., a 3D reconstructed medial image or a 2D reconstructed medial image) of a displayed native medial image. As described in greater detail infra, one such control function that provides for transitioning between viewing a native and a reconstructed medical image can include a thickness control function that allows a user to increase the thickness of a displayed native medical image to generate a volumetric (3D) visualization of the body part in the displayed native medial image (e.g., a thick slab MPR visualization). Further, once the native/reconstructed medical imaging visualization system 100 is ready to generate and render reconstructed medical images associated with a selected medical image data set, the visualization component 102 can also active and/or provide various controls that allow user to interact with the reconstructed medical images. For example, the controls can provide for changing the appearance of reconstructed medical image to volumetric rendering (VR), a 3D rendering in min-IP and the like. These reconstructed medial image controls can also provide for viewing a 3D model from different perspectives, viewing selected portions of a 3D model, and the like. The various control tools for transitioning between viewing native and reconstructed medical images and interacting with native and reconstructed medical images are discussed in greater detail infra with reference to FIG. 6.

Figure 3:
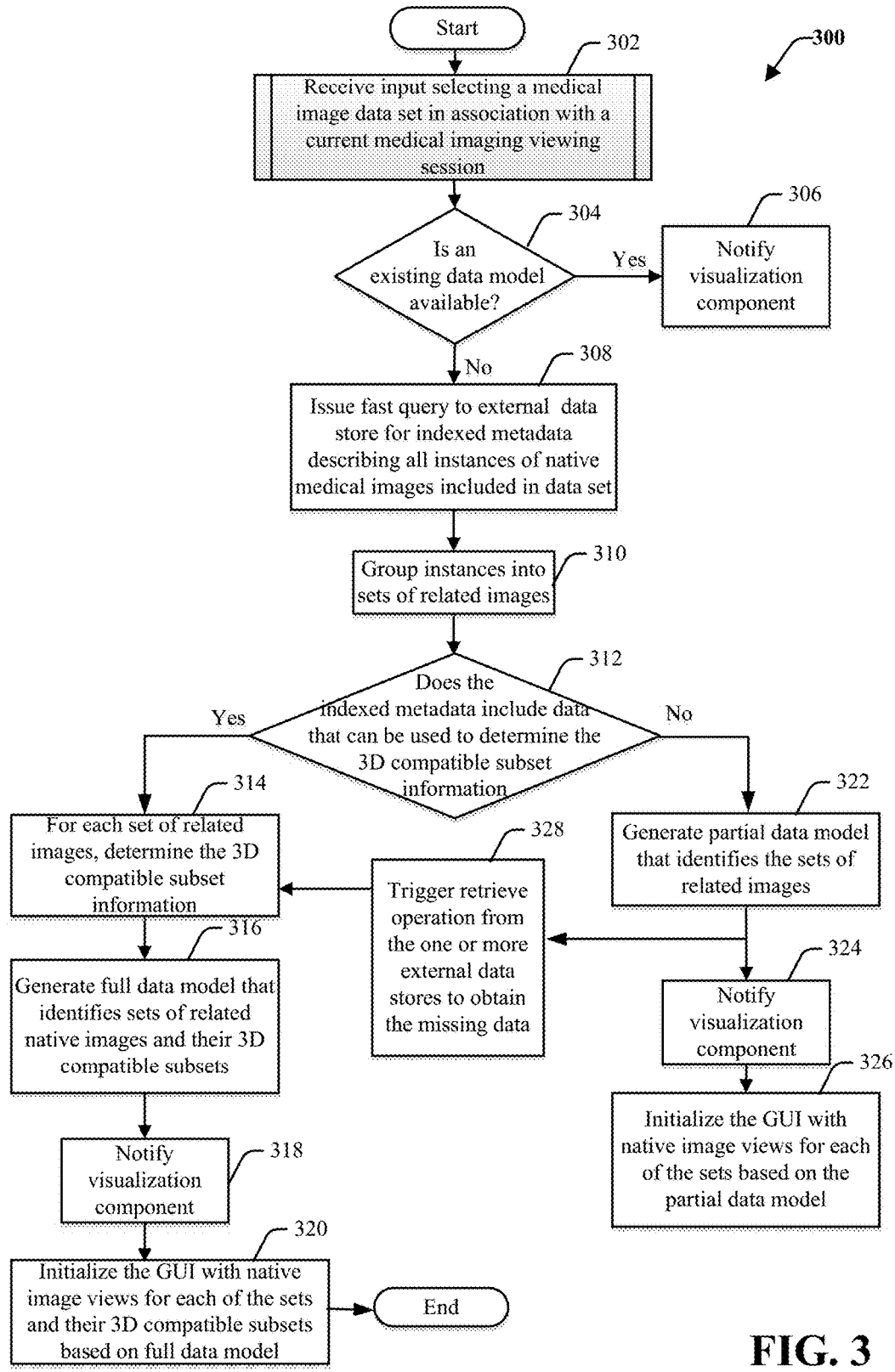
FIG. 3 illustrates a flow diagram of another example process employed by the native/reconstructed medical imaging system to facilitate transitioning between viewing native and reconstructed medical images in the same viewport in accordance with various aspects and embodiments described herein.

FIG. 3 illustrates another flow diagram of another example process 300 employed by the native/reconstructed medical imaging system 100 to facilitate transitioning between viewing native and reconstructed medical images in the same viewport in accordance with various aspects and embodiments described herein. Repetitive description of like elements employed in respective embodiments is omitted for brevity.

With reference to FIGS. 1 and 3, in accordance with process 300, at 302, the native/reconstructed medical imaging system 100 can initially receive input selecting a medical image data set for viewing in association with a current medical imaging viewing session (e.g., via input reception component 108). For instance, continuing with the example used with reference to FIG. 2 and process 200, the input can include selection of an imaging study for a particular patient, such as patient John Doe's recent brain study. At 304, based on the initial data set selection, the native/reconstructed medical imaging system 100 can determine whether a previously generated data model has been generated and is available for the selected data set. For example, the data modeling component 118 can be configured to save (e.g., in cache 123 or in another suitable memory accessible to the visualization component 102) data models previously generated for selected data sets. Accordingly, if the same data set is selected again in the future, the data modeling component 118 can immediately access and employ the previously generated data model. If at 304 an existing data model is available, the data modeling component 118 can notify the visualization component 102 and the visualization component 102 can employ the existing data model to begin rendering native and/or 3D representations (e.g., depending on the information provided by the data model).

If at 304 a previously generated data model is not available for the selected data set, at 308, the query component 116 can be configured to issue a fast query (e.g., via query component 116) to one or more external data stores (e.g., one or more data stores 130) for indexed metadata describing all instances of the native medical images included in the data set. For example, based on the data set selection, the processing services communication component 113 can call on or otherwise direct the query component 116 to query the indexed medical image data information 133 to identify all instances of the native medical images included in the selected data set (e.g., all native images for patient John Doe that are included in his recent brain imaging study). The query component 116 can further retrieve the relevant indexed metadata for the native medical images included in the selected data set. For example, the data modeling component 118 can be wired via a plug-in design to use the one or more data stores 130 relying on various existing query methods, such as but not limited to, C-FIND (e.g., a DICOM tcp-ip API), QIDO-RS (e.g., a DICOM REST API), proprietary SQL queries, and the like. This instance-level query can return a list of all native medical image DICOM instances in the selected data set. For example, each instance can be associated with metadata in the form of list of DICOM tags and their respective values. The list of indexed metadata tags will be limited by the subset supported by the indexed medical image data information 134.

At 310, using the indexed metadata, the data modeling component 118 can group the native medical image instances in the selected data set into sets of related images. For example, this can involve grouping the native medical images into one or more sets of images, wherein each set corresponds to a DICOM series. At 312, the data modeling component 118 can determine whether the indexed metadata includes data that can be used to determine the 3D compatible subset information (e.g., data identifying coherent images with respect to pixilation attributes, geometric data that can be used to compute 3D volumes and the like). In this regard, the 3D compatible subset information can include information that identifies coherent subsets of native medical images that can be used to generate 3D models and geometric (e.g., volume) information for the 3D compatible subsets that can be used to render the subsets as 3D volumes.

If at 312 the indexed metadata includes data that can be used to determine the 3D compatible subset information, process 300 proceeds to 314 and the data modeling component 118 can determine the 3D compatible subset information for each set of related images (e.g., each series). Then at 316, the data modeling component 118 can generate a full data model that identifies the sets of related native images and their 3D compatible subsets (and in some implementations, the geometric information for the 3D compatible subsets). The data modeling component 118 can further notify the visualization component 102 regarding the availability of the full data model at 318, and based on the full data model, the visualization component 102 can initialize the GUI with native image views for each (e.g., or in some implementations one or more) of the sets (e.g., for each series), and their 3D compatible subsets. In this regard, the GUI can active include control features and functionalities that allow the user to transition from the native views to the reconstructed views.

If however, at 312 the indexed metadata does includes data that can be used to determine the 3D compatible subset information, process 300 proceeds to 322 and the modeling component can generate a partial data model that identifies the sets of related images (e.g., each series). The data modeling component 118 can further notify the visualization component 102 regarding the availability of the partial data model at 324, and at 326, based on the partial data model, the visualization component 102 can initialize the GUI with native image views for each (or in some implementations one or more) of the sets. At this stage, the GUI does not provide for transitioning from the native image view to the 3D views yet. However, in association with generation of the partial data model at 322, as a background task, at 328 the query component 116 can trigger a retrieve operation from the one or more external data stores (e.g., the one or more data stores 130) to obtain the missing data. For example, in some implementations, the query component 116 can retrieve the full native medical image instance files and parse through the full files to identify the data that can be used to determine the 3D compatible subset information. This retrieve operation may be needed to finalize the sorting of DICOM instances into 3D compatible subsets and anticipates subsequent calls to retrieve pixel data initiated by front-end components. As this missing data becomes available, process 300 can proceed to 316, and the data modeling component 118 can generate a full data model that identifies the sets of related native images and their 3D compatible subsets (and in some implementations, the geometric information for the 3D compatible subsets). For example, the data modeling component 118 can update the partial data model generated at 322 to include the 3D compatible subset information. The data modeling component 118 can further notify the visualization component 102 regarding the availability of the full data model at 318, and based on the full data model, the visualization component 102 can initialize the GUI with native image views for each (e.g., or in some implementations one or more) of the sets (e.g., for each series), and their 3D compatible subsets. In this regard, the GUI can active include control features and functionalities that allow the user to transition from the native views to the reconstructed views.

In accordance with process 300, the workflow(s) initiated at 322 (e.g., steps 322 through 328 as well as continuing from step 328 to steps 314 through 320), can be performed by the data modeling component 118 when the indexed metadata does not initially provide the data needed to finalize the grouping of DICOM instances into sets compatible with 3D rendering and retrieving the full DICOM instances is required to do so. In such a configuration, a partial data model where DICOM instances are only sorted into DICOM series is returned to the front-end visualization components as early as possible to maximize interactivity. On the other hand, the workflow(s) initiated at 314 (e.g., 314 through 320) are the implementation path when the external data store query service provides the information needed to finalize the grouping of DICOM instances into sets compatible with 3D rendering. In such a configuration, the front-end visualization component 102 can directly initialize the display with viewports allocated for 3D compatible subsets.

Figure 4:
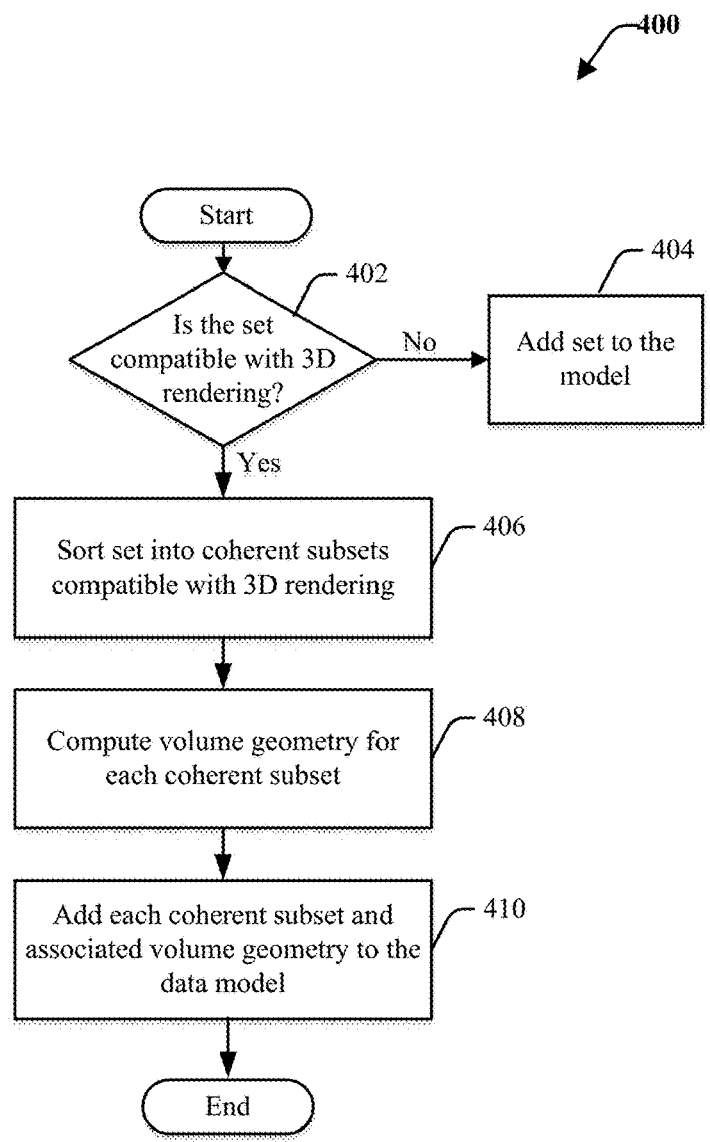
FIG. 4 illustrates a flow diagram of an example process employed by the modeling component to determine 3D compatible subset information in accordance with various aspects and embodiments described herein.

FIG. 4 illustrates a flow diagram of an example process 400 employed by the data modeling component 118 to determine 3D compatible subset information in accordance with various aspects and embodiments described herein. In various embodiments, process 400 can be performed by the data modeling component 118 in association with operation 314 of process 300. In one or more embodiments, the data modeling component 118 can be configured to perform process 400 for each set or group of related native medical images (e.g., for each DICOM series). Repetitive description of like elements employed in respective embodiments is omitted for sake of brevity.

With reference to FIGS. 1 and 4, at 402, after the data modeling component 118 has identified and received indexed metadata and/or non-indexed metadata for a set of related images, such as those belonging to a DICOM series, the modeling component can determine (e.g., based on the initial indexed metadata query results and/or subsequently identified metadata associated with the actual retrieved native medical image instances), whether the set is compatible with 3D rendering. For example, in embodiments in which each set corresponds to a DICOM series, not all DICOM series associated may include native medical images that can be rendered as 3D volumes. For example, some DICOM series may include screen captures, SCOUT views, or non-image data objects that are not relevant to 3D rendering. Accordingly, if at 402 the data modeling component 118 determines that a particular set is not compatible with 3D rendering, at 404 the data modeling component 118 can add the set to the data model. For example, the data modeling component 118 can add information identifying the set and the DICOM objects include in the set. In some implementations, the data modeling component 118 can associate information with the set indicating that it does not include native images compatible with 3D rendering.

If at 402 the data modeling component 118 determines that a set of related images is compatible with 3D rendering, then at 406 the data modeling component 118 can proceed to sort the set into one or more coherent subsets compatible with 3D rendering at. For example, the data modeling component 118 can group the native medical images based on having coherent visual characteristics (e.g., number of rows, number of columns, pixel width, pixel height, pixel representation, orientation, etc.), and so that each subset does not include duplicate images taken from the capture position. This processing step enforces such coherence, possibly splitting DICOM series into smaller subsets. At 408, for each 3D compatible subset of coherent native medical images, the data modeling component 118 can further compute the 3D volume geometry of the collective pixels include in the subset based on the relative 3D positions for each pixel included in the subset. In implementations in which each image is not separated by a defined distance or space along the acquisition axis, the data modeling component 118 can define a constant space using a default separation value (e.g., which can vary depending on the type and number of images included in a series). Then at 410, the data modeling component 118 can add information to the data model identifying the coherent subset and its associated volume geometry.

Figure 5:
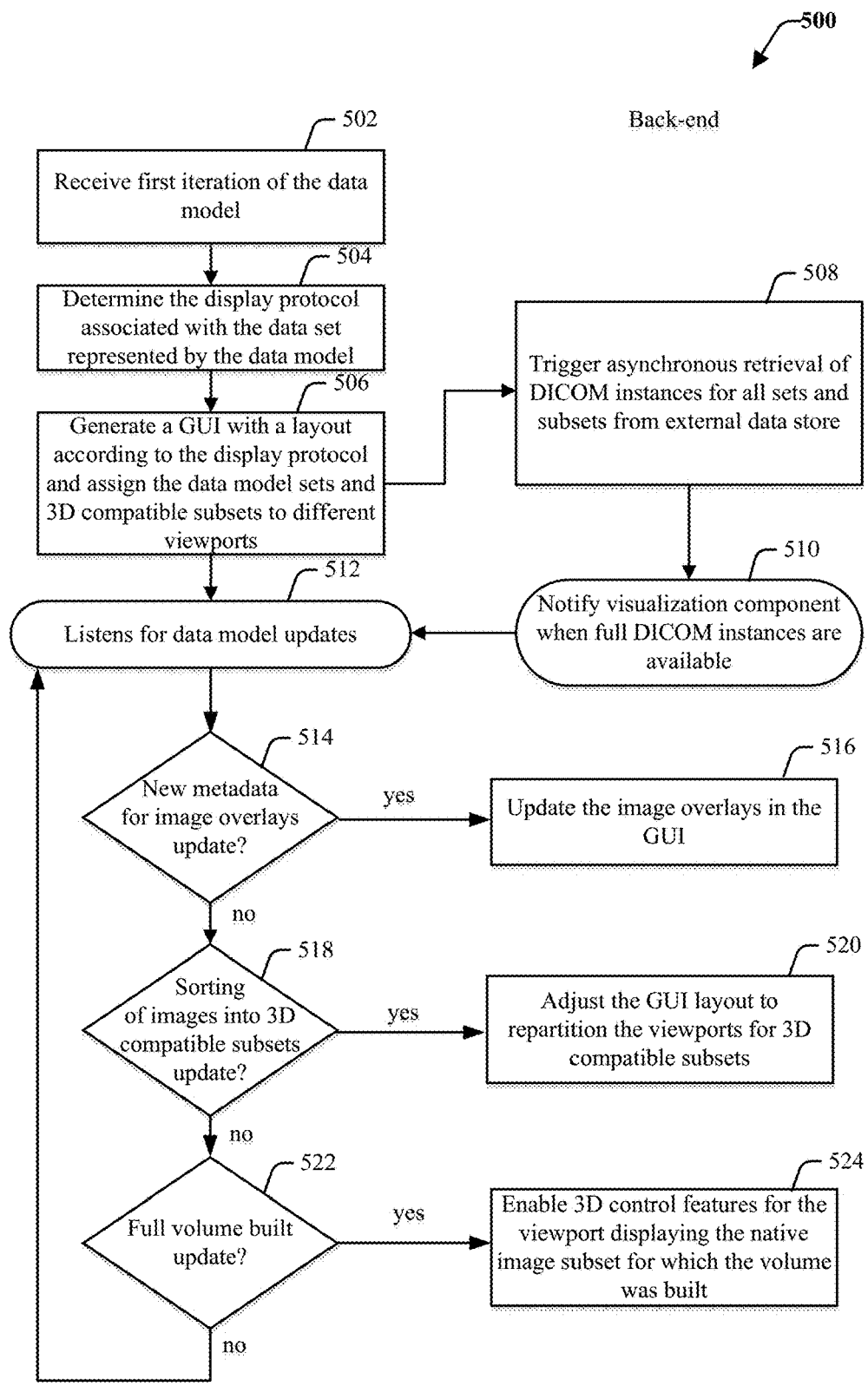
FIG. 5 illustrates a flow diagram of another example process employed by the native/reconstructed medical imaging system to facilitate transitioning between viewing native and reconstructed medical images in the same viewport in accordance with various aspects and embodiments described herein.

FIG. 5 illustrates a flow diagram of another example process 500 employed by the native/reconstructed medical imaging system to facilitate transitioning between viewing native and reconstructed medical images in the same viewport in accordance with various aspects and embodiments described herein. Process 600 particularly exemplifies some of the features and functionalities of the front-end visualization component 102 in association with rendering native and reconstructed images during a viewing session. Repetitive description of like elements employed in respective embodiments is omitted for sake of brevity.

With reference to FIGS. 1 and 5, at 502, the visualization component 102 can receive a first iteration of the data model generated and/or provided by the data modeling component 118 for a selected data set, such as a brain imaging study for patient John Doe (e.g., via the processing services communication component 114). At 504, the visualization component can determine the display protocol associated with the data set represented by the data model (e.g., via interface component 104). For example, depending on the type of imaging study represented by the data set, the number of series and order for displaying the series in respective viewports can vary. Thus in various embodiments, each study or data set can be associated with defined GUI layout parameters. At 506, the visualization component 102 can generate and render a GUI with a layout according to the display protocol and assign the data model sets and 3D compatible subsets (if available), to different viewports (e.g., via the viewport component 106). In addition, at 508 the visualization component 102 can trigger the asynchronous retrieval of the DICOM instances for all sets and subsets from external data store. In this regard, the visualization component 102 can direct the back-end query component 116 to query the one or more data stores 130 for asynchronous retrieval of the full DICOM content for all instances in the sets to display. The data loading component 122 can further load them into local memory (e.g., cache 124) so that the pixel data is available for processing by the image processing components (e.g., the native image processing component 126 and the 3D rendering component 128). The data modeling component 118 can further the update the data model based on the non-indexed DICOM content. At 510, the data modeling component 118 and the data loading component 122 can further notify the visualization component 102 regarding the availability of the full DICOM content and any updates to the data model. For example, front-end processing services communication component 114 that interfaces with the data loading component 122 and data modeling component 118 can watch for data model updates (either via a push notification design leveraging a web socket or via polling). When it detects one, it can notify all the front-end components dependent on such updates (layout manager, viewports components, etc).

At 512, the visualization component 102 can listen for updates to the data model. If at 514, an update to the data model is provided that includes new metadata for image overlays, at 516, the interface component 104 can update the image overlays in the GUI. For example, in various implementations, in addition to displaying native and reconstructed images in the GUI viewports, the interface component 104 can also include overlay data (e.g., in the form of text, symbols, images, hyperlinks, etc.) on the images and/or in the viewport that describes the content and/or characteristics of the images. For instance, for a cardiac study, the data needed to identify the cardiac phase a given DICOM image belongs to may not be available in the response to the initial query (which only returns indexed DICOM metadata). When the full data file for the DICOM image is retrieved, it may be associated non-indexed metadata identifying the cardiac phase. This non-indexed metadata can be extracted by the data modeling component 118 and added the data model so that the phase value can then be displayed as overlay data (e.g., as text) on the native image in the GUI.

If at 518, an update to the data model is provided that sorts the images into 3D compatible subsets, then at 520, the interface component 104 can update the GUI layer to repartition the viewports for the 3D compatible subsets. For instance, the viewport component 106 can add new viewports to the GUI for each of the newly identified 3D compatible subsets. For example, it may not be possible for the data modeling component 118 to split a cardiac series into phases based on the indexed metadata included in the initial query response. However, once the actual DICOM instances are retrieved, the data modeling component 118 can extract the non-indexed metadata from the actual DICOM instances to identify the respective images belonging to different cardiac phases. The data modeling component 118 can further update the data model with 3D compatible subset information identifying the respective subset corresponding to each cardiac phase. The viewport component 106 can then display one phase in the viewport to which the full series was assigned, or it can opt to create new viewports for each phase (depending on chosen display protocol).

If at 522, an update to the model is provided that computes a full volume for a 3D compatible subset of native medical images, then at 524, the viewport component 106 can enable the 3D features for the viewport displaying the native image subset for which the full volume was built. For example, the viewport component 106 can add a thickness slider to the given viewport that allows the user to seamlessly switch from a view showing single native images to a view showing 3D aggregates constructed from multiple native images. Similarly, it can add menu items allowing the user to switch to a view showing reconstructed images in different orientations (e.g., axial, sagittal, coronal, etc.). If at 522, no updates to the data model have been provided, then the visualization component 102 can continue to listen for new updates at 514.

Processes 200, 300, 400 and 500 (and additional processed described herein) can involve generating an initial version of the data model and later updating the data model as more non-indexed metadata information about the native medical images in the data set becomes available. This design is intended make the seamless native/3D compatible data model available to the visualization component 102 as soon as possible to maximize the reactivity of the application. This implies that after a first version has been created and communicated to the visualization component 102, the model may need to be updated as more information is gathered from the one or more data stores 130 and new content is retrieved. In one or more implementation, the native/reconstructed medical imaging system 100 can implement such a data flow using a publish/subscribe pattern via bidirectional connections between the front-end and back-end components. If deployment the environment (e.g. firewalls) prevents the use of bidirectional connections, a request/reply pattern with multiple endpoints or a polling pattern can be used instead.

Figure 6:
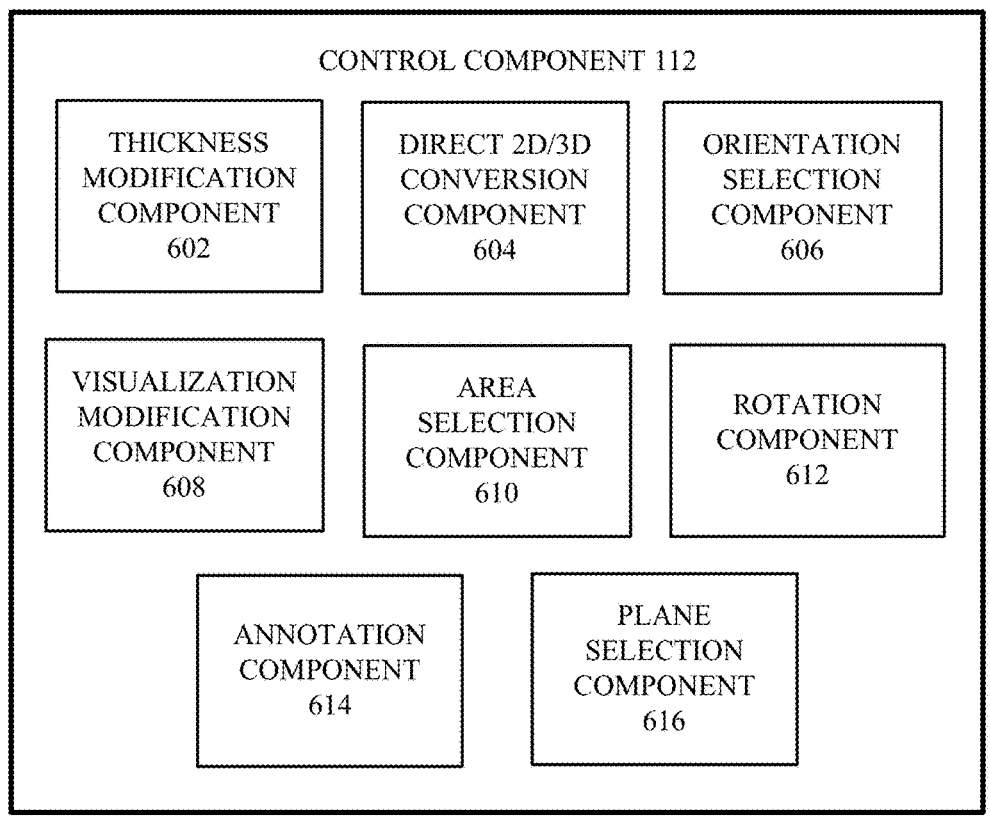
FIG. 6 illustrates an example control component including control functions that facilitate interacting with and transitioning between viewing native and reconstructed medical images in accordance with various aspects and embodiments described herein.

FIG. 6 illustrates an example embodiment of the control component 112 providing some control functions that facilitate interacting with and/or transitioning between viewing native and reconstructed medical images in accordance with various aspects and embodiments described herein. These control functions can be provided by one or more of, a thickness modification component 602, a direct 2D/3D conversion component 604, an orientation selection component 606, a visualization modification component 608, an area selection component 610, a rotation component 612, an annotation component 614 and/or a plane selection component 616. In various embodiments, the viewport component 106 can be configured to provide or activate one or more of these control functions in the GUI based on addition of the 3D compatible native medical image information to the data model and/or once the actual native medical images included in a 3D compatible subset are received in the cache 124 and available for processing by the 3D rendering component 128.

As noted in some previous examples, the control component 112 can include a thickness modification function that allows a user to increase the thickness of a displayed native medical image. This thickness modification function can be provided by the thickness modification component 602. In one or more embodiments, the thickness modification component 602 can facilitate transitioning between viewing a native medical image and a 3D representation of the native medical image (e.g., a thick slab MPR visualization) by adjusting the thickness of the displayed visualization. In particular, the thickness modification component 602 can allow a user to provide input increasing a thickness of a native medical image displayed in the GUI. Based on reception of user input indicating an increase to the thickness native image, the visualization component 102 can display a 3D representation of the body part represented by the native image that corresponds to a volume of the body part defined by amount increase to the thickness. For example, based on the view of the body part represented by the current native image being displayed, using 3D compatible information in the data model 120, the selection component 110 can identify a subset of 3D compatible native medical images that are respectively associated with different planes of the volumetric space defined by the thickness. For example, with respect to a CT or MRI scan image, the selection component can identify a set of CT or MRI images that respectively include sequential slices of the volumetric area defined be the thickness. The selection component 110 can further direct the 3D rendering component 128 to generate the corresponding 3D model of the body part having a volume corresponding to the thickness. The 3D rendering component 128 can further provide the 3D model to the visualization component 102 for displaying in the GUI.

In some embodiments, the thickness modification component 602 can also provide for increasing and decreasing a thickness of a 3D model of a body part displayed in the GUI. For example, based on input indicating an increase in thickness to a displayed 3D model of a body part, the selection component 110 can direct the 3D rendering component 128 to generate a new 3D model of the body part that adds additional anatomical features 3D to the previously rendered 3D model such that the volume of the new 3D image is increased relative to the previous 3D image. Likewise, based on input indicating a decrease in thickness to a displayed 3D model of a body part, the selection component 112 can select direct the 3D rendering component 128 to generate a new 3D model of the body part that removes anatomical features from the previously rendered 3D image such that the volume of the new 3D model is decreased relative to the previous 3D model. In various implementations, the selection component 110 can determine the geometric (e.g., the volume of the 3D image) and visual (e.g., the 3D compatible native image pixels to employ) parameters for the new 3D model based on the information included in the data model 120.

Further, in one or more embodiments, based on user input indicating a decrease to the thickness of a displayed 3D model to less than a minimum thickness, the selection component 110 can determine a native medical image corresponding to the minimum volume of the body part defined by the minimum thickness should be displayed. In this scenario, using data model 120, the selection component can select a native medical image from the native medical images included in the data set that provides the closest or best planar view of the minimum volumetric space. For example, based on the current 3D model of the body part that is displayed, its orientation, and the amount decrease in thickness, and the information describing the native medical images in the data set, the selection component 110 can determine a cross-sectional area, relative to a 3D coordinate space, of the body part desired for viewing. The selection component 110 can further identify and select a native 2D medical that best depicts the cross-sectional area. For example, the selection component 110 can identify and select a native medical image from the native medical images in the data set corresponding to a plane having the closest position and orientation to the position and orientation of the desired cross-sectional area. The visualization component 102 can further render the selected native 2D medical image in the GUI.

In one or more embodiments, in addition to or alternative to the thickness modification component 602, the control component 112 can include a direct 2D/3D conversion component 604. The direct 2D/3D conversion component 604 can facilitate automatically transforming a rendered native medical image into a 3D image and/or transforming a rendered 3D image into a native medical image. According to this embodiment, based on user input selecting the direct 2D/3D conversion function in association with a rendered native medical image, the selection component 110 can be configured to select a default 3D image corresponding to the displayed native medical image. For example, the default 3D image can include a 3D model of the body part displayed from a defined orientation (e.g., the same orientation as the 2D image or a different orientation), with a defined appearance (e.g., min-IP, max-IP, avg-IP, VR, etc.) and/or with one or more other predefined visual characteristics. In some embodiments, the direct 2D/3D conversion component 604 can also provide for automatic switching from viewing a reconstructed medical image to viewing a native medical image associated with the reconstructed medical image. According to these embodiments, based on user input selecting the direct 2D/3D conversion function in association with a rendered 3D image, the selection component 110 can be configured to select a default native medical image associated with the 3D image. For example, the default native medical image can include a native medical image that provides the best cross-sectional view of the body part displayed in the 3D image. The orientation of the default native medical image can be the same as the 3D image or different. For example, in implementations in which a plurality of native medical images are captured of the body part from a single orientation that is different than the orientation of the displayed 3D image, the default native medical image will include a native medical image captured from the single orientation.

The orientation selection component 606 can provide for changing the orientation of a rendered reconstructed medical image to one or more predefined orientations. The orientation selection component 606 can also be use in conjunction with the direct 2D/3D conversion component 604 to provide for transitioning from viewing a native medical image displayed in a first orientation (e.g., its capture orientation) to viewing a reconstructed medical image in the first orientation or a second, predefined orientation. In various embodiments, the second predefined orientation can be selected from a group of one or more predefined orientations. In some implementations, the one or more predefined orientations can include canonical medical orientations, which include but are not limited to, an axial orientation, a coronal orientation and a sagittal orientation. For example, a DICOM series of native medical images can include a plurality of sequential images captured from a single orientation (e.g., axial, coronal or sagittal). Thus when viewing a native medical image, the user is restricted to viewing the body part represented in the image from the capture orientation. However, in embodiments in which the 3D rendering component 128 can generate a 3D model of the body part from 3D compatible images included in the DICOM series, the 3D model can be generated and/or rendered from orientations other than the capture orientation. In this regard, the predefined orientations can include known or reference medical orientations (e.g., canonical orientations) that are frequently viewed and understood by medical clinicians in association with evaluating medical imaging studies.

The visualization modification component 608 can provide various features and functionalities associated with changing the appearance of a displayed reconstructed medical image. These features and functionalities can vary depending on the capabilities of the 3D rendering component 128 and the image data available to the rendering component 128 for generating reconstructed medical images. For example, in various embodiments, the 3D rendering component 128 can be configured to generate and render various types of 3D reconstructed medical images, including but not limited to, 3D images in min-IP, max-IP, avg-IP and as volumetric renderings. Thus in various implementations, once the native/reconstructed medical imaging system 100 is prepared to generate a 3D representation of a body part from a subset of 3D compatible images, the viewport component 106 can activate the visualization modification component to allow for transitioning between viewing a native medical image to viewing different types of reconstructed medical images (e.g., in min-IP, max-IP, average-IP, VR, etc.).

FIGS. 7A-7G demonstrate various representations of an example GUI 700 capable of being generated by the interface component 104 in association with usage of the subject native/reconstructed medical imaging system 100 in accordance with various aspects and embodiments of the disclosed subject matter. In particular, FIGS. 7A-7G demonstrate an example workflow associated with initiation of the subject native/reconstructed medical imaging application to view and interact with native and reconstructed medical images for a selected data set. In accordance with FIGS. 7A-7G, the selected data set includes a recent brain imaging study for patient John Doe. As shown in FIGS. 7A-7G, the GUI 700 is rendered using a browser within a display window of a webpage. However, it should be appreciated that the subject disclose is not limited to this rendering format.

Figure 7A:
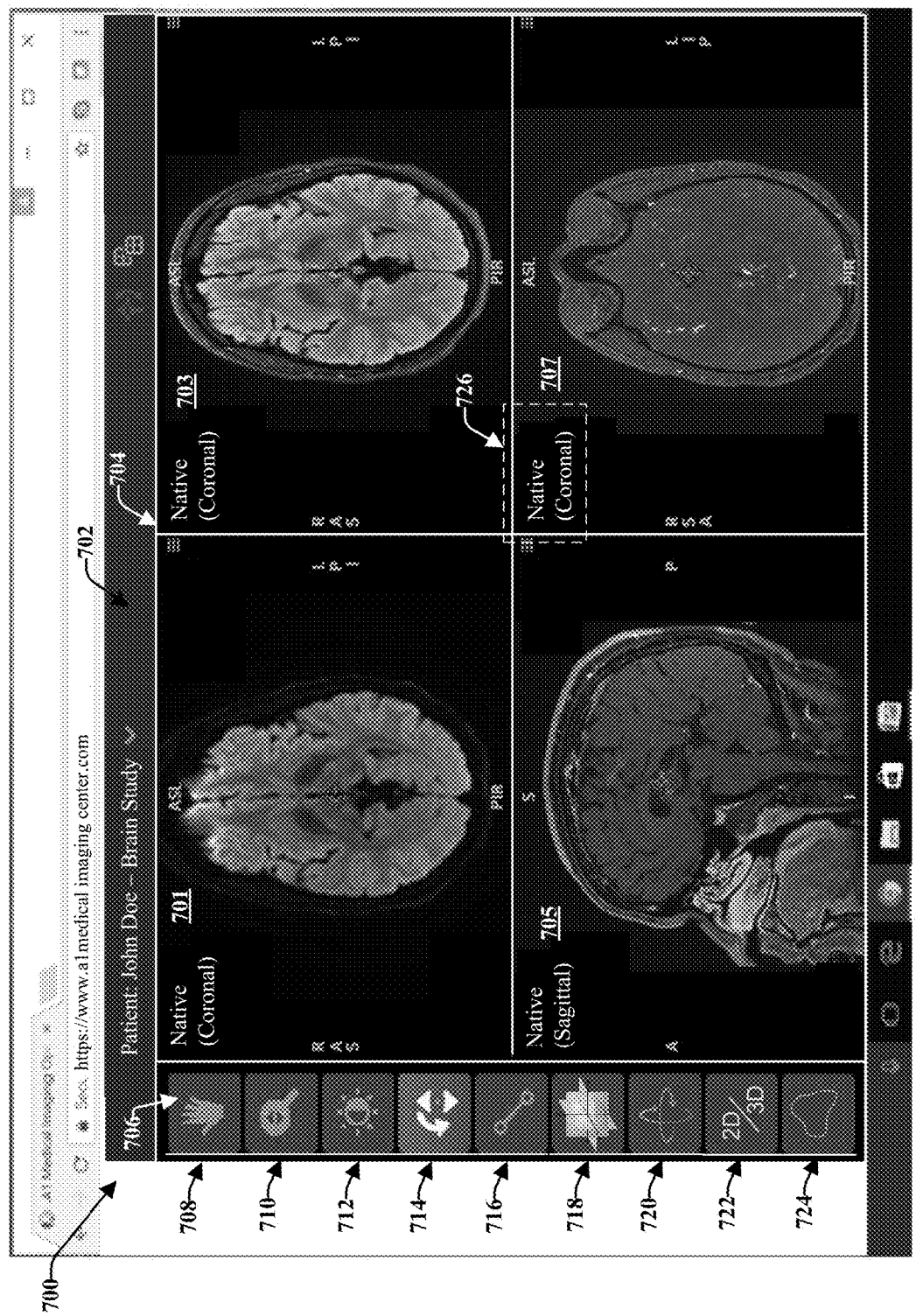
FIGS. 7A-7G present various embodiments of an example graphical user interface (GUI) that facilitates transitioning between viewing native and reconstructed medical images in accordance with various aspects and embodiments described herein.

With reference initially to FIG. 7A, in various implementation FIG. 7A presents an initial layout of the GUI 700 in response to initiation of a medical imaging viewing session for John Doe's recent brain imaging study. As shown in FIG. 7A, the subject native/reconstructed medical imaging application can behave initially as native image viewer by initially displaying one or more native images for the selected data set. For example, on the embodiment shown, the initial GUI layout includes four viewports 701, 703, 705 and 707, respectively, displayed within a primary display area 704 of the GUI. In an aspect, each viewport represents either a set of related images corresponding to a different DICOM series for patient John Doe or a subset of 3D compatible images associated with a DICOM series. Each of the viewports 701, 703, 705 and 707 include a different native medical image, as indicated by the overlay text 726 in the upper left hand corner of the viewport. The particular native image shown in each viewport can include for example, the first image in the series or subset, the middle image in the series or subset, a default image or a user selected image.

In addition to the primary display area 704 and the associated viewports 701, 703, 705 and 707, the GUI 700 can include an upper menu bar 702 and side control panel 706. In some implementations, the upper menu bar 702 can include one or more control icons that provide for initiating a viewing session, selecting an imaging study or medical image data set for viewing, closing the viewing session, returning to a previous screen, and the like. The side control panel 706 can include various control icons 708-724 that provide different control functionalities for interacting with native and reconstructed medical images displayed in the primary display area 704. For example, control icon 708 can provide for moving the displayed native or reconstructed image within the primary display area and/or selecting different portions of the displayed native or reconstructed image. Control icon 710 can provide for changing the size of the displayed native or reconstructed image (e.g., magnifying/enlarging the image and decreasing image). In another example, control icon 712 can provide changing the brightness of the displayed native or reconstructed image. Control icon 714 can include a thickness modification control that provides for changing a thickness of a displayed native or reconstructed medial image. For example, in one or more implementations, the control icon 714 can provide the features and functionalities of the thickness modification component 602. Control icon 716 can include an annotation control that provides for adding measurement lines to a displayed native or reconstructed medical image. In an aspect, selection of the control icon 716 can provide the features and functionalities of the annotation component 614. Control icon 718 can include a plane selection control that provides for selecting a plane in a displayed 3D reconstructed image for displaying as a 2D image. In an aspect, selection of the control icon 718 can provide the features and functionalities of the plane selection component 616. Control icon 720 can include a rotation icon that provides for rotating a displayed 3D image. In an aspect, selection of control icon 720 can include provide the features and functionalities of the rotation component 612. Control icon 722 can provide for automatically switching from a native 2D image to a 3D reconstructed version of the 2D image. For example, in some implementations, the control icon 722 can provide the features and functionalities of the direct 2D/3D conversion component 604. Control icon 724 can include an area selection component that provides for selecting an area or volume of a displayed native or reconstructed medical image for viewing as a separate 2D or 3D image. In an aspect, selection of the control icon 724 can provide the features and functionalities of the area selection component 610.

In various embodiments, one or more of the control icons 708-724 which provide features and functionalities that allow for viewing and interacting with reconstructed medical images (as opposed to native medical images) can be disabled/deactivated and/or removed from the GUI until the application is prepared to generate and render the corresponding reconstructed medical images.

Figure 7B:
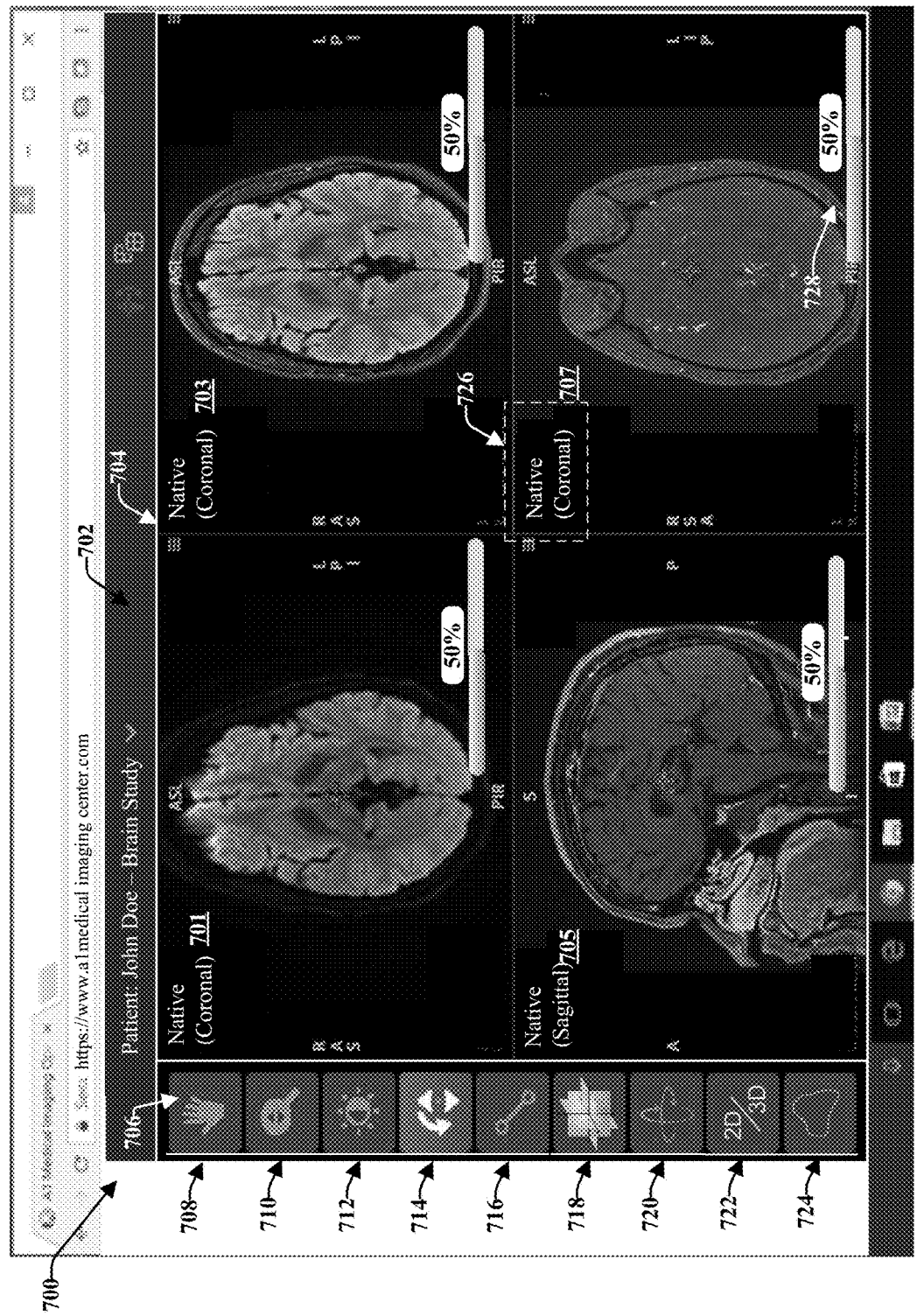

FIG. 7B depicts another representation of the GUI 700 following the initial display shown in FIG. 7A. As shown in FIG. 7B, each of the viewports can include loading bars 728 indicating a 50% loading level has been reached. In particular, in association with the initial rendering of the native medical images at initiation of the viewing session, the subject native/reconstructed medical imaging application can (e.g., concurrently or simultaneously) initiate and/or perform the appropriate back-processing associated with preparing the application to render 3D representations associated with the native medical images displayed in the respective viewports 701, 703, 705 and 707. For example, this back-end processing can involve determining the 3D compatible subset information for respective sets or subsets of native images associated with the different series represented by the respective viewports, adding the 3D compatible subset information to the data model, and/or retrieving and loading the actual native images that make up the 3D compatible subsets into local memory (e.g., cache 124) so that it is available for processing by the 3D rendering component 128. According to this example embodiment, the loading bars 728 can represent the progress of the back-end processing components in association with preparing the application to render 3D representations associated with the displayed native medical images.

Figure 7C:
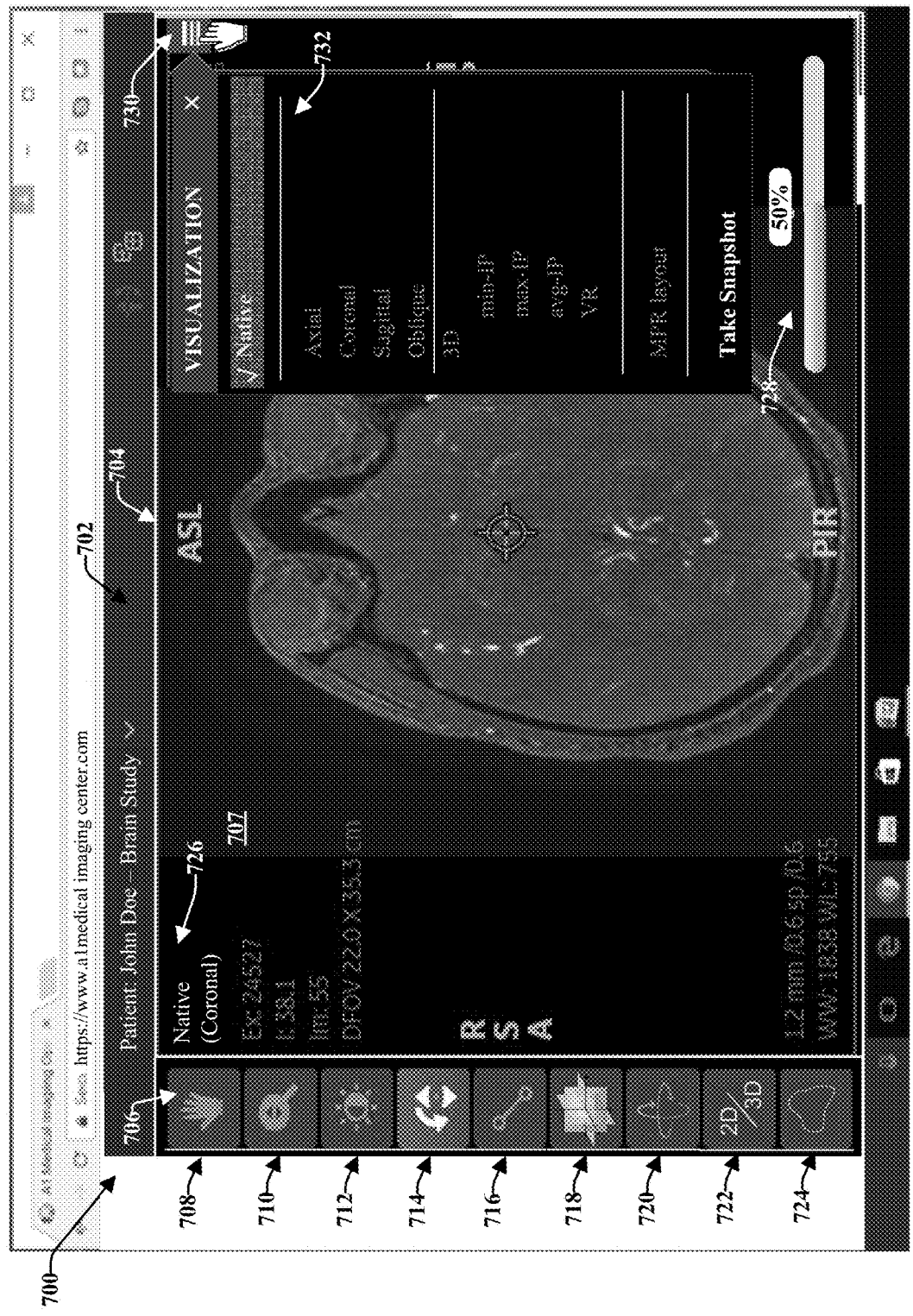

FIG. 7C depicts an enlarged view of viewport 707 prior to completion of the back-end processing operations allowing the application to render 3D representations associated with the displayed native medical image. For example, in various implementations, the respective viewports displayed in the primary display area 704 can be selected for displaying in full view, thereby encompassing the entire primary display area 704.

As shown in the enlarged view of viewport 707, in addition to overlay text 726 in the upper left hand corner of the viewport identifying the visualization type and/or orientation, the native medical image, the viewport can also display various additional text/annotations providing some description of the contents of the displayed image. For example, overlay text can be included in the viewport providing information identifying the particular, patient, study, series, study description and the like, associated with the rendered visualization (e.g., patient name, patient ID, patient birth date, study date, study description, patient age, etc.). This information can be retrieved for example from the initial fast query of the indexed medical image data information and displayed in each of the corresponding viewports included in the GUI. Further, as more detailed patient/study/series information becomes available from additional queries and/or from the actual retrieved DICOM files, this additional information can be added as overly text in the viewport (e.g., patient weight at the time of the study, referring physician name, acquisition parameters (such as sequence used for MR images), etc.). The overlay text can also include rendering parameters, such as but not limited to: view type and/or orientation, thick slab or 3D rendering mode (MIP, MinIP, Avg, VR, if applicable), view thickness (if applicable), contrast and luminosity applied (in medical terms, window width/window level), geometrical coordinates, and the like.

The GUI 700 in FIG. 7C also includes a viewport menu window 732 that can be generated in response to clicking (e.g., right clicking) on the viewport menu icon 730 in the upper right hand corner of the viewport. The viewport menu window 732 can include various selectable format options that can provide various tools for interacting with and/or controlling the appearance of the visualization that is displayed in the viewport. In various embodiments, the interface component 104 can be configured to disable or deactivate viewport menu options that provided for viewing and interacting with reconstructed medical images until the system is prepared to generate and render the reconstructed medical images (e.g., until the toolbar 728 reaches 100%). For example, in the embodiment shown, the only activated viewport menu options include the native menu option and the take snapshot menu option. For example, the selectable format option appearing as native can provide for viewing a native medical image. In the embodiment shown, because an initial native medical image is displayed, the native image menu option is shown as being currently selected. The take snapshot menu option can provide for taking a still view or screenshot of the displayed visualization (e.g., a native medial image, an annotated native medial image, a reconstructed medical image, etc.).

In the embodiment shown, the additional selection options in the viewport menu identified as axial, coronal, oblique, 3D, min-IP, max-IP, avg-IP, VR and MPR (multi-planer reformat) can respectively provide for displaying reconstructed medical images from the corresponding orientations and/or with the corresponding 3D properties. Because the toolbar 728 is only at 50%, these reconstructed medical image menu options are deactivated (e.g., shown in a lighter grey color relative to the activated and selectable native menu option and take snapshot menu option). For example, once the system is prepared to generate reconstructed images associated with the rendered native medical image (e.g., once the system has defined one or more 3D compatible subsets of images associated with the rendered native image, determined the 3D geometric properties of the 3D compatible subset, and/or received the actual images included in the 3D compatible subset), the interface component 104 can activate one or more of these additional selection options. In one aspect, once activated, selection of the axial menu option can result in the rendering of a reconstructed medial image associated with the displayed native medical image from the axial orientation. Likewise, selection of the coronal or sagittal menu options can respectively result in the rendering of reconstructed medical images associated with the displayed native medical image from the coronal and sagittal orientations, respectively. In one or more embodiments, the oblique menu option can provide for changing the orientation of a displayed reconstructed medical image to various non-canonical orientations. For example, selection of the oblique menu option can allow the user to rotate a displayed reconstructed medical image in various free form directions and/or around various freely places axis, thereby facilitating viewing a 3D model of the body part represented in the displayed native medical image from various user defined (non-canonical) perspectives in addition to the predefined canonical perspectives. The oblique menu option is discussed in greater detail infra with reference to the rotation component 612 of the control component 112. Selection of the 3D menu option can provide for generating a default 3D model associated with the displayed native medical image (e.g., in a predefined intensity or with one or more predefined 3D properties. The sub-menu options associated with the 3D menu option can provide for changing the appearance of the 3D visualization to min-IP, max-IP, avg-IP and VR, respectively. In addition, selection of the MRP layout menu option can provide for changing the GUI to a defined viewport layout that includes one or more viewports showing the native medical image and one or more additional viewports showing reconstructed medical images associated with the native medical image.

Figure 7D:
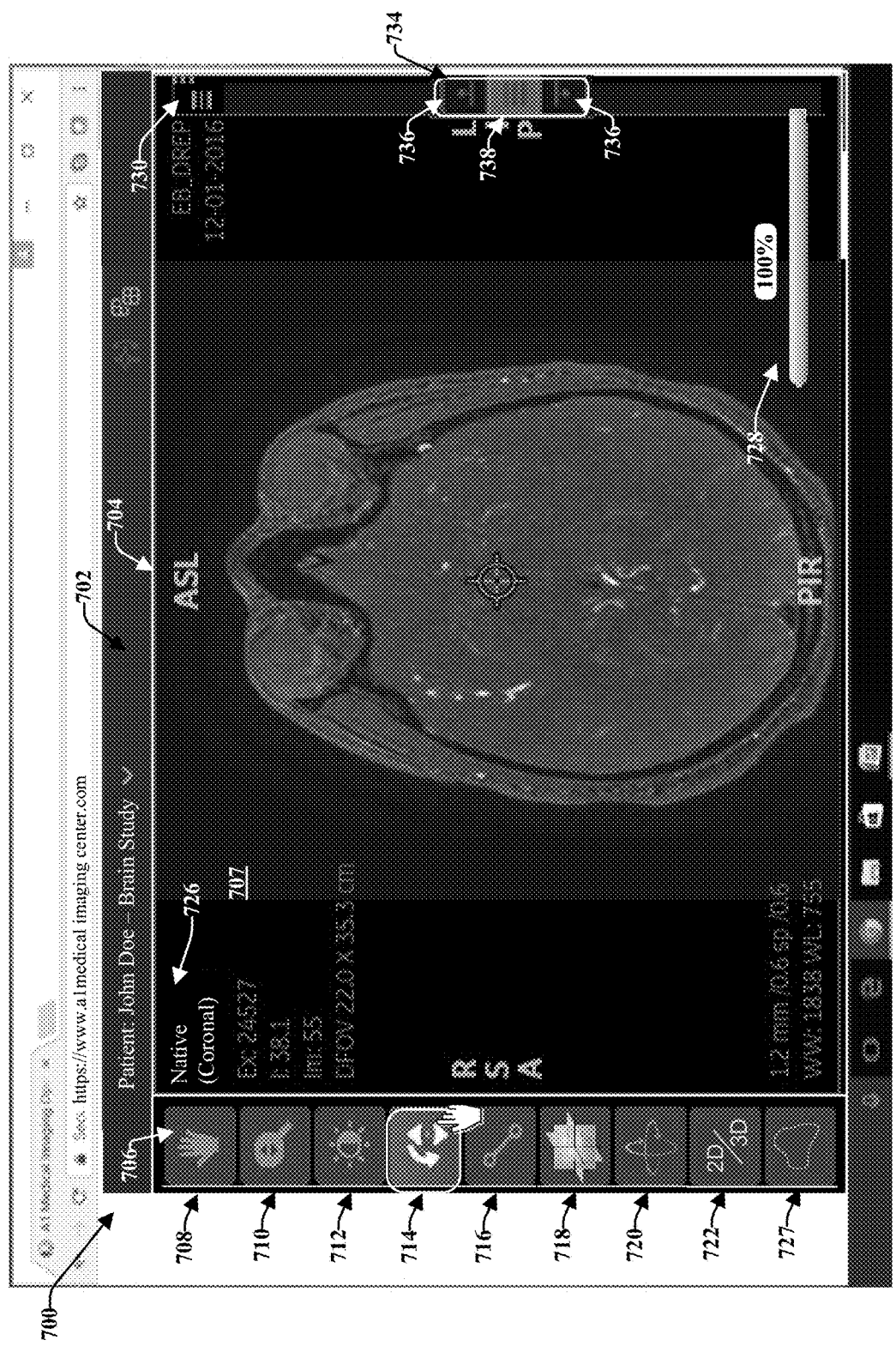

FIG. 7D depicts an enlarged view of viewport 707 after completion of the back-end processing operations allowing the application to render 3D representations associated with the displayed native medical image. For example, as shown in FIG. 7D, the loading bar 728 has reached 100%. In various implementations, after the loading bar reaches 100%, it can be dismissed from the display area and various control icons/functions that provide for transitioning between the displayed native medical image and one or more 3D representations associated with the native medical image can be provided and/or activated. For example, as shown in FIG. 7D, in one or more embodiments, once the 3D compatible data has been developed and/or is available for rendering a 3D reconstruction of the displayed native medical image, the control icon 714 can be selected. In various implementations, the control icon 714 can provide the corresponding features and functionalities of the thickness modification component 602. In this regard, selection of the control icon 714 can provide for changing the thickness of the displayed visualization, thereby facilitating transitioning between viewing a native 2D medical image of the body part to viewing a reconstructed 3D image of the body part.

For example, in the embodiment shown, selection of the control icon 714 can result in the generation of a thickness bar 734 shown on the far right side of the primary display area 704. (In other implementations, the thickness bar 734 can automatically be displayed in the viewport upon completion of the back-end 3D rendering preparation). The thickness bar 734 can include extendable handles 736 provided on opposite sides of a base point 738. In order to increase the thickness of the displayed visualization (e.g., the native medical image in this scenario), the handles 736 can be pulled apart to extend the length of the thickness bar 734. In the embodiment shown, the visualization displayed in the primary display area 704 is a still the native 2D image. Accordingly, the thickness bar 734 is set to the minimum length wherein the handles 736 are adjacent to the base point 338.

Figure 7E:
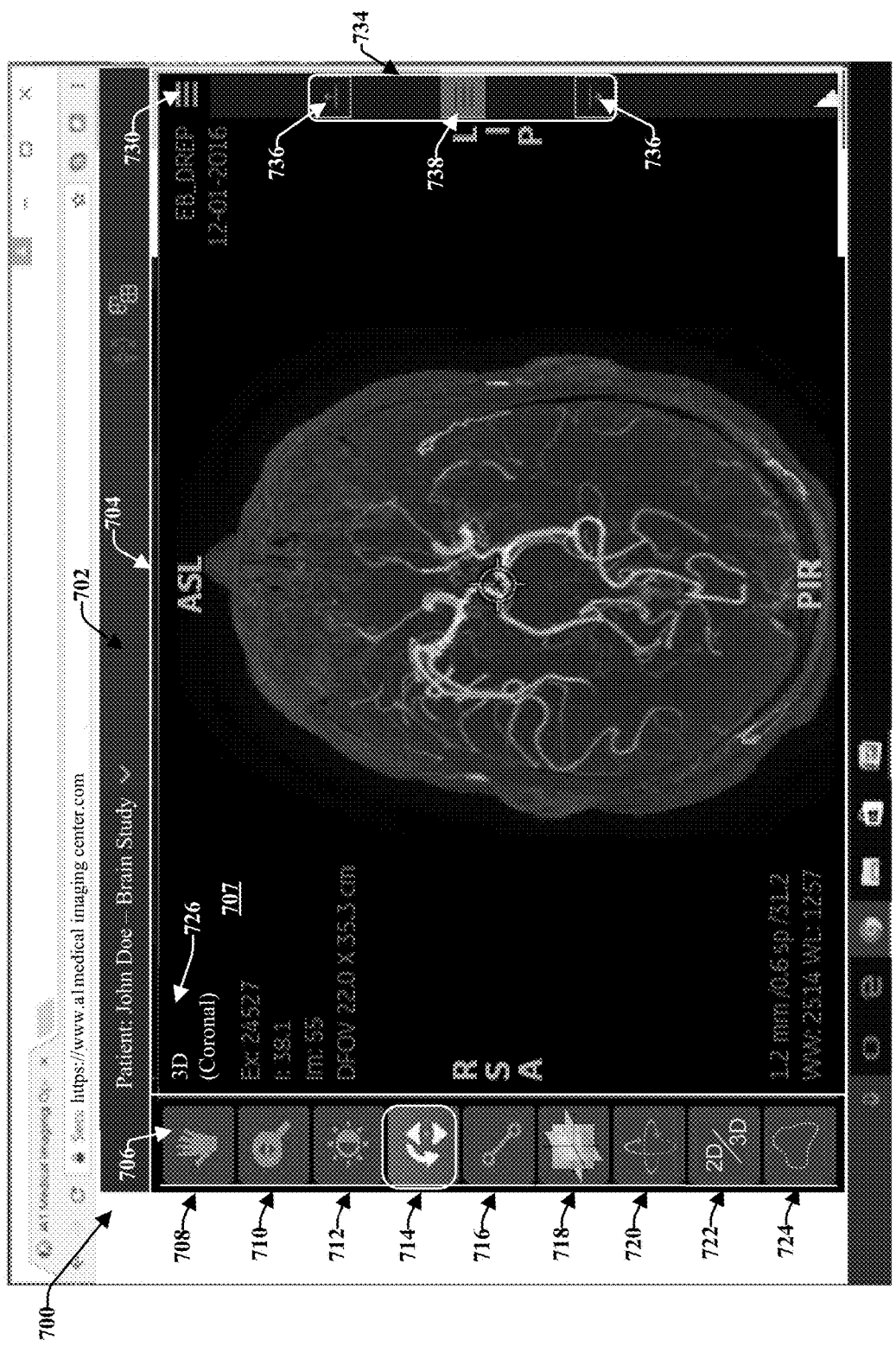

FIG. 7E depicts an enlarged view of viewport 707 after increasing the length of the thickness bar 734 from the visualization displayed in FIG. 7D in accordance with one or more embodiments. As shown in FIG. 7E, the handles 736 of the thickness bar have been slid or pulled apart from the base point 338. As a result, the native visualization shown in FIG. 7D has been replaced with a 3D reconstructed version of the native image in the same viewport 707. For example, the overly text 726 in the upper left hand corner of the viewport now indicates the visualization displayed therein is a 3D image as opposed to a native image. The orientation of the 3D image is coronal. For example, in various embodiments, the thickness modification provided by the thickness bar 734 can allow a user to adapt the displayed visualization by increasing or decreasing the 3D volume in a direction parallel to the plane coinciding with the display orientation. Thus because the underlying native medical image was captured and displayed form coronal orientation, the corresponding 3D reconstructed images generated therefrom in response to expansion of the thickness bar 734 will also be shown from the coronal orientation.

However, in various embodiments the control component 112 can provide one or more mechanisms for changing the orientation of a 3D visualization displayed in the primary display area 704 (e.g., provided by the orientation selection component 606 and the rotation component 612 and the plane selection component 616). For example, by selecting a different orientation or changing the orientation of the displayed image in association with selection of the axial, coronal, sagittal or oblique menu options from the viewport menu 732, a user can direct the interface component 104 to render the 3D visualization shown in FIG. 7E from a different orientation (e.g., axial, sagittal or an oblique orientation). Further, after a new visualization is generated from a new orientation, the user can also use the thickness modification component 602 (e.g., embodied by the thickness bar 734) to adjust the thickness of the new visualization in the new orientation in a direction parallel to the plane defined by the new orientation.

Figure 7F:
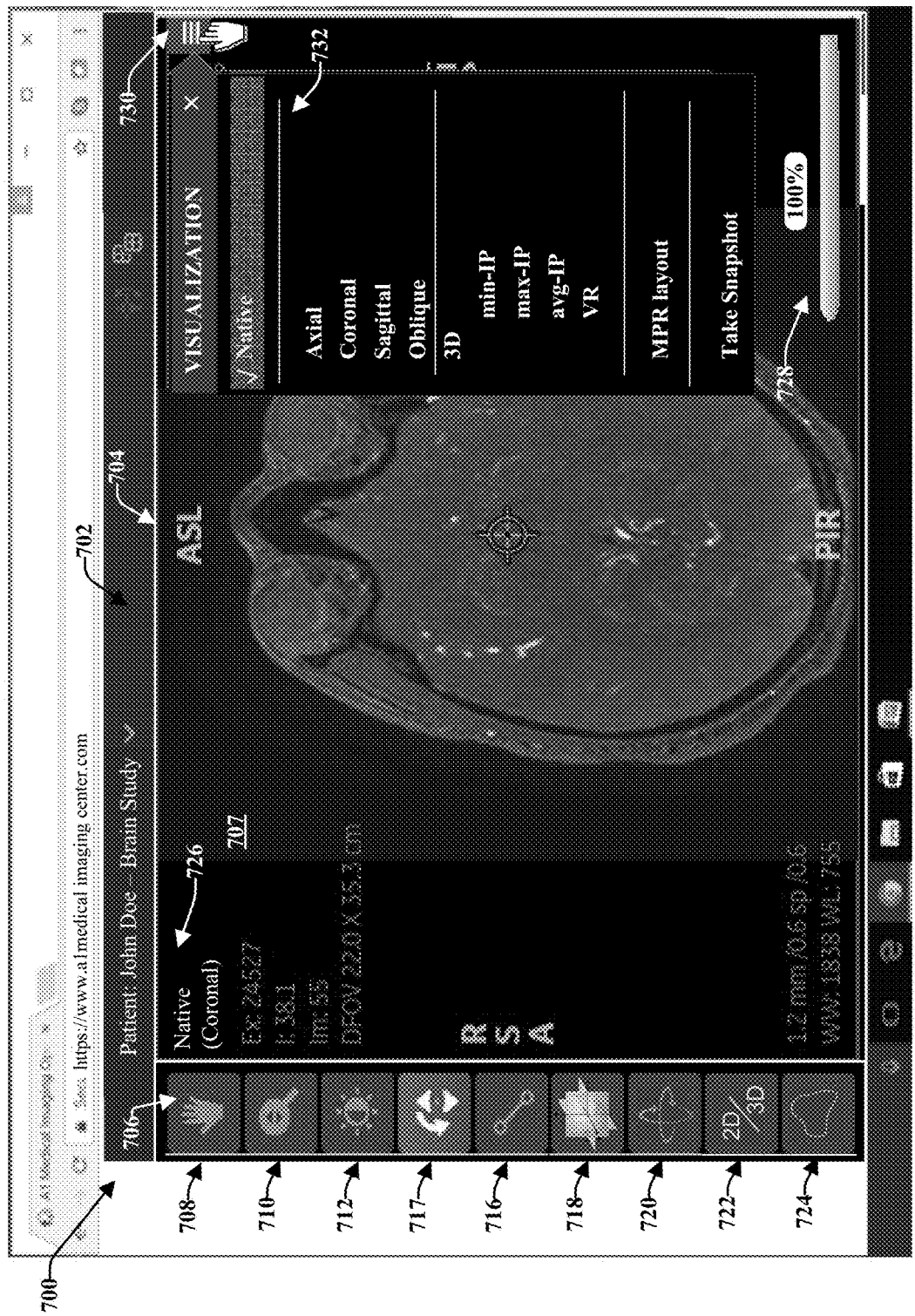

FIG. 7F depicts an enlarged view of viewport 707 after completion of the back-end processing operations allowing the application to render 3D representations associated with the displayed native medical image and selection of the viewport menu icon 730. As shown in FIG. 7F, now that the displayed native image is 3D compatible, the additional viewport menu options associated with rendering the displayed native medical image in 3D and/or changing the orientation of the 3D visualization are activated. However because the native format option is still selected, the displayed visualization still includes the original native image.

Figure 7G:
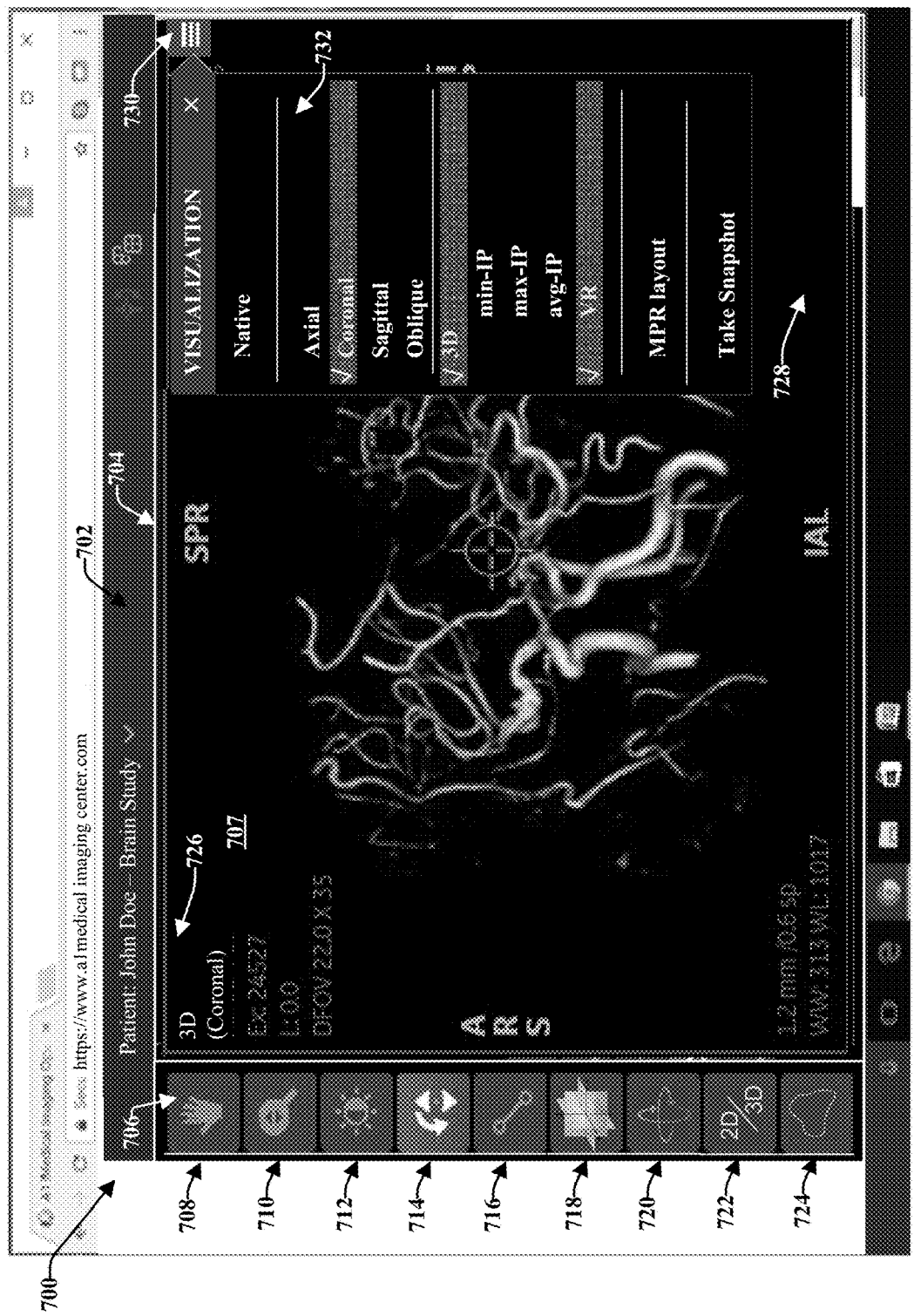

FIG. 7G depicts an enlarged view of viewport 707 after selecting the coronal, 3D and VR format options from the viewport menu window 732 in association with the visualization displayed in FIG. 7F. As shown in FIG. 7H, selection of the 3D and VR format options results in replacing the native medical image presented in FIG. 7F with a reconstructed volumetric 3D rendering from a coronal orientation that was generated based on a subset of 3D compatible images associated with the native medical image depicted in FIG. 7F.

With reference again to FIG. 6, in various embodiments, the control component 610 can include area selection component to select an area or volume of a displayed 3D reconstruction to be rendered as a separate 3D reconstruction. The area selection tool can be used for example to select a portion of a display body part that includes an affected area (e.g., the area with the fracture, with the tumor, etc.). For example, after a 3D reconstruction is displayed in the GUI, using the area selection feature provided by the area selection component 610, the user can define an area or volume of the displayed 3D reconstruction for cutting out and viewing as a separate (e.g., enlarged), 3D reconstruction. In this regard, the area selection tool can function as a medical scalpel that allows a user to cut out a particular area or volume of a body part included in a displayed 3D visualization for viewing as a separate visualization. For instance, in some implementations based on selection of the area selection tool, the user can be provided with a scalpel or drawing tool that allows the user to otherwise generate a shape over a 3D image that defines an area of the 3D image. In some implementations, the area selection tool can allow the user to draw on the displayed 3D reconstruction in free form or using a defined selection shape (e.g., a sizable rectangle). For example, using a free form selection tool of a 3D image of a patient's heart, the user could draw a free form shape around only a part of the heart (e.g., the aorta, the right ventricle, the left ventricle, etc.). In other implementations, the selection tool can restrict the type of selectable shapes (e.g., to a circular shape, a rectangular shape, etc.).

Once the area or volume is defined and selected, the 3D rendering component 128 can provide a new 3D reconstruction of only the selected area/volume for displaying in the GUI. According to these embodiments, the viewport component 106 can be configured to activate the area selection component 610 once the native/reconstructed medical imaging system 100 is prepared to render 3D reconstructed versions of the native images (e.g., once the 3D compatible medical image data has been added to the data model 120 and/or the 3D compatible native medical images have been retrieved).

Figure 8A:
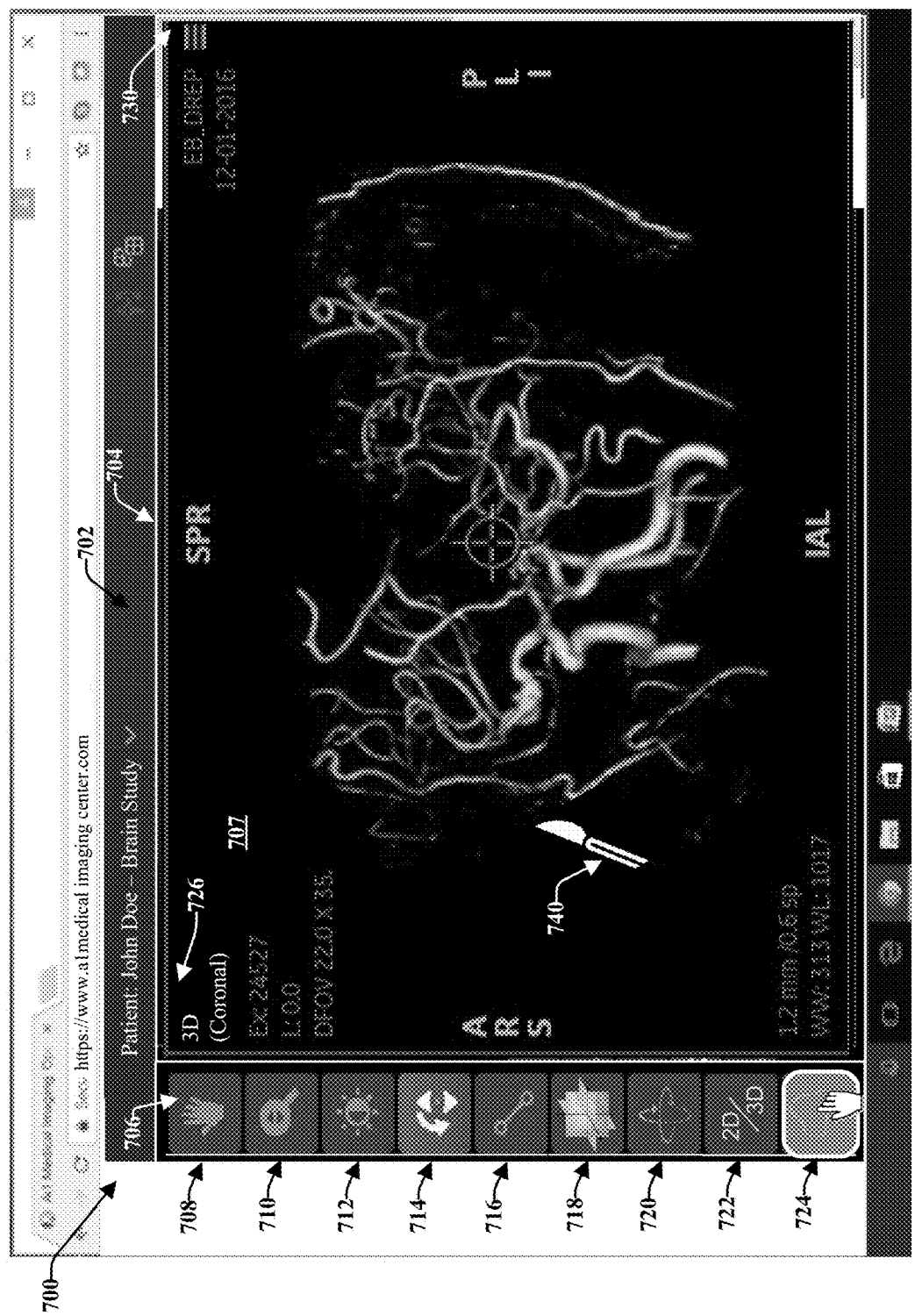
FIGS. 8A-8C provide a sequence of visualizations that further demonstrate the features and functionalities of the area selection component in accordance with various aspects and embodiments described herein.
Figure 8B:
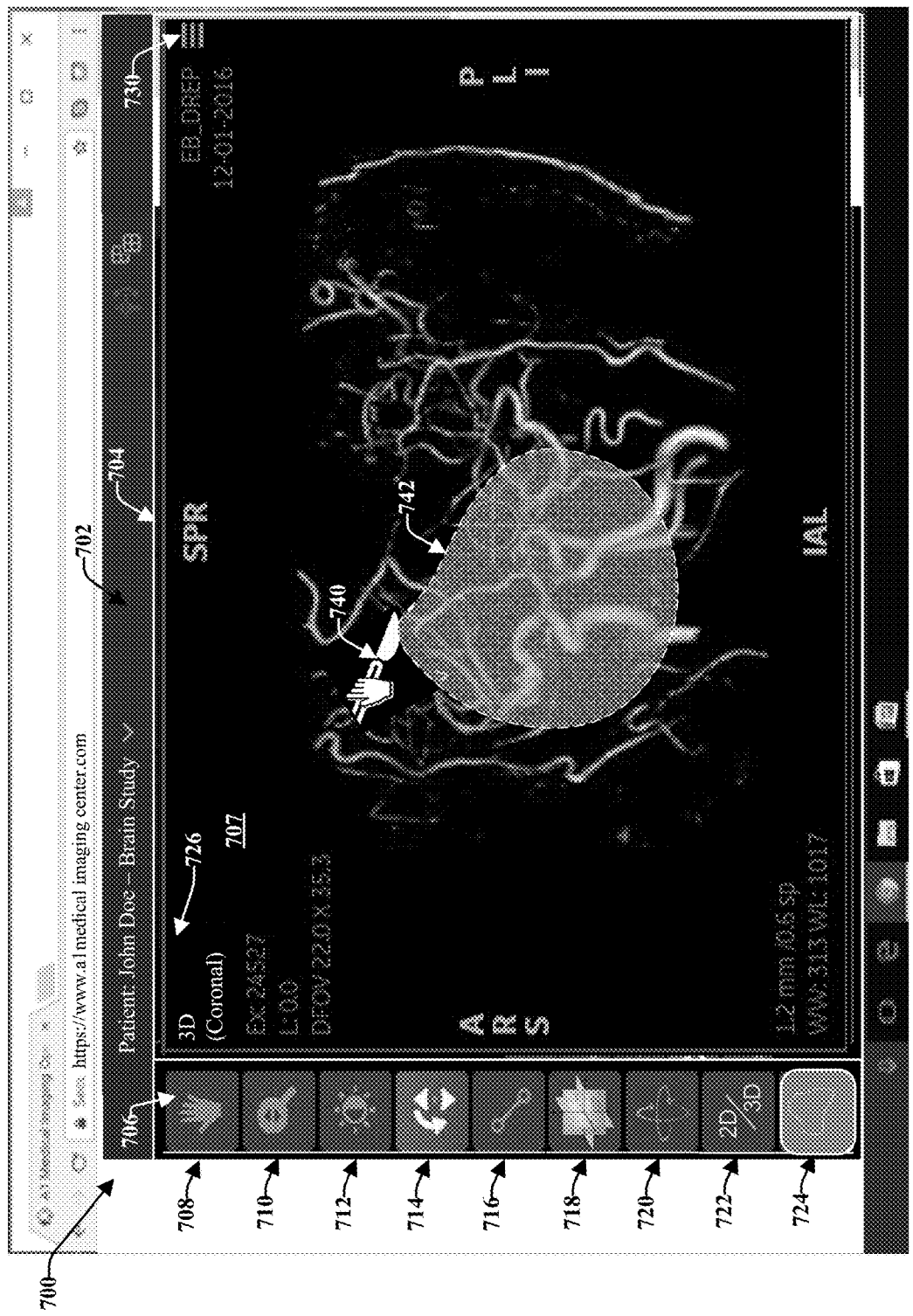
Figure 8C:
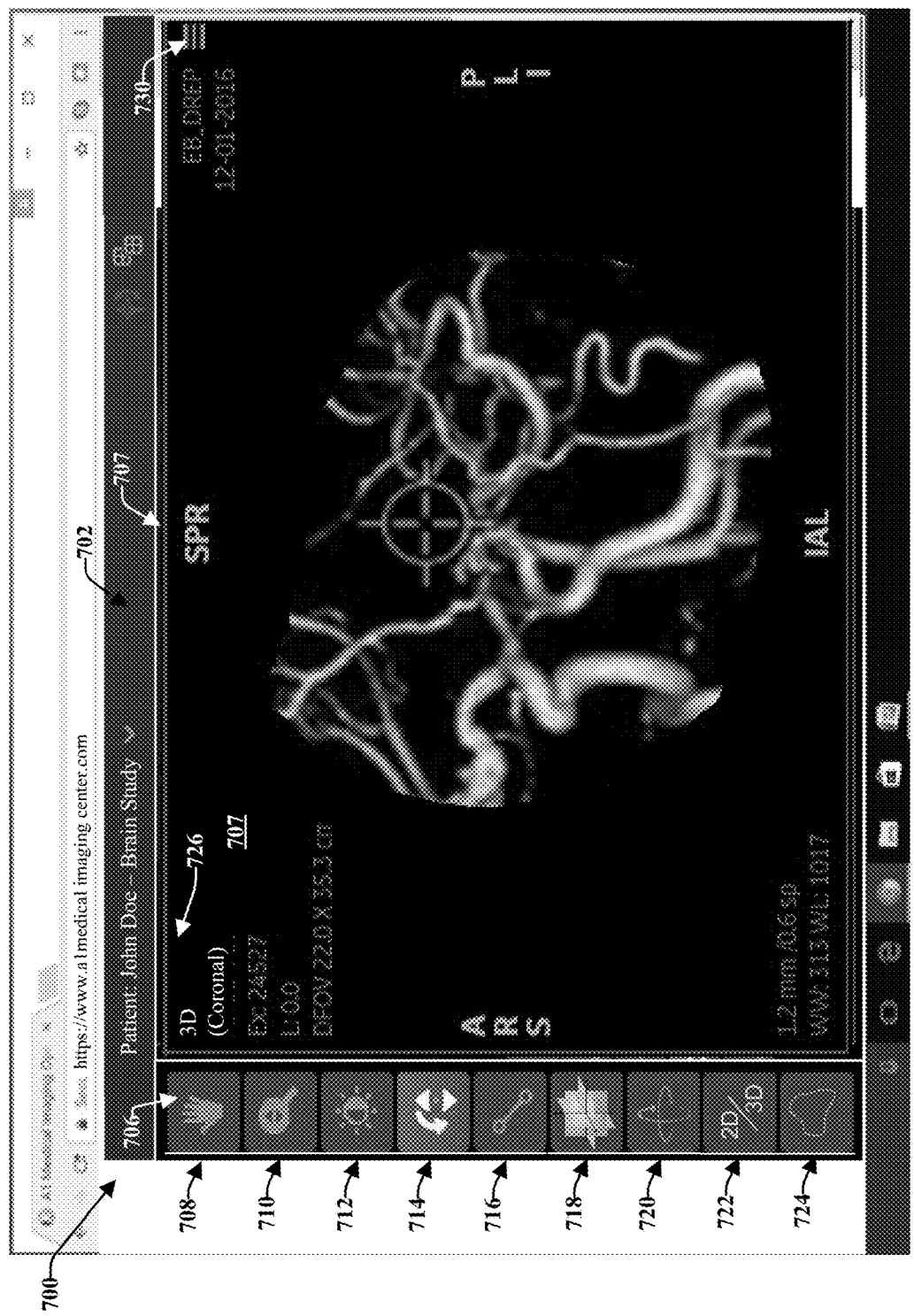

For example, FIGS. 8A-8C provided a workflow depicting one or more features and functionalities of the area selection component 610 in accordance with one or more embodiments described herein. In particular, FIG. 8A depicts another enlarged view of viewport 707 including the reconstructed volumetric rendering presented in FIG. 7H with the viewport menu window 732 dismissed. In addition, the control icon 724 corresponding to the area selection control has been selected. In accordance with this example implementation, selection of the area control icon 724 can provide one or more features and functionalities of the area selection component 610. For example, in the embodiment shown, a scalpel tool 740 can be generated and presented in the primary display area 704 in response to selection of the control icon 724. In various implementations, the scalpel tool can only be used to define areas or volumes associated with 3D images. Thus in various implementations, the interface component 104 can be configured to activate the scalpel too only in association with display of a 3D visualization in the primary display area. As shown in FIG. 8B, using the scalpel tool 740, the user can draw on the displayed visualization to select an area 742 for rendering separately as an enlarged reconstructed image. FIG. 8C presents the resulting enlarged view of area 742 rendered as volumetric 3D rendering.

In one or more additional embodiments, the area selection component 610 can also provide for selecting an area of a native 2D image of a body part displayed in the primary display area 704 of the GUI for viewing as a 3D model of the body part. In this regard, the area selection component 610 can allow the user to select an area of the 2D image that is less than the total area of the 2D image. Based on reception of user input indicating a defined area of a native 2D image, the selection component 110 can be configured to determine a volume associated with the selected area. Then using the 3D compatible information in the data model, the selection component 110 can determine a subset of coherent native 3D images to from the 3D reconstruction with the volume corresponding to the selected area. The selection component 110 can further direct the 3D rendering component 128 to generate the corresponding 3D representation. For example, in furtherance to the above example, based on selection of an area corresponding to only the aorta of a native 2D image of the patient's heart, using the 3D compatible information in the data model, the 3D rendering component can generate a 3D model of only the aorta. The 3D model can further be rendered in the GUI.

Figure 9A:
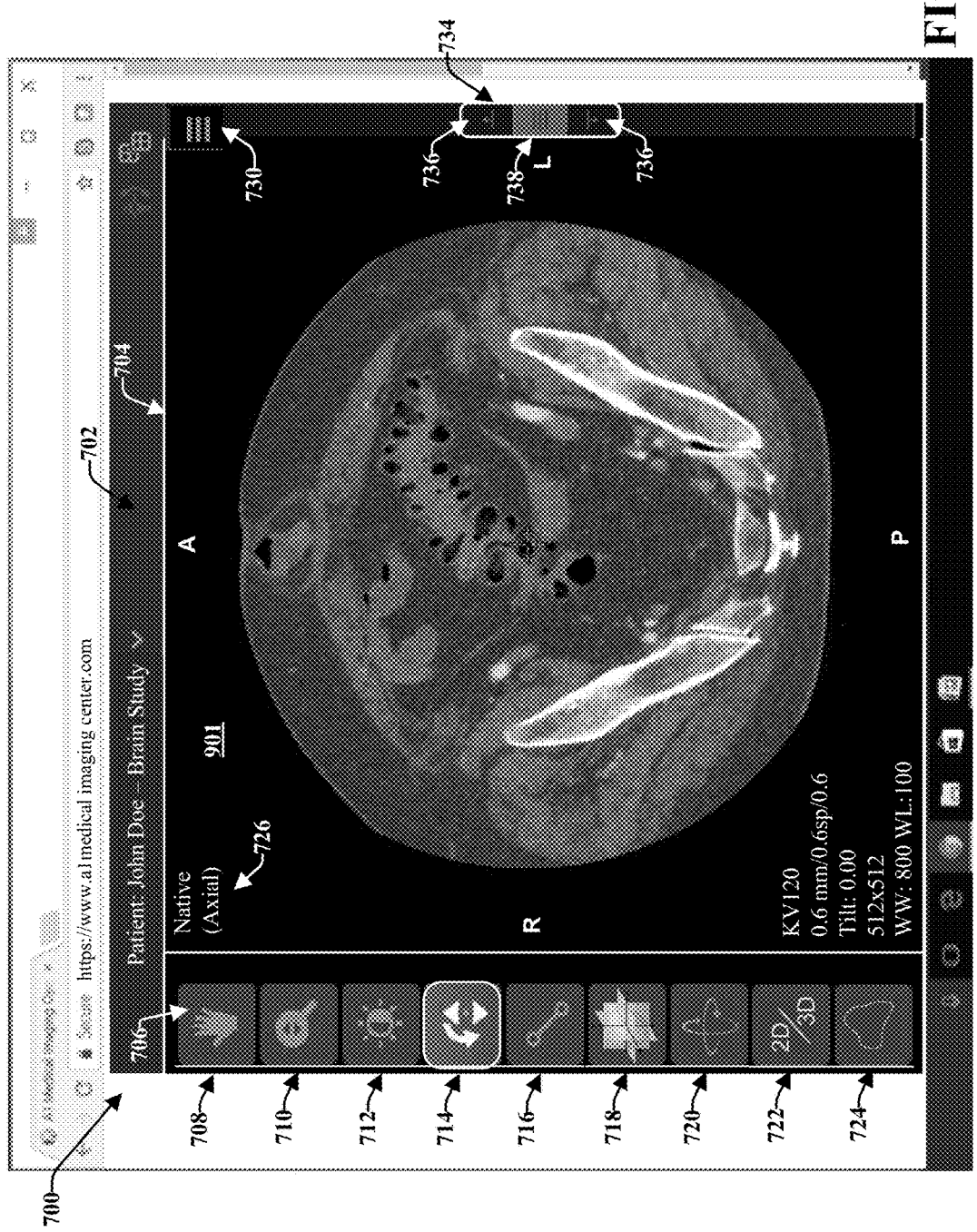
FIGS. 9A-AC provide a sequence of visualizations that further demonstrate the features and functionalities of the thickness modification component in accordance with various aspects and embodiments described herein.
Figure 9B:
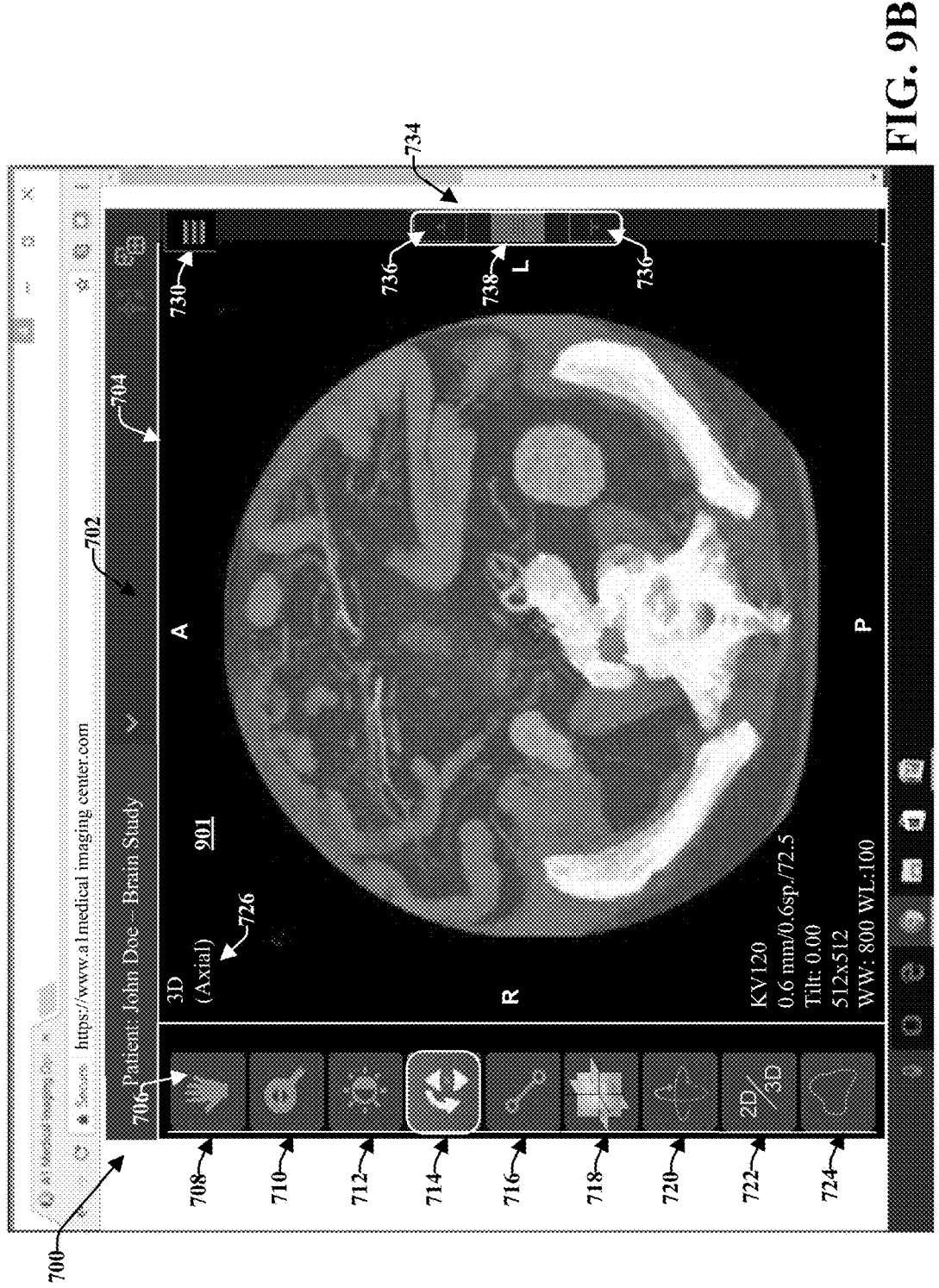
Figure 9C:
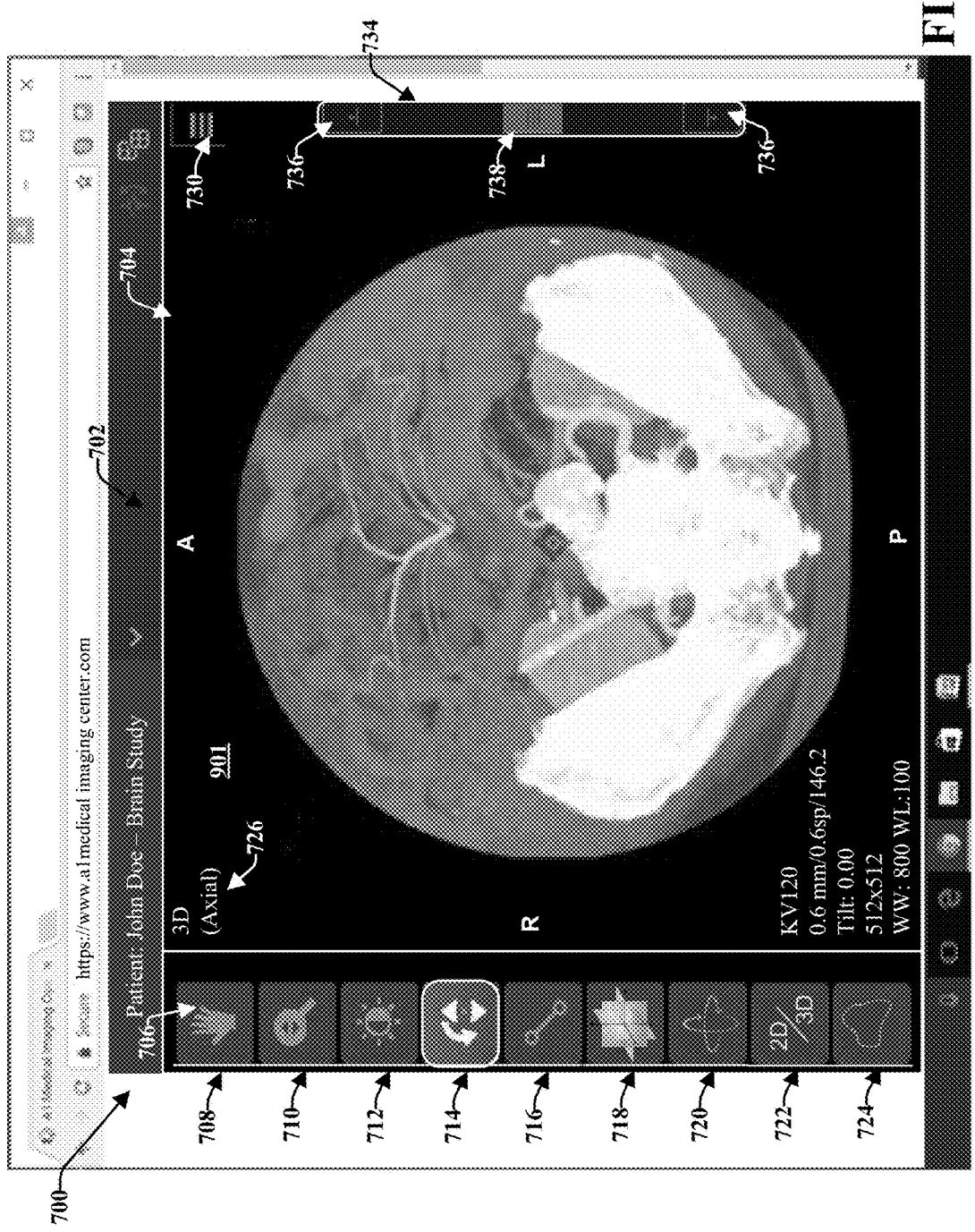

FIGS. 9A-9C provide a sequence of visualizations rendered in GUI 700 that further demonstrate the features and functionalities of the thickness modification component 602 in accordance with various aspects and embodiments described herein. Repetitive description of like elements employed in respective embodiments is omitted for sake of brevity.

With to FIG. 9A, in the embodiment shown, a single viewport 901 is displayed including an axial native medical image generated from a CT scan of the patient's brain. The control icon 714 is selected that provides for changing the thickness of the displayed visualization. Because a native image is currently displayed, the thickness bar 734 is shown as being set to the minimum length wherein the handles 736 are adjacent to the base point 738.

FIG. 9B demonstrates how the visualization in the viewport 901 can change in response to extending the length of the thickness bar 734 from its minimum length. In particular, as shown in FIG. 9B, the length of the thickness bar 734 has been increased and the handles 736 of the thickness bar are respectively separated from the base point 738. As a result the visualization displayed in the viewport 901 has changed from a native 2D image captured from the axial orientation to a 3D reconstructed image rendered from the axial orientation. In one or more embodiments, the thickness or volume of the reconstructed image can be based on the length of the thickness bar 734. For example, as noted in the text in the lower left hand corner of the viewport 901, the thickness or volume of the 3D image is set to a value of 32.5 (wherein the thickness or volume of the native 2D image displayed in FIG. 9A was set to the default value of 0.6).

FIG. 9C demonstrates how the visualization in the viewport 901 can further can change in response to extending the length of the thickness bar 734 even further. In particular, as shown in FIG. 9C, the length of the thickness bar 734 has been increased from its position in FIG. 9B and the handles 736 of the thickness bar are respectively separated even farther from the base point 738. As a result the visualization displayed in the viewport 901 has changed from a 3D image with a thickness or volume of 32.5 to a 3D image with a thickness or volume of 146.2.

In the embodiments shown in FIGS. 9A-9C, the opposite handles 736 of the thickness bar are moved equal distances from the base point 738. In some implementations, the movement of the respective handles 736 can be synchronized such that movement of one of the handles 736 causes the opposing handle to move the same amount away from the base point 738. According to these implementations, the cross-sectional position of the original 2D medical image of the body part for which the 3D image of the body part is based will remain the center point/plane of the 3D image. In other words, the 3D image generated from a native 2D image in response to increasing the length of the thickness bar will include an equal volumetric amount of the body part above and below the position of the plane defined by the native 2D image. However in other implementations, movement of one of the handles 736 can be independent from the other. For example, movement of only one of the handles 736 in the upward direction can cause the volume of the 3D image to expand only in the upward direction from the cross-sectional position of the original 2D medical image. Likewise, movement of only one of the handle in the downward direction can cause the volume of the 3D image to expand only in the downward direction from the cross-sectional position of the original native 2D medical image.

FIGS. 10A-10D provide another sequence of visualizations that can be rendered in GUI 700 that further demonstrate the features and functionalities of the thickness modification component 602 in accordance with various aspects and embodiments described herein. Repetitive description of like elements employed in respective embodiments is omitted for sake of brevity.

In some implementations, the thickness modification component 602 can further provide for transitioning to viewing a native 2D image of the body part based on interaction with the 3D image at a newly selected orientation. For example, as previously described, the thickness modification component 602 can provide for receiving user input that decreases the thickness of a displayed 3D image. Based on decreasing the thickness to a minimum thickness, the selection component 110 can select, based on the data model 120, a native 2D image for rendering that presents the cross-sectional area of the decreased volumetric shape of the 3D image. In this regard, the plane represented by the cross-sectional area will be determined based on the current orientation of the displayed 3D image. According to these embodiments, the native medical image data 132 can include a plurality of native 2D images of the body part respectively corresponding to cross-sectional areas of the body part captured from different possible orientations for viewing a 3D image of the body part. For example, in some implementations, the native 2D image data can include a plurality of 2D images that correspond to different cross-sections of the body part captured from an axial orientation, a coronal orientation, and/or sagitattal orientation. According to this example, if input is received that decreases a thickness of a 3D image displayed in a particular canonical orientation for which a native 2D image exists (e.g., axial, coronal, sagittal, etc.) to a minimum thickness, using the information in the data model 120 describing the input native medical images available, the selection component 110 can be configured to select the native 2D image of the body part captured from the same particular or orientation that presents the cross-sectional area of the body part included within the minimum volume. The native image processing component 126 can further return the selected native medical image for rendering in the GUI (e.g., by the interface component 104).

Figure 10A:
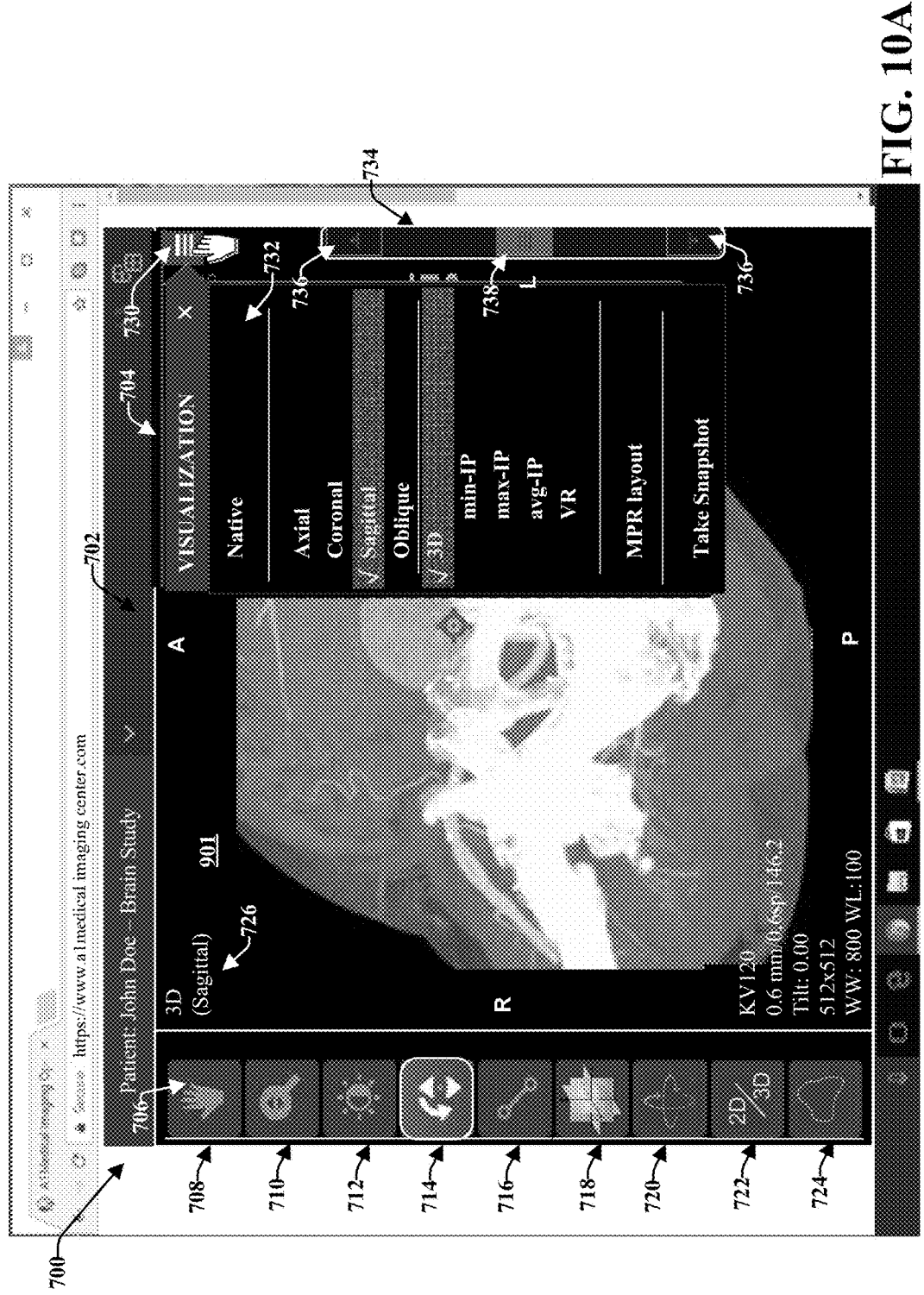
FIGS. 10A-10D provide a sequence of visualizations that further demonstrate the features and functionalities of the orientation modification component and the thickness modification component in accordance with various aspects and embodiments described herein.
Figure 10B:
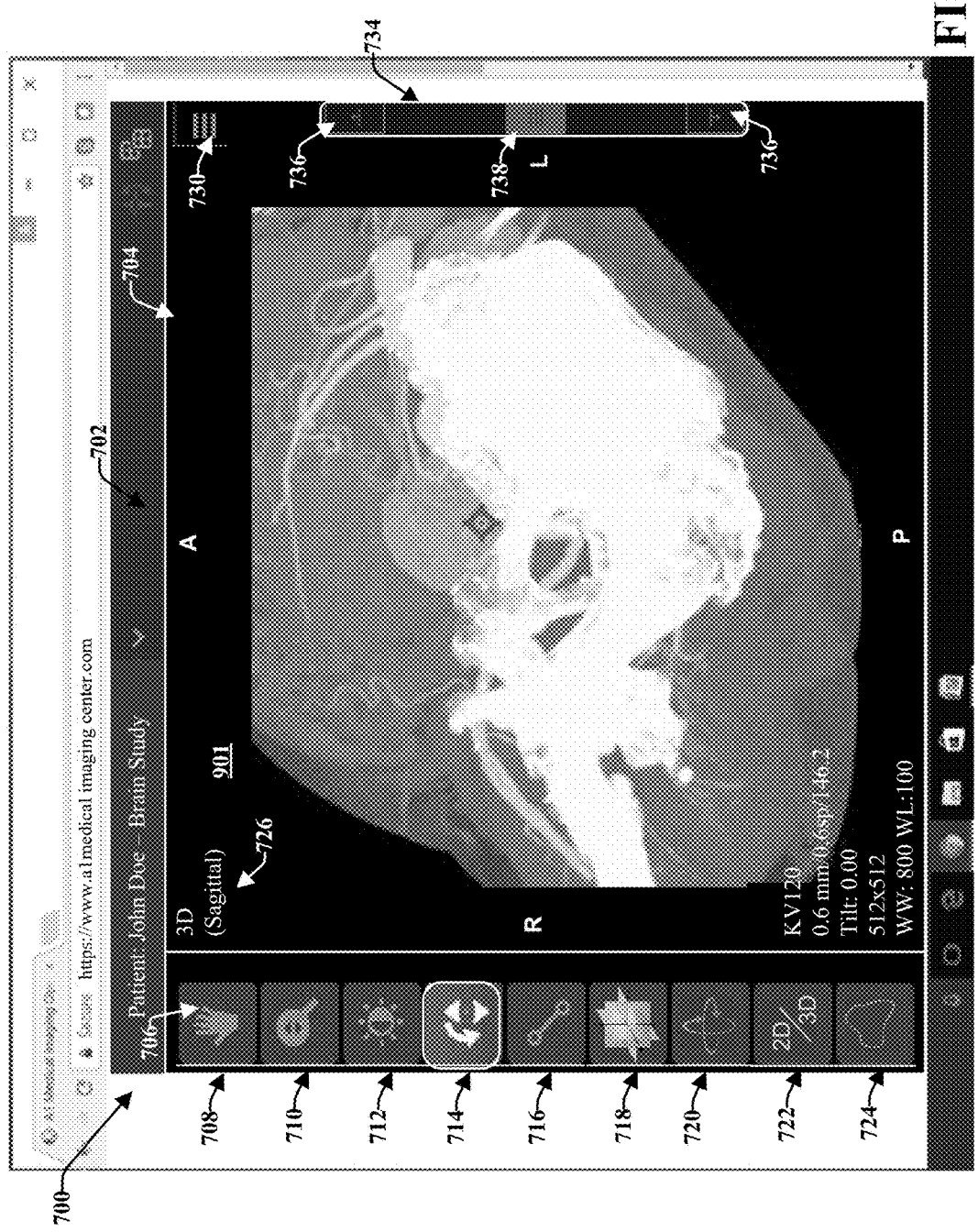

For example, FIG. 10A demonstrates how the 3D visualization shown in FIG. 9C can change from an axial orientation to a sagittal orientation in response to selection of the sagittal orientation from the viewport menu 732. The resulting visualization is a sagittal 3D image (as noted by the overlay text 726). FIG. 10B shows the same GUI and viewport 901 embodiment of FIG. 10A with the viewport menu dismissed.

Figure 10C:
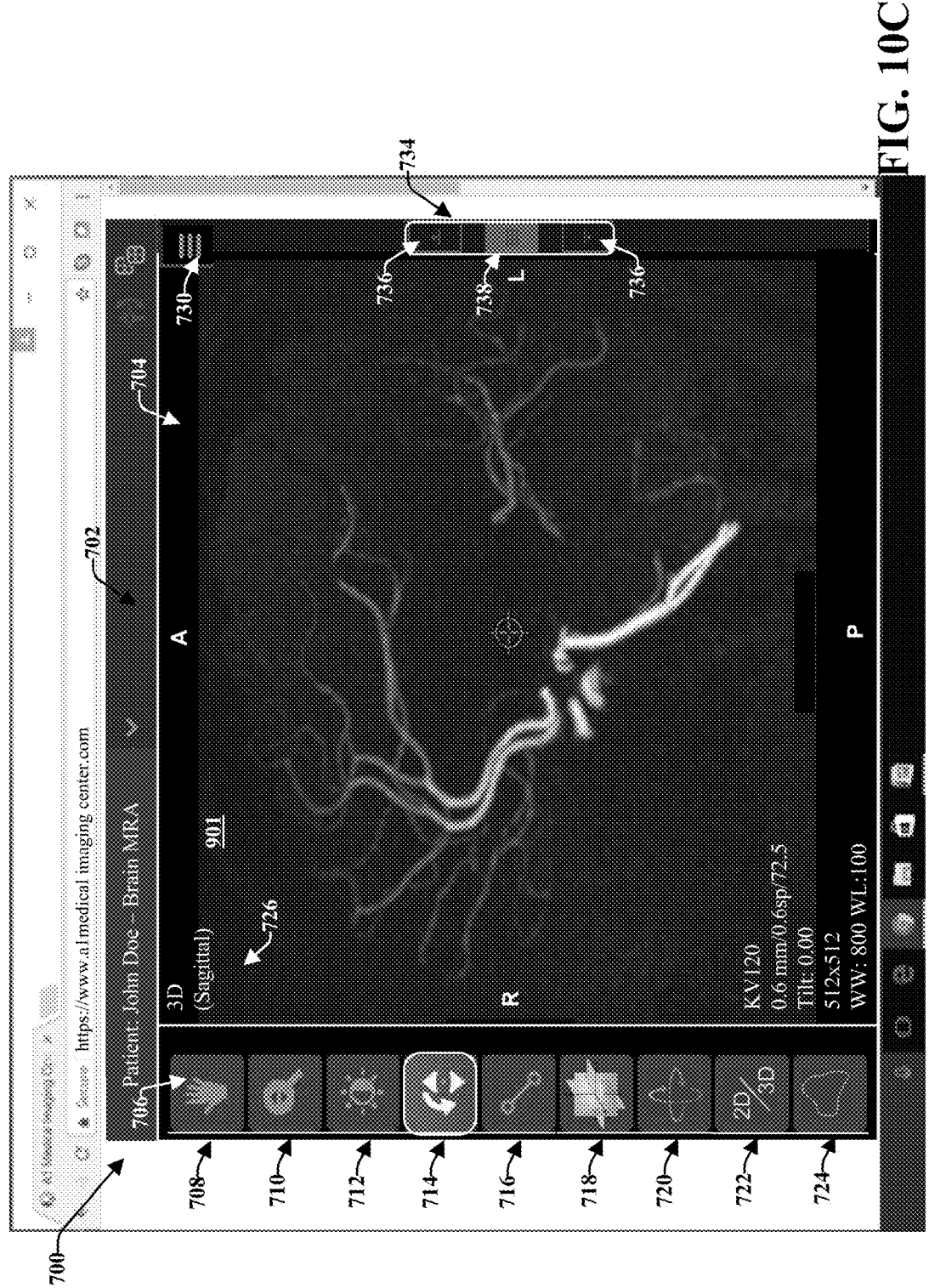

FIG. 10C demonstrates how the visualization presented in the viewport 901 in FIG. 10B can change in response to partially decreasing the length of the thickness bar 734. As shown in FIG. 10C, the length of the thickness bar has been substantially decreased, although it has not reached its minimum length. For example, the handles 736 are partially separated from the base point 738. The resulting visualization shown in FIG. 10C is thus a saggital 3D image having a depth appearance or thickness that corresponds to the length of the thickness bar 734 (e.g., 37.5, as noted in the text in the lower left corner of the viewport).

Figure 10D:
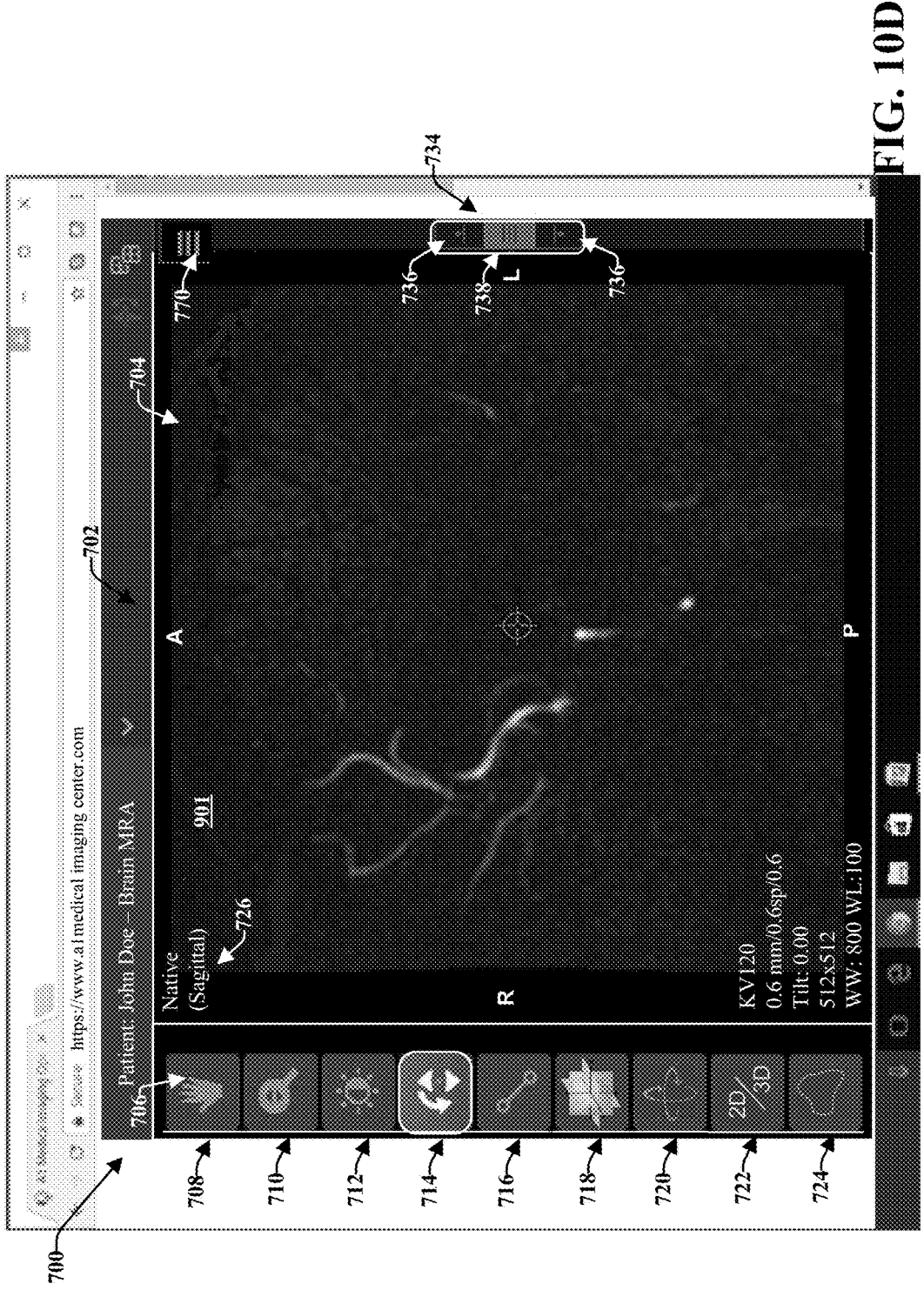

FIG. 10D demonstrates how the visualization presented in FIG. 10C can change in response to further decreasing the length of the thickness bar 734 to its minimum length. In particular, as shown in FIG. 10D, the resulting visualization displayed in viewport 901 is now a native 2D image of the body part depicted in the previous screen. The orientation of the native 2D image is the same as that as the previous 3D image from which the subject native medical image is based, sagittal. In an aspect, this native sagittal image is shown as opposed to a reconstructed 2D view of the body part from this sagittal orientation because a native 2D image from this saggital perspective was available in the original selected data set. Thus when available, native images are rendered over reconstructed 2D images.

With reference again to FIG. 6, in one or more embodiments, the rotation component 612 can provide for changing the orientation a 3D medical image displayed in primary display area of the GUI. For example, in one or more embodiments, the rotation component 612 can allow a user to rotate a 3D model up to 360° in three or more dimensions (e.g., about an x-axis, a y-axis, a z-axis, and additional axis running through a center point of the 3D model) as displayed within the primary display area 704. In some implementations, in association with rotating a 3D model, the rotation component 612 can also provide for defining the rotation axis. For example, the rotation component 612 can allow a user to define a rotational axis through any part of the 3D model in any direction. In this regard, the rotation component 612 can essentially allow the user to rotate and view a 3D model of a body part from any perspective, including non-canonical perspectives. In accordance with the subject disclosure, any non-canonical orientation (or non-predefined orientation) is referred to herein as an oblique orientation.

In various embodiments, based on user input indicating a change in orientation of a 3D image displayed in the primary display area, the selection component 110 can be configured to determine (e.g., using the information provided by the data model 120) the visual and geometric parameters for a new 3D image of the body part having an orientation corresponding to the changed orientation. For example, based on the initial 3D model displayed, the amount of rotation, the axis of rotation and the direction(s) of rotation implied by the user input, the selection component 110 can determine a desired new perspective for viewing the body part represented in the previous 3D image. The 3D rendering component 128 can further generate and provide a new 3D image of the body part from the desired new perspective that can be displayed in the primary display area (e.g., via the interface component 104).

Figure 11A:
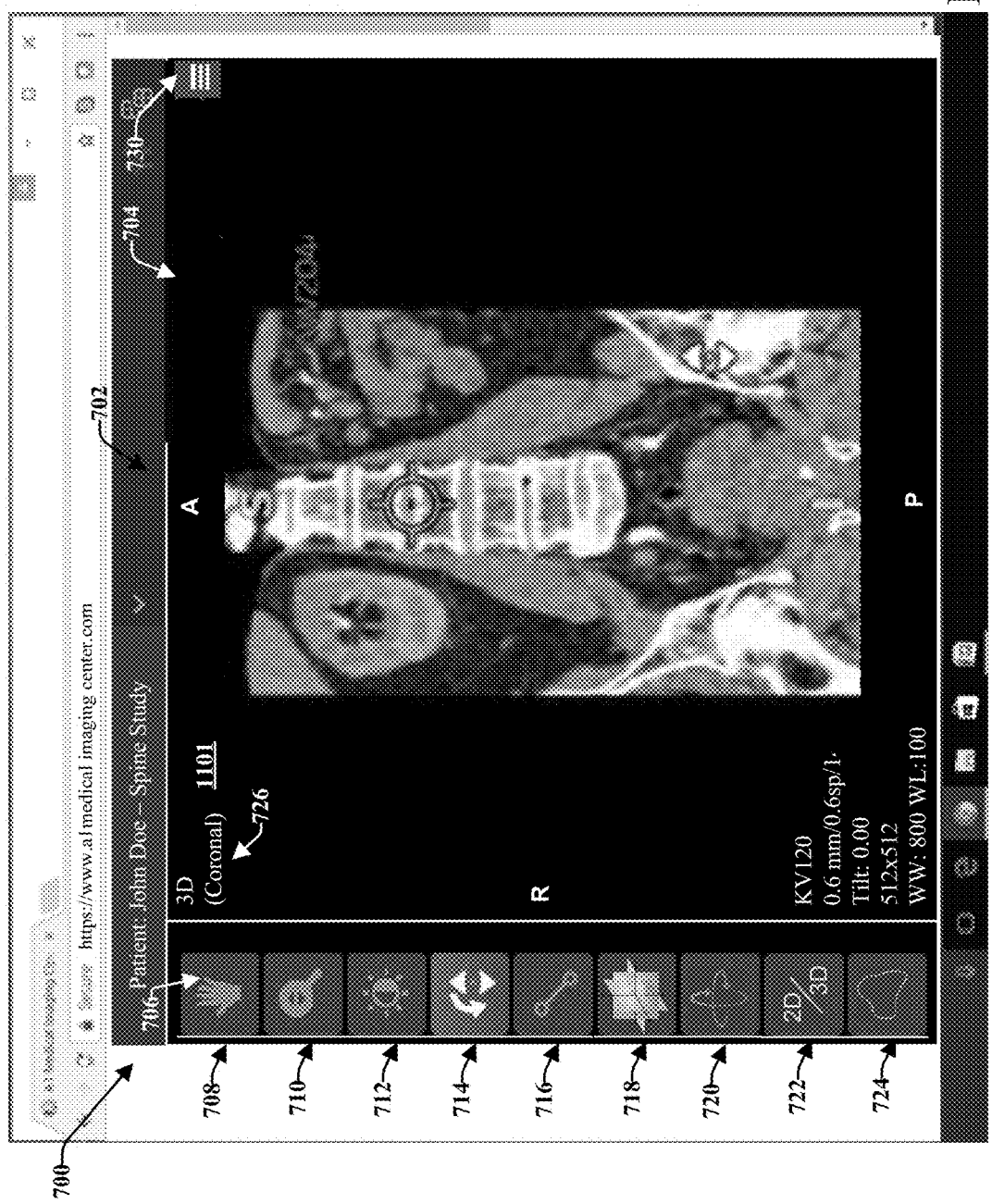
FIGS. 11A-11C provide a sequence of visualizations that further demonstrate the features and functionalities of the rotation component in accordance with various aspects and embodiments described herein.
Figure 11B:
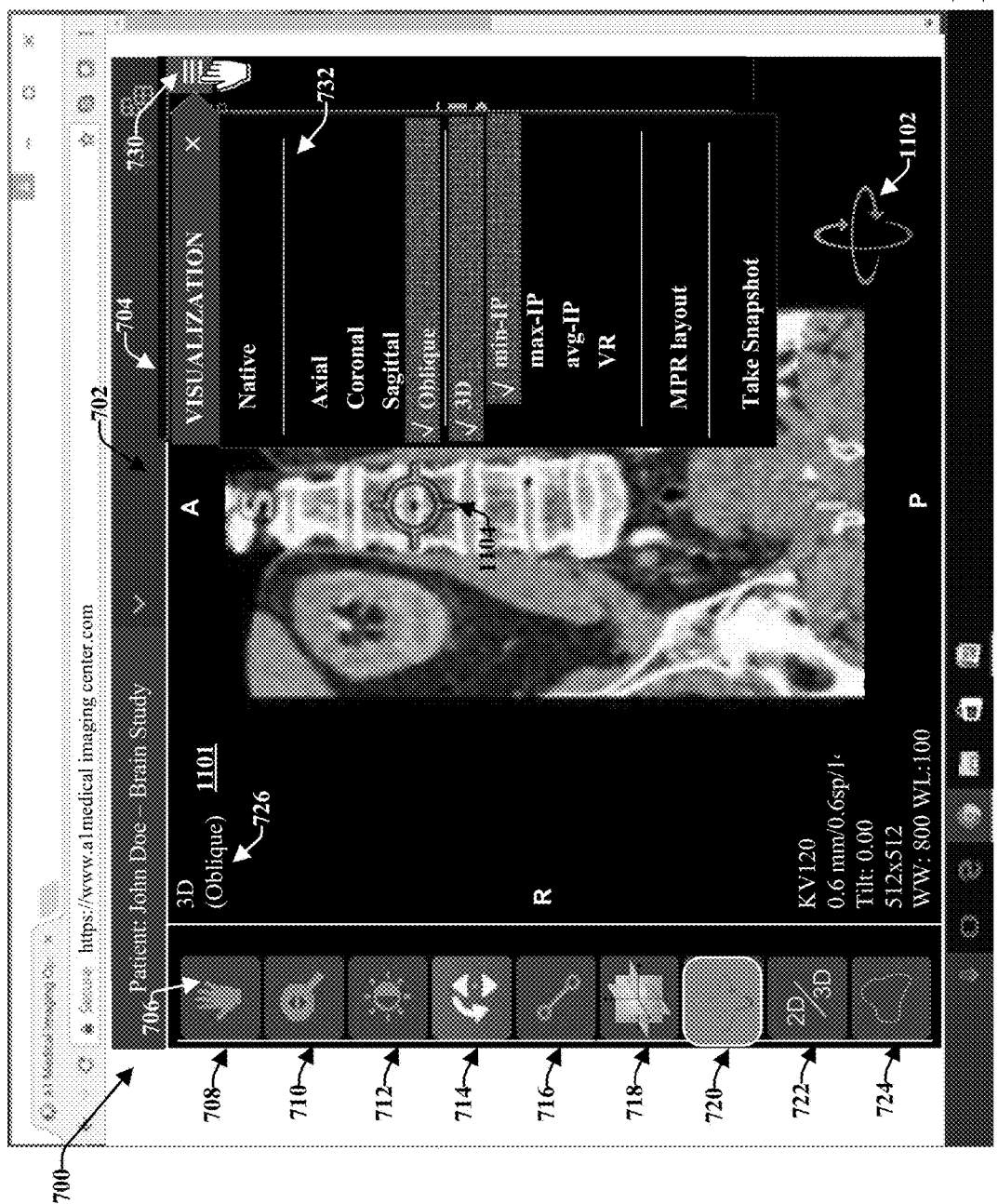
Figure 11C:
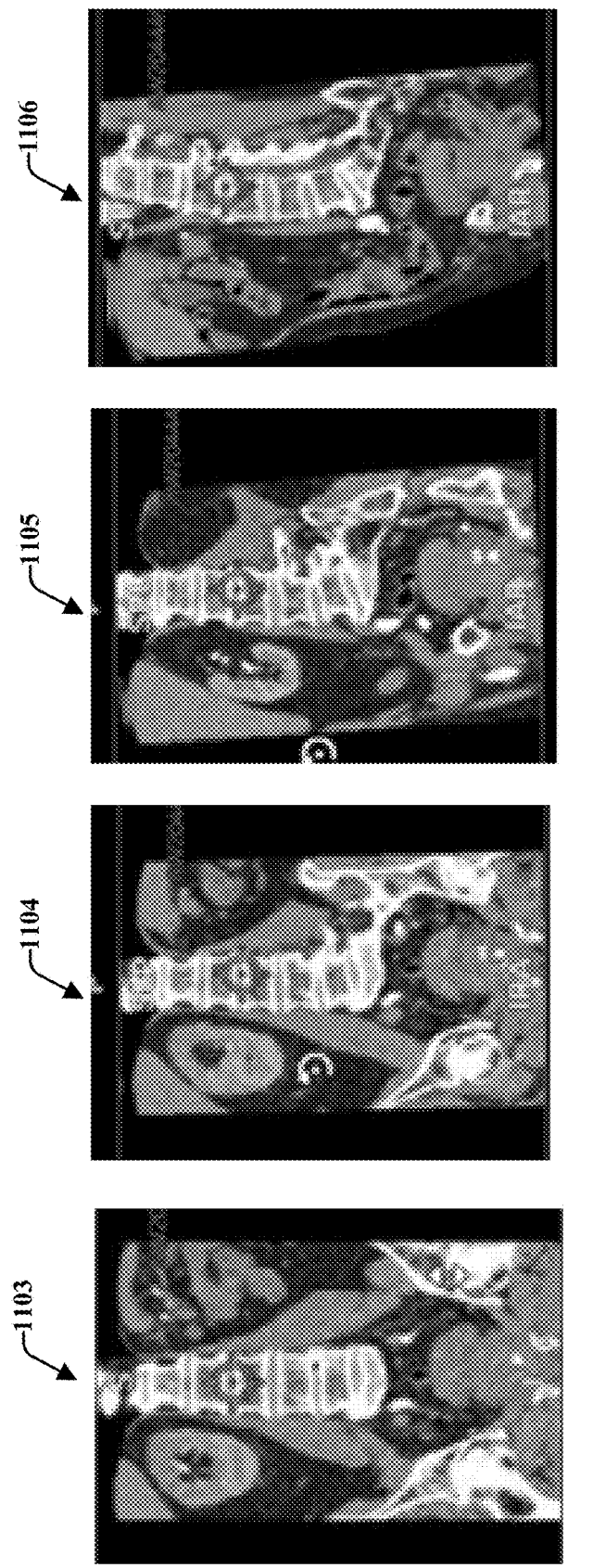

FIGS. 11A-11C provide another sequence of visualizations that can be rendered in GUI 700 that further demonstrate the features and functionalities of the rotation component 612 in accordance with various aspects and embodiments described herein. FIG. 11A depicts another viewport 1001 provided in the GUI with an 3D visualization of a patient John Doe's spine in association with selection of an imaging study for patient John Doe performed on his spine. The 3D reconstructed visualization is shown from a coronal orientation, as indicated by overlay text 726. FIGS. 11B-11C demonstrate how the visualization 3D coronal visualization in viewport 1101 can change in response to usage of the rotation control function provided by the rotation component 612. Repetitive description of like elements employed in respective embodiments is omitted for sake of brevity.

In one implementation, the rotation control function provided by the rotation control component 612 can be applied in association with a rendered 3D visualization in response to selection of the oblique menu option from the viewport menu 732. For example, as shown in FIG. 11B, the oblique menu option and the 3D menu option are selected. As a result, the visualization provided in the primary display 704 area of the GUI 700 is a 3D visualization from an oblique orientation (e.g., as indicated by overlay text 726). The 3D visualization is also rendered with a min-IP based on selection of the min-IP option from the viewport menu 732. In another implementation, the rotation control function provided by the rotation control component 612 can be applied in association with selection of the rotation control icon 720.

In either of these implementations, in association with display of a 3D visualization and in response to selection of the oblique menu option from the viewport menu 732 or in response to selection of the rotation control icon 720, the orientation of the 3D visualization displayed in the primary display area 704 can be considered an oblique orientation. For example, in the embodiment shown, the orientation of the visualization displayed in FIG. 11B is oblique (as indicted by the updated overly text 726), yet the actual visualization in FIG. 11B is no different from that shown in FIG. 11A (which was considered to have a coronal orientation). However, in various embodiments, once a visualization is rendered with an oblique orientation, the rotation control component 612 can remain activated and allow the user to rotate or change the orientation of the visualization to any user defined orientation (e.g., including canonical orientations and non-canonical orientations). Thus in association with selection of the oblique menu option from the viewport menu 732 or the rotation control icon 720, the visualization application can operate in an oblique viewing mode wherein the user is provided with one or more controls to change the orientation of the displayed 3D visualization.

For example, in one implementation, as shown in FIG. 11B, when in oblique operation mode, the interface component 104 can provide a rotation control 1102 in the viewport 1101. In an aspect, pressing on, selecting, or otherwise interacting with the rotation control 1102 can cause the displayed 3D visualization to rotate in the desired direction about the defined rotation point 1104 relative to the 3D visualization. In addition, in some embodiments, the rotation component 612 can allow the user to move the rotation point 1104 to any desired location on or within the 3D visualization. The rotation component 612 can also allow the user to define the orientation of the rotation axis (not shown). For example, in the embodiment shown, the rotation point 1104 is placed at a default location in the center of the volume of the 3D visualization and the rotation axis is set to a default vertical direction (e.g., a y-axis) through the rotation point 1104. However, in various implementations the rotation axis and the rotation point 1104 can be selected and moved.

FIG. 11C provides a sequence of images demonstrating how the visualization in viewport 1101 of FIG. 11B can change in response to receiving user input requesting rotation of the visualization. In particular, image 1103 depicts the visualization as shown in FIG. 11B without any applied rotational input. Images 1104, 1105 and 1106 respectively provide sequential embodiments of reconstructed versions of visualization 1103 in association with rotation of the visualization clockwise about the vertical rotation axis. For example, image 1104 depicts about a 45° rotation, image 1105 depicts about a 65° rotation and image 1106 depicts about a 90°. The orientations of the visualizations in each of the visualizations 1104, 1105 and 1106 is considered oblique because the orientation was user defined in association with operation in oblique mode. For example, the orientations of resulting 3D visualizations included in images 1104, 1105 and 1106 are non-canonical.

With reference again to FIG. 6, in various embodiments, the annotation component 614 can provide for adding annotations to native and reconstructed medical images that are rendered in the GUIs disclosed herein. The annotations can include but are not limited to, text, symbols, lines, shapes, images, hyperlinks and the like. In one or more implementations, the control icon 716 of GUI 700 particularly provides an annotation tool for adding measurement lines or marks to the native and reconstructed medical images included in the primary display area 704. For example, selection of the control icon 716 can generate an annotation tool that allows the user to draw on the display native or reconstructed medical image to mark up the image with measurement lines.

In various implementations, based on application of an annotation to a location on a native 2D medical image of a body part, the annotation component 610 can be configured to integrate the annotation on 3D medical images of the body part that provide a perspective of the location. Likewise, based on application of an annotation to a location on a 3D medical image of a body part, the annotation component 614 can be configured to integrate the annotation on 2D native medical images of the body part that provide a perspective of the location. For example, the annotations applied to native and reconstructed medical images can be associated with a particular spatial location in the respective images, such a particular visual or anatomical feature in the respective images. For example, a measurement annotation can depict a measurement line drawn between a first anatomical feature and a second anatomical feature shown in a displayed native or reconstructed medical image. In one or more embodiments, whether an annotation is applied to a native 2D image or a reconstructed 2D image, the annotation component 610 can determine the relative 2D and/or 3D spatial location of the annotation relative to the body part represented by the image.

For example, in association with application of a distance measurement line between a first anatomical feature and a second anatomical feature on a native 2D image of a body part, the annotation component 614 can determine the relative 3D spatial location of the measurement line with respect to the first anatomical feature and the second anatomical feature. The annotation component 614 can further generate and store information (e.g., in cache 124 or other accessible memory), identifying the annotation and its 2D/3D spatial location relative to the body part. Accordingly, when a 3D image of the body part is generated that includes a visible view of the spatial location of the body part, the annotation component 610 can automatically apply the annotation to the 3D image. Further the appearance of the annotation can reflect the perspective of the 3D image. For example, the angle and length of a measurement line between two anatomical features can adapt to reflect the relative positions of the two anatomical features as included in a 3D image based on the orientation of the 3D image.

Likewise, in association with application of a distance measurement line between a first anatomical feature and a second anatomical feature on a 3D image of a body part, the annotation component 614 can determine the relative 3D spatial location of the measurement line with respect to the first anatomical feature and the second anatomical feature. The annotation component 614 can further generate and store information (e.g., in the cache 124 or other accessible memory), identifying the annotation and its 2D/3D spatial location relative to the body part. Accordingly, when a 2D native image of the body part is generated that includes a visible view of the spatial location of the body part, the annotation component 402 can automatically apply the annotation to the 2D image. Further the appearance of the annotation can reflect the perspective of the 2D image. For example, the angle and length of a measurement line between two anatomical features can adapt to reflect the relative positions of the two anatomical features as included in the 2D image based on the orientation of the 2D image.

Figure 12:
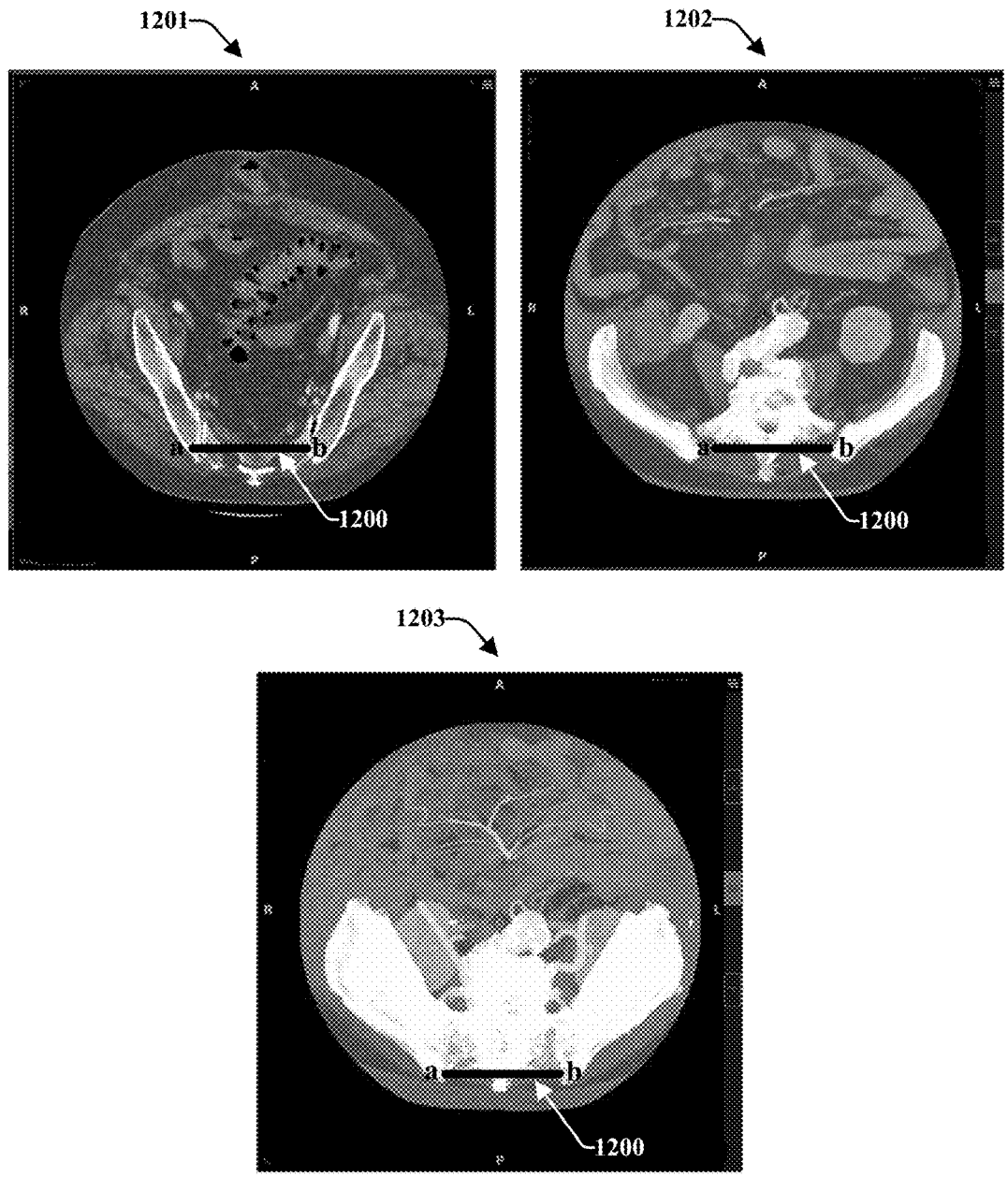
FIG. 12 presents native and reconstructed medical images including the same annotation in accordance with various aspects and embodiments described herein.

FIG. 12 presents native and reconstructed medical images including the same annotation in accordance with various aspects and embodiments described herein. Visualization 1201 presents a native 2D image of a cross-sectional area of a patient's brain. Visualization 1202 presents a 3D image of a first volume of the patient's brain near or around the crosss-ectional area shown in visualization 1201, and visualization 1203 presents another 3D image of a second, larger volume of the patient's brain near or around the cross-sectional area shown in visualization 1201. Each of the visualizations 1201 include a measurement line 1200 drawn between anatomical features a and b. In accordance with one or more embodiments, the measurement line 1200 was initially applied to only one of the visualizations 1201, 1202 or 1203. However, based on application of the measurement line 1200 to only one of the visualizations, the measurement line was displayed on the other visualizations because the other visualizations also include a perspective of features a and b. For example, in one implementation, the measurement line was applied to visualization 1201 by a user using the control icon 716 when visualization 1201 was displayed in the graphical user interface. Subsequently, when visualizations 1202 and 1203 are selected or generated and rendered, the annotation component 402 can also apply the measurement line 1200 to these visualizations because they include a view of anatomical features a and b.

With reference again to FIG. 6, in one or more embodiments, the plane selection component 616 can provide for selecting a plane of a 3D image of a body part for rendering in 2D. For example, the plane selection component 616 can function as a knife tool that allows a user to essentially slice a 3D model in half and view the cross-sectional area defined by the surface of either sliced half as a native medical image. In some implementations, the plane selection component 616 can allow the user to select any plane of the 3D image of the body part. For instance, with these implementations, the plane selection component 616 can allow the user to slice the 3D model at any point along any axis. In other implementations, the plane selection component 616 can restrict the selectable planes based on the orientations of the available native images captured of the body part. For example, with these implementations, if the set of native images captured of the body part are only captured from the axial orientation, then the plane selection component 616 can only allow the user to select an axial plane of the 3D image.

In various implementations, based on user input selecting a plane of a 3D model, using the data model 120, the selection component 110 can be configured to determine the particular position (e.g., in 3D) and orientation of the selected plane relative to the body part. In some implementations, the selection component 110 can further be configured to select a native medical image from the available native images in the data set captured of the body part that has the closest capture position and orientation to the selected plane (e.g., if such a corresponding native medical image is available). The selected native medical image can then be rendered in the primary display area of the graphical user interface, thereby causing a transition from viewing the 3D model of the body part to viewing a native 2D image of the body part corresponding to the selected plane). In other implementations or in implementations in which a native medical image corresponding to the selected plane is not available, the 3D rendering component can be configured to generate a 2D reconstructed image (or a 3D reconstructed image with a min-IP) that corresponds to the cross-sectional area of the body part along the selected plane.

Figure 13:
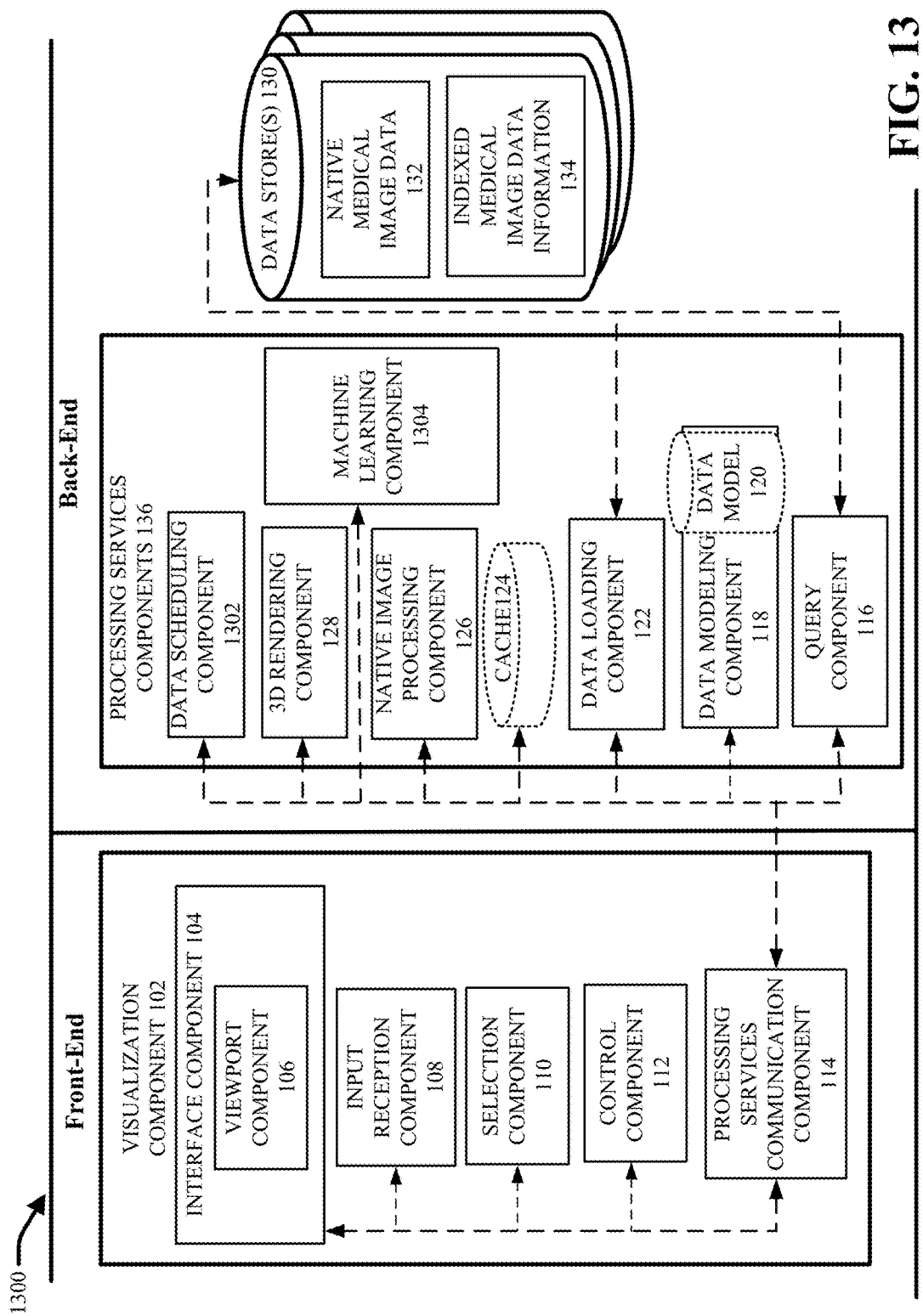
FIG. 13 illustrates another example native/reconstructed medical imaging system facilitates transitioning between viewing native and reconstructed medical images in accordance with various aspects and embodiments described herein.

FIG. 13 illustrates another example native/reconstructed medical imaging system 1300 facilitates transitioning between viewing native and reconstructed medical images in accordance with various aspects and embodiments described herein. System 1300 includes same or similar features and functionalities as system 100 with the addition of data scheduling component 1302 and machine learning component 1304 to the back-end processing services components 136. Repetitive description of like elements employed in respective embodiments is omitted for sake of brevity.

In various embodiments, the data loading 136 can be configured to retrieve and load (e.g., in cache 134) relevant native medical images or DICOM instances from one or more external data stores 130 for processing by the image processing components (e.g., the native image processing component 136 and the 3D rendering component 138) in association with rendering the native images and reconstructed versions of the native images by the visualization component 102. In one or more implementations the data scheduling component 1302 can be configured to determine and control the order in which the native medical image data or DICOM instances are retrieved to minimize latency in association with rendering relevant native medical images and generating and rendering 3D reconstructions associated with the native medical images. In this regard, the data scheduling component 1302 can aim to retrieve and make available the native medical images in an order in which they will be displayed or likely displayed, wherein native medical images that will be displayed first are retrieved first. For example, based on a selected medical imaging study for viewing, the data scheduling component 1302 can direct the data loading component 132 to first load the native medical images for the study that will be initially displayed in one or more viewports. The data scheduling component 1302 can further determine an order in which additional native images in the study will likely be viewed over the course of the viewing session and then direct the data loading component 132 to retrieve the native medical images in that order.

Likewise, the data scheduling component 1302 can aim to retrieve and make available subsets of 3D compatible images that will be used to generated 3D representations in an order in which the 3D representations will likely be rendered, wherein subsets of 3D images associated with 3D representations that will be rendered first will be retrieved first. In addition, the rather than randomly retrieving native medical images for a selected data set, the data scheduling component 1302 can be configured to retrieve native medical images according to the identified 3D compatible subsets. In this regards, the data scheduling component 1302 can direct the data loading component 132 to load complete loading of a first 3D compatible subset before loading a second 3D compatible subset.

In various embodiments, the data scheduling component 1302 can determine the order for retrieving native medical images based on various contextual factors associated with a selected medical imaging data set. These contextual factors can include but are not limited to: presentation states associated with the selected data set, predefined clinical workflows associated with a selected data set (e.g., either user selected or automatically associated with the selected data set), user interactions with the GUI, user preferences associated with viewing a selected data set, location of the native data images/instances (e.g., short-term vs. long-term archive), and the like.

For example, based on the selected data set, the GUI layout may vary, number of groups or sets of related native images included in the data set (e.g., which can respectively correspond to different DICOM series) can vary, and the subsets of 3D compatible native medical images associated with the groups or sets of related medical images can vary. Each of these variances can influence the order in which the native medical images/instances are retrieved from the one or more external data stores 130. In addition, certain types of data sets and associated DICOM series can be associated with defined or predictable workflows in which users generally or preferably transition from one native medical image and/or reconstructed image to the next. According to this example, the data scheduling component 1302 can retrieve native medical images for rendering and/or for generating 3D reconstructions from based on a defined or predicted workflow associated with the selected data set.

The data scheduling component 1302 can also determine an order for retrieving native medical images based on user interaction with the GUI in association with the current viewing session. For example, in an implementation in which a selected data set is associated with a plurality of DICOM series, the initial rendering of the GUI can associated each series with a different viewport. The user may then select a particular viewport to view in an enlarged view or otherwise view first. According to this example, based on user input selecting a particular viewport, the data scheduling component 1302 can direct the data loading component 132 to first retrieve and load DICOM instances associated with the series represented by the selected viewport. In addition, while viewing native and/or reconstructed images for a particular selected series in a displayed viewport, based on user input that prompts or selects a particular native medical image or reconstructed medical images, the data scheduling component 1302 can determine the native and/or reconstructed medical images that will likely be viewed next and thus load the relevant native image data accordingly.

The order in which a user views native and reconstructed images associated with a selected data set can also vary based on the role of the user (e.g., doctor vs. patient), the medical ailment affecting the patient, the body part evaluated, and the like. For example, depending on the role of the user, the medical aliment affecting the patient and the body part evaluated, the presentation flow/order in which the user generally or preferably views different native and reconstructed images of the body part can vary. For example, a particular physician may prefer to view native and/or reconstructed image data in a particular order when evaluating a brain study.

In some embodiments, the machine learning component 1304 can employ one or more machine learning techniques to facilitate learning presentation flows and user preferences for different types of data sets selected for viewing. For example, for respective data set types and/or users, the machine learning component 1304 can monitor or record information for many viewing sessions over time regarding the particular native and reconstructed images that are viewed and the order in which they are viewed. The machine learning component 1304 can further develop over time, defined presentation flows for the respective clinical case types and/or users using one or more machine learning techniques. The data scheduling component 1302 can further direct the data loading 136 to load relevant native medical images/DICOM instances based on the learned presentation flow associated with the selected image data set and/or learned preferences of the viewing user.

In order to provide for or aid in the numerous inferences described herein, the machine learning component 1304 can examine the entirety or a subset of the data to which it is granted access and can provide for reasoning about or infer states of the system (e.g., system 100 and the like), environment, etc. from a set of observations as captured via events and/or data. An inference can be employed to identify a specific context or action, or can generate a probability distribution over states, for example. The inference can be probabilistic (e.g., the computation of a probability distribution over states of interest can be based on a consideration of data and events). An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x4, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 14:
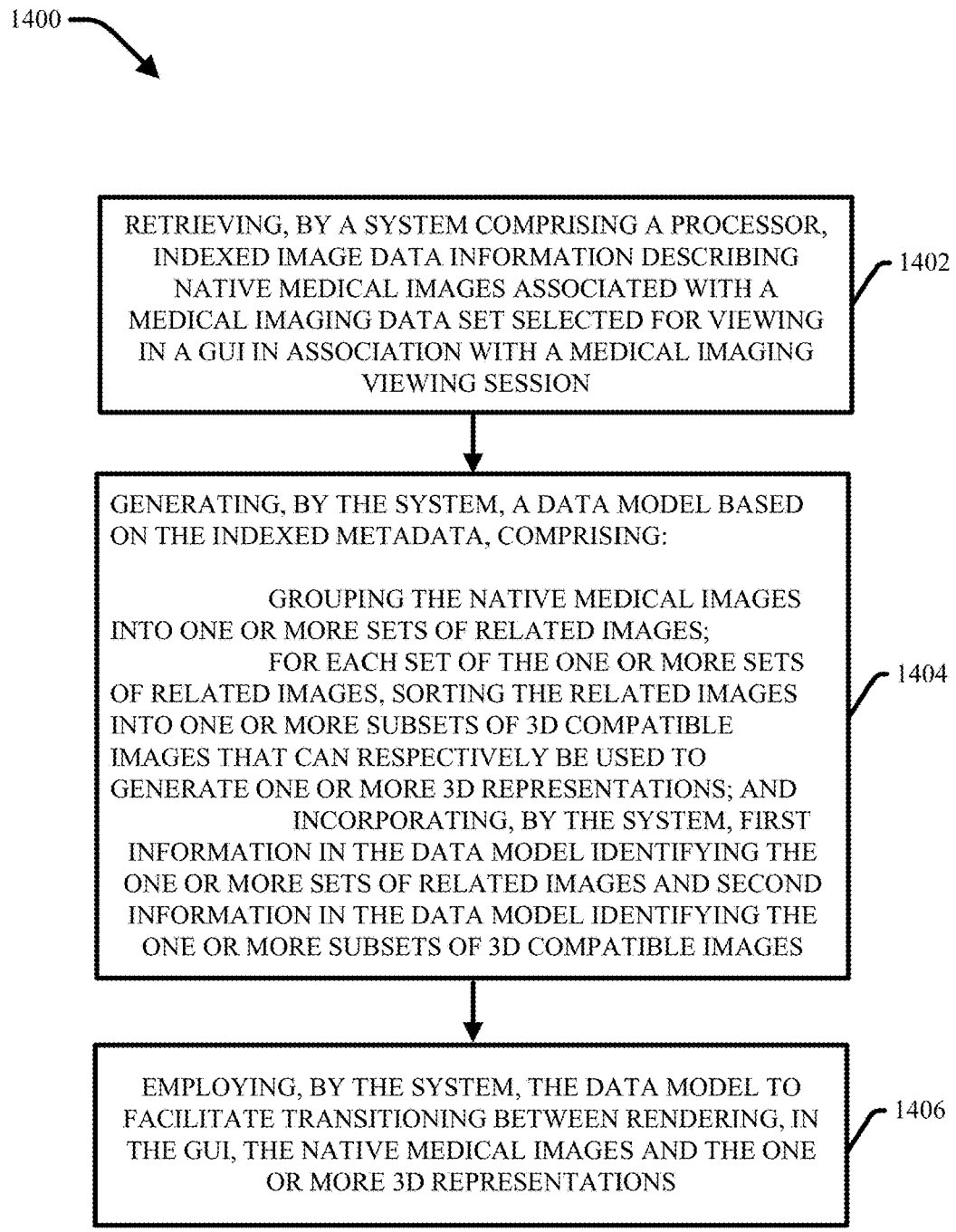
FIG. 14 illustrates a flow diagram of an example method that facilitates transitioning between viewing native and reconstructed medical images in accordance with various aspects and embodiments described herein.
Figure 15:
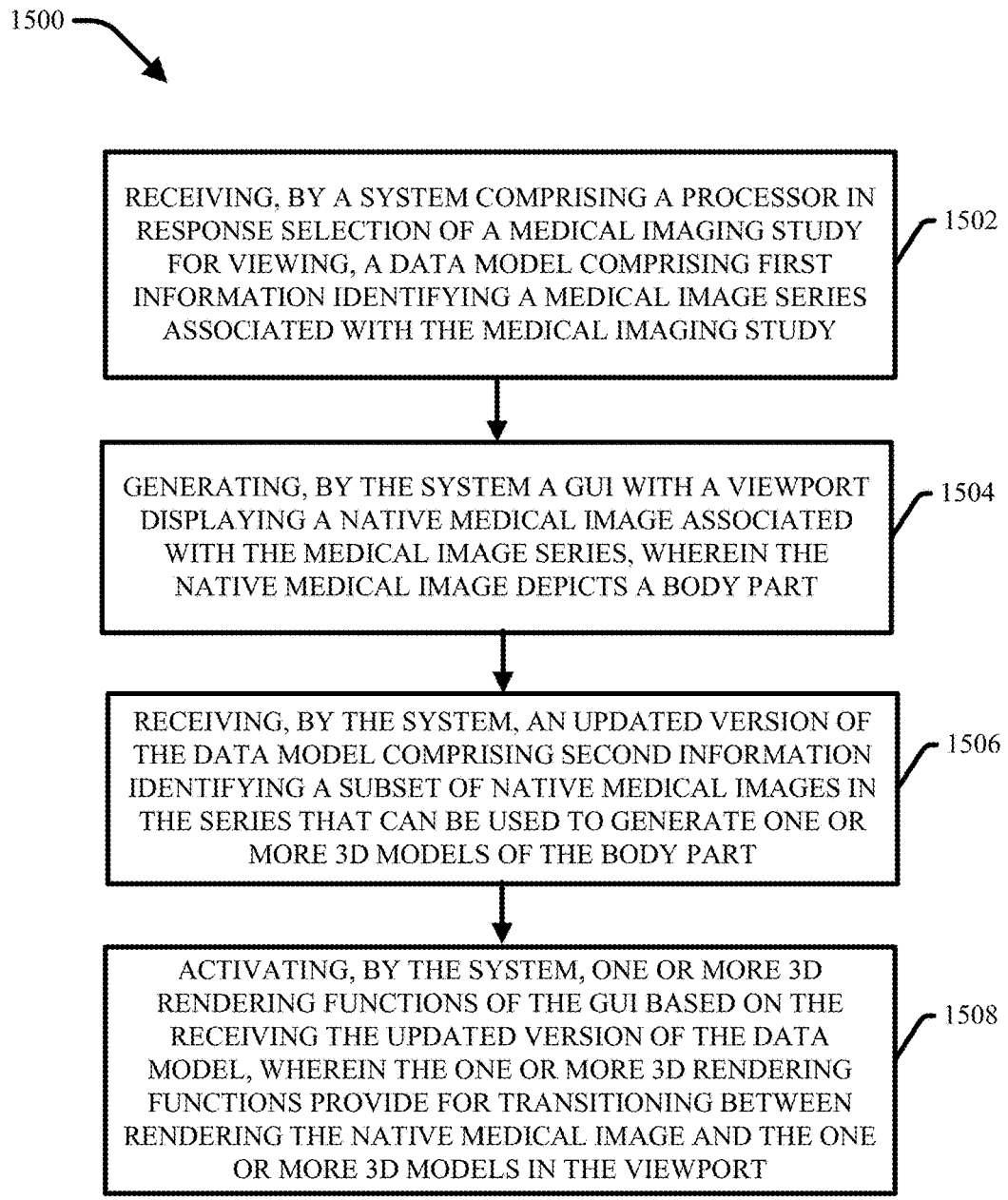
FIG. 15 illustrates a flow diagram of another example method that facilitates transitioning between viewing native and reconstructed medical images in accordance with various aspects and embodiments described herein.
Figure 16:
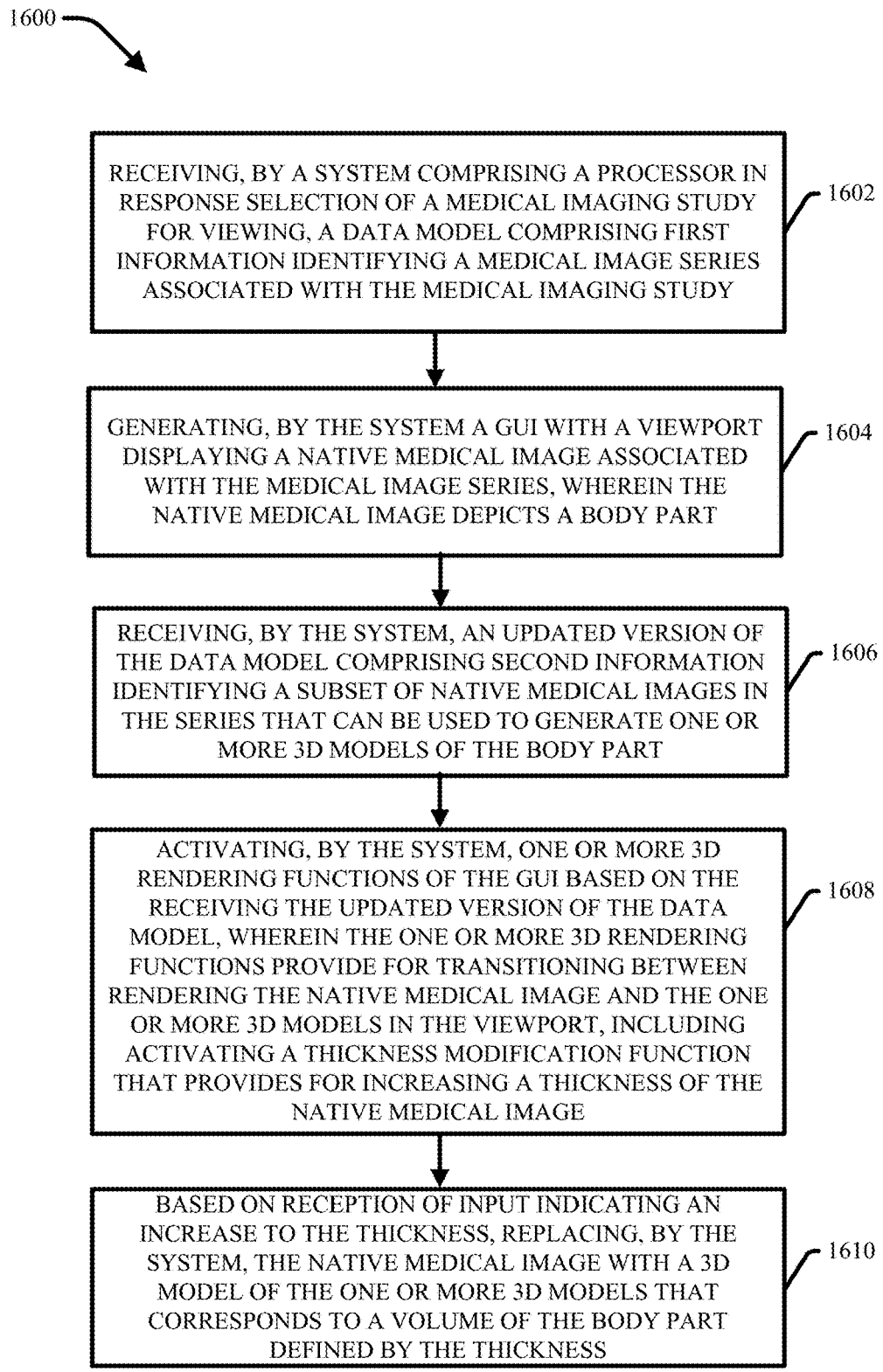
FIG. 16 illustrates a flow diagram of another example method that facilitates transitioning between viewing native and reconstructed medical images in accordance with various aspects and embodiments described herein.

In view of the example systems, apparatus, and computer readable storage mediums described herein, example methods that can be implemented in accordance with the disclosed subject matter can be further appreciated with reference to the flowcharts in FIGS. 14-16. Repetitive description of like elements employed in respective embodiments is omitted for sake of brevity. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 14 illustrates a flow diagram of an example method 1400 that facilitates transitioning between viewing native and reconstructed medical images in accordance with various aspects and embodiments described herein. Repetitive description of like elements employed in respective embodiments is omitted for sake of brevity.

At 1402, a system comprising a processor (e.g., system 100 or 1400), retrieves (e.g., via query component 116) indexed image data information (e.g., from indexed medical image data information 144) describing native medical images associated with a medical imaging data set selected for viewing in a GUI (e.g., GUI 700) in association with a medical imaging viewing session. At 1404, the system generates a data model based on the indexed metadata (e.g., via data modeling component 118). This modeling operation can include grouping the native medical images into one or more sets of related images, and for each set of the one or more sets of related images, sorting the related images into one or more subsets of 3D compatible images that can respectively be used to generate one or more 3D representations. The data model is then generated by incorporating first information in the data model identifying the one or more sets of related images and second information in the data model identifying the one or more subsets of 3D compatible images. Then at 1406, the system can employ the data model to facilitate transitioning between rendering, in the GUI, the native medical images and the one or more 3D representations (e.g., via visualization component 102).

FIG. 15 illustrates a flow diagram of another example method 1500 that facilitates transitioning between viewing native and reconstructed medical images in accordance with various aspects and embodiments described herein. Repetitive description of like elements employed in respective embodiments is omitted for sake of brevity.

At 1502, a system comprising a processor (e.g., system 100 or 1300), receives (e.g., via processing services communication component 115), in response selection of a medical imaging study for viewing, a data model (e.g., data model 120) comprising first information identifying a medical image series associated with the medical imaging study. For example, the medical image series can include the only series in the selected data set or one of a plurality of different series included in the selected data set. At 1504, the system generates a GUI with a viewport displaying a native medical image associated with the medical image series, wherein the native medical image depicts a body part. For example, initially displayed native medical image can include the first image in the series, the middle image in the series, a default initial image for the series, a user selected image, or the like. At 1506, the system can receive an updated version of the data model comprising second information identifying a subset of native medical images in the series that can be used to generate one or more 3D models of the body part. In addition, the updated version of the data model can include geometric information for the subset regarding a volume defined by respective pixels in the subset when the 3D compatible images are aligned and separated equal distances along the acquisition axis. This geometric information can be used by the 3D rendering component 128 to generate the one or more 3D models using the corresponding pixel data. At 1508, the system can then activate (e.g., via viewport component 106) one or more 3D rendering functions of the GUI (e.g., provided by the control component 112) based on the receiving the updated version of the data model, wherein the one or more 3D rendering functions provide for transitioning between rendering the native medical image and the one or more 3D models in the viewport.

FIG. 16 illustrates a flow diagram of another example method 1600 that facilitates transitioning between viewing native and reconstructed medical images in accordance with various aspects and embodiments described herein. Repetitive description of like elements employed in respective embodiments is omitted for sake of brevity.

At 1602, a system comprising a processor (e.g., system 100 or 1300), receives (e.g., via processing services communication component 114), in response selection of a medical imaging study for viewing, a data model (e.g., data model 120) comprising first information identifying a medical image series associated with the medical imaging study. For example, the medical image series can include the only series in the selected data set or one of a plurality of different series included in the selected data set. At 1604, the system generates a GUI with a viewport displaying a native medical image associated with the medical image series, wherein the native medical image depicts a body part. For example, initially displayed native medical image can include the first image in the series, the middle image in the series, a default initial image for the series, a user selected image, or the like. At 1606, the system can receive an updated version of the data model comprising second information identifying a subset of native medical images in the series that can be used to generate one or more 3D models of the body part. In addition, the updated version of the data model can include geometric information for the subset regarding a volume defined by respective pixels in the subset when the 3D compatible images are aligned and separated equal distances along the acquisition axis. This geometric information can be used by the 3D rendering component 128 to generate the one or more 3D models using the corresponding pixel data.

At 1608, the system can then activate (e.g., via viewport component 106) one or more 3D rendering functions of the GUI (e.g., provided by the control component 112) based on the receiving the updated version of the data model, wherein the one or more 3D rendering functions provide for transitioning between rendering the native medical image and the one or more 3D models in the viewport. For example, the one or more 3D rendering functions can include a thickness modification function (e.g., provided by thickness modification component 602) that provides for increasing a thickness of the native medical image. At 1610, based on reception of input indicating an increase to the thickness, the system can replace the native medical image with a 3D model of the one or more 3D models that corresponds to a volume of the body part defined by the thickness.

The various systems, methods, and computer readable media provide a native/reconstructed medical imaging application that includes a single viewer with native and reconstructed views that are hosted in the same viewport as a single mode. All viewports displayed on the screen are virtually 3D viewports if the native 2D images displayed in a viewport can be computed as a volume. The subject 2D/3D medical imaging viewing application can also display any type of images, regardless of their modality or technique as long as the image format relies on DICOM standards. Further, synchronization between 2D and 3D views does not require complex code development and maintenance. The 2D image views can include true native images and not images recomputed from a volume, which guarantee to view full fidelity images coming directly from imaging acquisition systems. Further, the workflows provide to transition from 2D views to 3D views is intuitive and seamless, driven by clinical end-user interaction happening in the viewport itself.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

Figure 17:
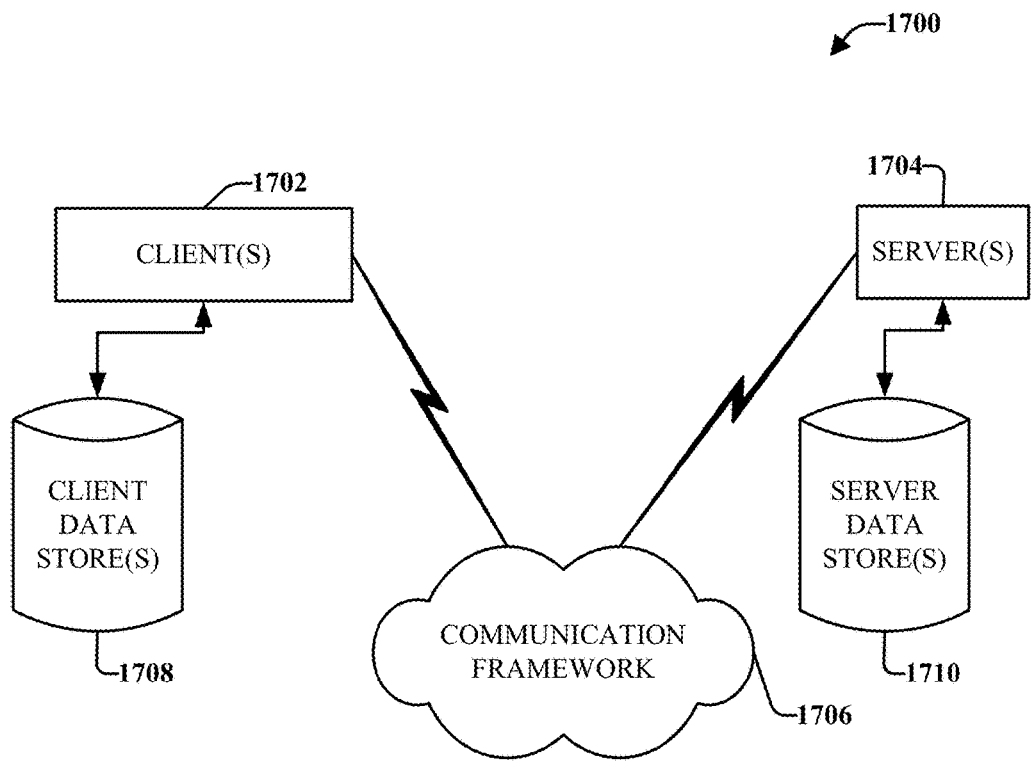
FIG. 17 is a schematic block diagram of a sample-computing environment in accordance with various aspects and embodiments.

Referring to FIG. 17, there is illustrated a schematic block diagram of a computing environment 1700 in accordance with this disclosure in which the subject systems (e.g., systems 100, 1200 and the like), methods and computer readable media can be deployed. The computing environment 1700 includes one or more client(s) 1702 (e.g., laptops, smart phones, PDAs, media players, computers, portable electronic devices, tablets, and the like). The client(s) 1702 can be hardware and/or software (e.g., threads, processes, computing devices). The computing environment 1700 also includes one or more server(s) 1704. The server(s) 1704 can also be hardware or hardware in combination with software (e.g., threads, processes, computing devices). The servers 1704 can house threads to perform transformations by employing aspects of this disclosure, for example. In various embodiments, one or more of the subject front end-components (e.g., visualization component 102 and associated components) can be deployed as hardware and/or software at a client 1702 and one or more of the subject back-end components (e.g., processing services components 136) can be deployed as hardware and/or software at server 1704. One possible communication between a client 1702 and a server 1704 can be in the form of a data packet transmitted between two or more computer processes wherein the data packet may include video data. The data packet can include a metadata, e.g., associated contextual information, for example. The computing environment 1700 includes a communication framework 1706 (e.g., a global communication network such as the Internet, or mobile network(s)) that can be employed to facilitate communications between the client(s) 1702 and the server(s) 1704.

Communications can be facilitated via a wired (including optical fiber) and/or wireless technology. The client(s) 1702 include or are operatively connected to one or more client data store(s) 1708 that can be employed to store information local to the client(s) 1702 (e.g., associated contextual information). Similarly, the server(s) 1704 are operatively include or are operatively connected to one or more server data store(s) 1710 that can be employed to store information local to the servers 1704 (e.g., native medical image data 132, indexed medical image data information 134, and the like).

In one embodiment, a client 1702 can transfer an encoded file, in accordance with the disclosed subject matter, to server 1704. Server 1704 can store the file, decode the file, or transmit the file to another client 1702. It is to be appreciated, that a client 1702 can also transfer uncompressed file to a server 1704 and server 1704 can compress the file in accordance with the disclosed subject matter. Likewise, server 1704 can encode video information and transmit the information via communication framework 1706 to one or more clients 1702.

Figure 18:
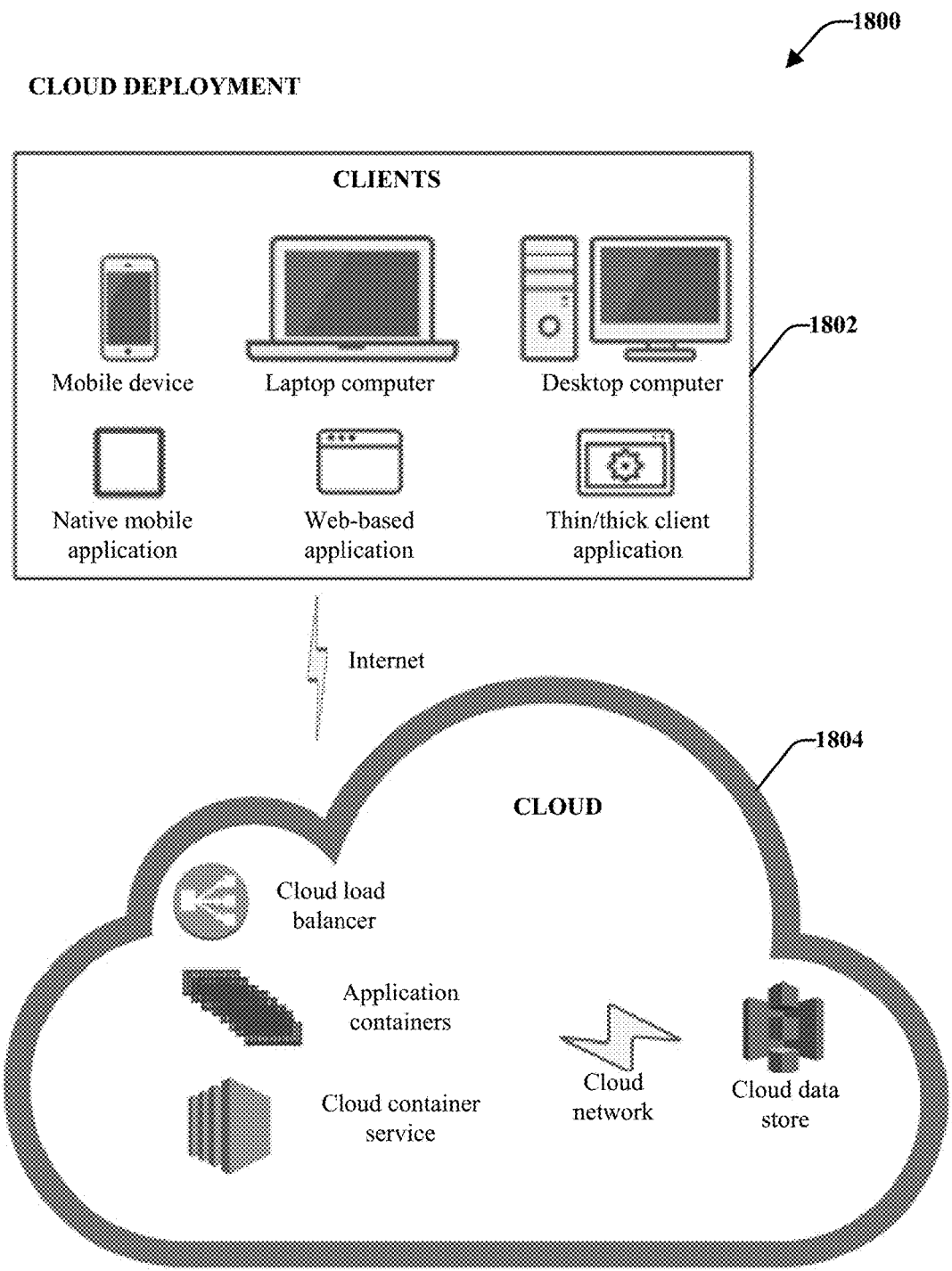
FIG. 18 is a schematic block diagram of another sample-computing environment in accordance with various aspects and embodiments.

FIG. 18 illustrates a schematic block diagram of another example computing environment 1800 in accordance with this disclosure in which the subject systems (e.g., systems 100, 1300 and the like), methods and computer readable media can be deployed. The computing environment 1800 includes a cloud deployment architecture consisting of one or more clients 1802 that can be communicatively coupled to a system cloud 1804 via a network (e.g., the Internet). The system cloud 1804 can include a cloud load balances, one or more application container, one or more cloud service containers, a cloud data store, and a cloud network that communicatively couples the one or more cloud components to the cloud data store. In accordance with the cloud deployment architecture, the clients 1802 can include one or more clients devices (e.g., a mobile device, a laptop computer, a desktop computer, etc.) which can include or employ a suitable application (e.g., a native mobile application, a web-based application, a thin/thick client application, etc.) to access and employ one or more features and functionalities of the subject native/reconstructed medical imaging systems (e.g., system 100, 1300 and the like) deployed in the system cloud 1804. In various implementations, the one or more components of systems 100 and 1300 can be distributed between the clients 1802 and the system cloud 1804.

Figure 19:
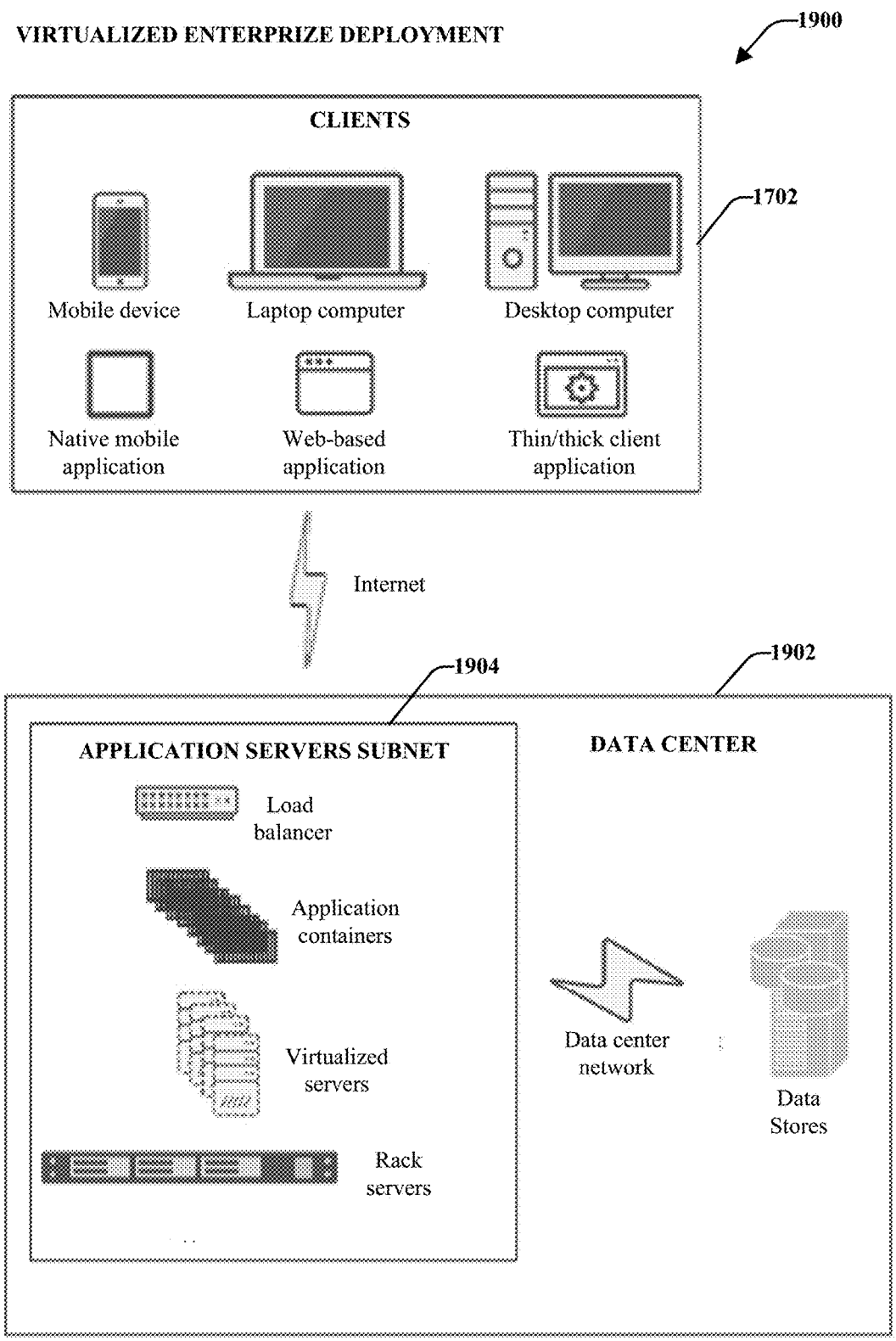
FIG. 19 is a schematic block diagram of another sample-computing environment in accordance with various aspects and embodiments.

FIG. 19 illustrates a schematic block diagram of another example computing environment 1900 in accordance with this disclosure in which the subject systems (e.g., systems 100, 1300 and the like), methods and computer readable media can be deployed. The computing environment 1900 includes a virtualized enterprise deployment consisting of one or more clients 1702 that can be communicatively coupled to a remote data center 1902 via a network (e.g., the Internet). The remote data center 1902 can include an application servers subnet 1904 which can provide a load balancer, one or more application containers, one or more virtualized servers and one or more rack servers. The data center 1902 can also include one or more data stores that can be communicatively coupled to the application servers subnet 1904 via a data center network. In accordance with the virtualized enterprise deployment, the clients 1702 can include one or more clients devices (e.g., a mobile device, a laptop computer, a desktop computer, etc.) which can include or employ a suitable application (e.g., a native mobile application, a web-based application, a thin/thick client application, etc.) to access and employ one or more features and functionalities of the subject native/reconstructed medical imaging systems (e.g., system 100, 1300 and the like) deployed in the data center 1902 and application servers subnet 1904. In various implementations, the one or more components of systems 100 and 1300 can be distributed between the clients 1702 and the application servers subnet 1904 and the one or more data stores 130 can be provided remotely at the data center 1902.

Figure 20:
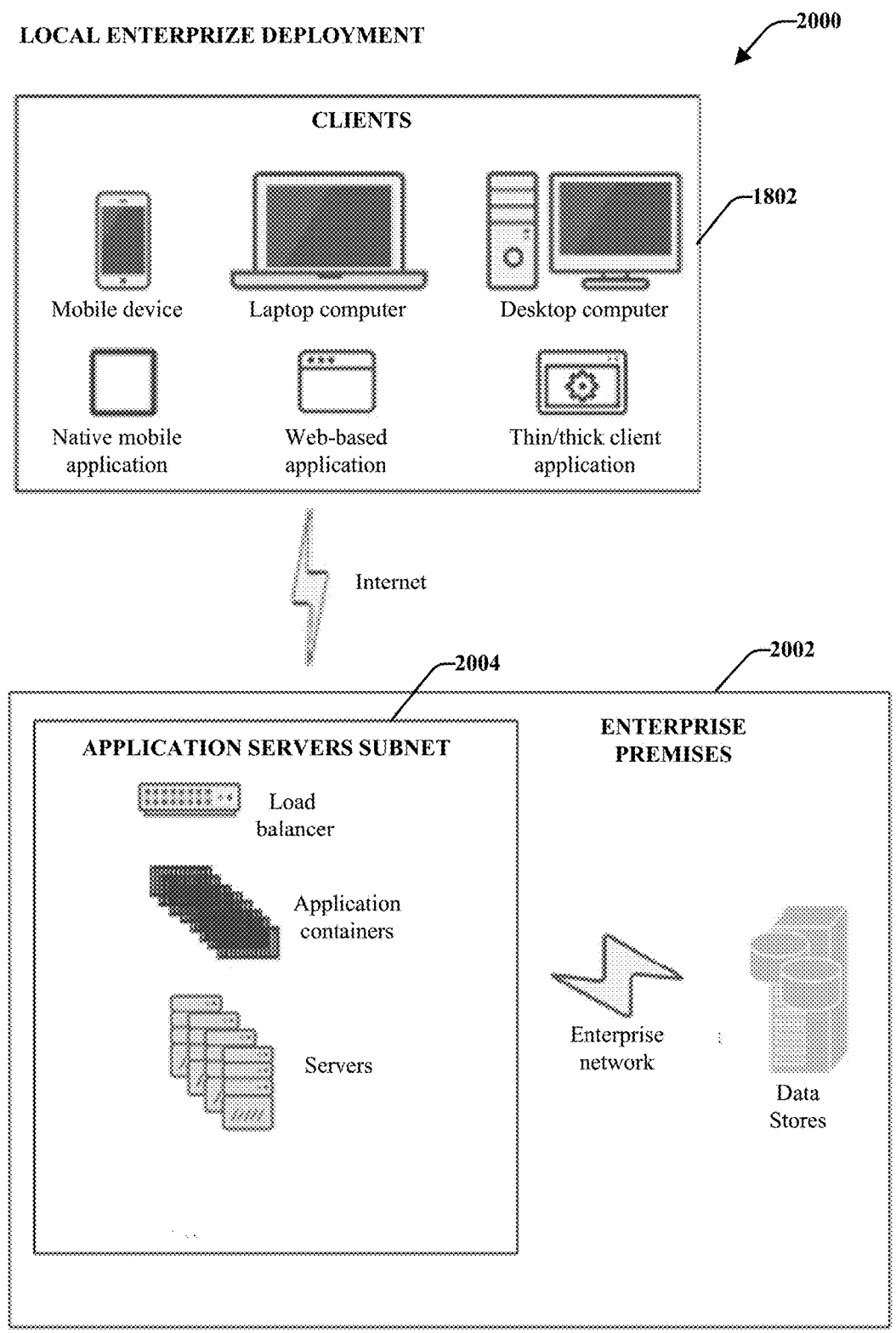
FIG. 20 is a schematic block diagram of another sample-computing environment in accordance with various aspects and embodiments.

FIG. 20 illustrates a schematic block diagram of another example computing environment 2000 in accordance with this disclosure in which the subject systems (e.g., systems 100, 1300 and the like), methods and computer readable media can be deployed. The computing environment 2000 includes a local enterprise deployment consisting of one or more clients 1702 that can be communicatively coupled to an application servers subnet 2004 via a network (e.g., the Internet). In accordance with this embodiment, the application servers subnet 2004 can be provided at the enterprise premises 2002 (e.g., as opposed to a remote data center 1902). The application servers subnet 1904 can include a load balancer, one or more application containers and one or more servers. The application servers subnet 1904 can be communicatively coupled to one or more data stores provided at the enterprise premises 1902 via an enterprise network. Similar to the cloud and virtualized enterprise deployments, the clients 1702 can include one or more clients devices (e.g., a mobile device, a laptop computer, a desktop computer, etc.) which can include or employ a suitable application (e.g., a native mobile application, a web-based application, a thin/thick client application, etc.) to access and employ one or more features and functionalities of the subject native/reconstructed medical imaging systems (e.g., system 100, 1300 and the like) deployed at the enterprise premises 1902 and the application servers subnet 1904. In various implementations, the one or more components of systems 100 and 1200 can be distributed between the clients 1702 and the application servers subnet 2004 and the one or more data stores 130 can be provided at the enterprise premises 2002.

Figure 21:
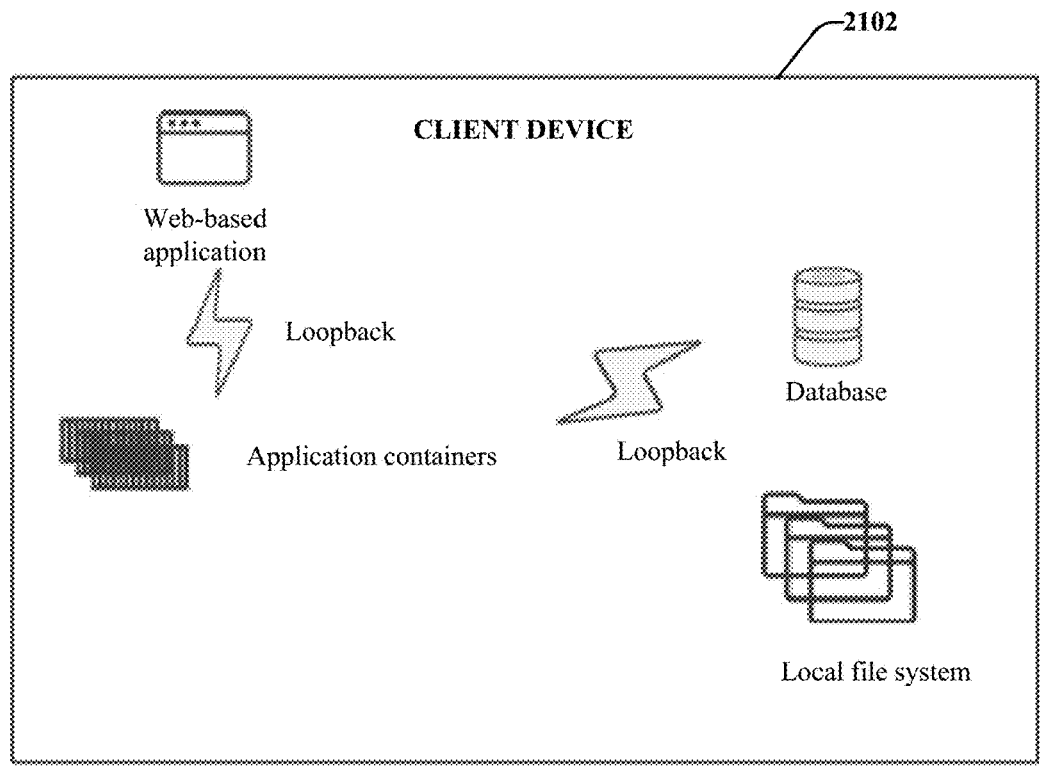
FIG. 21 is a schematic block diagram of another sample-computing environment in accordance with various aspects and embodiments.

FIG. 21 illustrates a schematic block diagram of another example computing environment 2100 in accordance with this disclosure in which the subject systems (e.g., systems 100, 1300 and the like), methods and computer readable media can be deployed. The computing environment 2100 includes a local device deployment in which all of the components of system 100 or 1300 are provided at a single client device 2102. With this implementation, the client device 2002 can include a web-based application which can be communicatively coupled via a loopback to one or more application containers. The one or more application containers can be communicatively coupled via a loopback to one or more databases and/or one or more local file systems.

Figure 22:
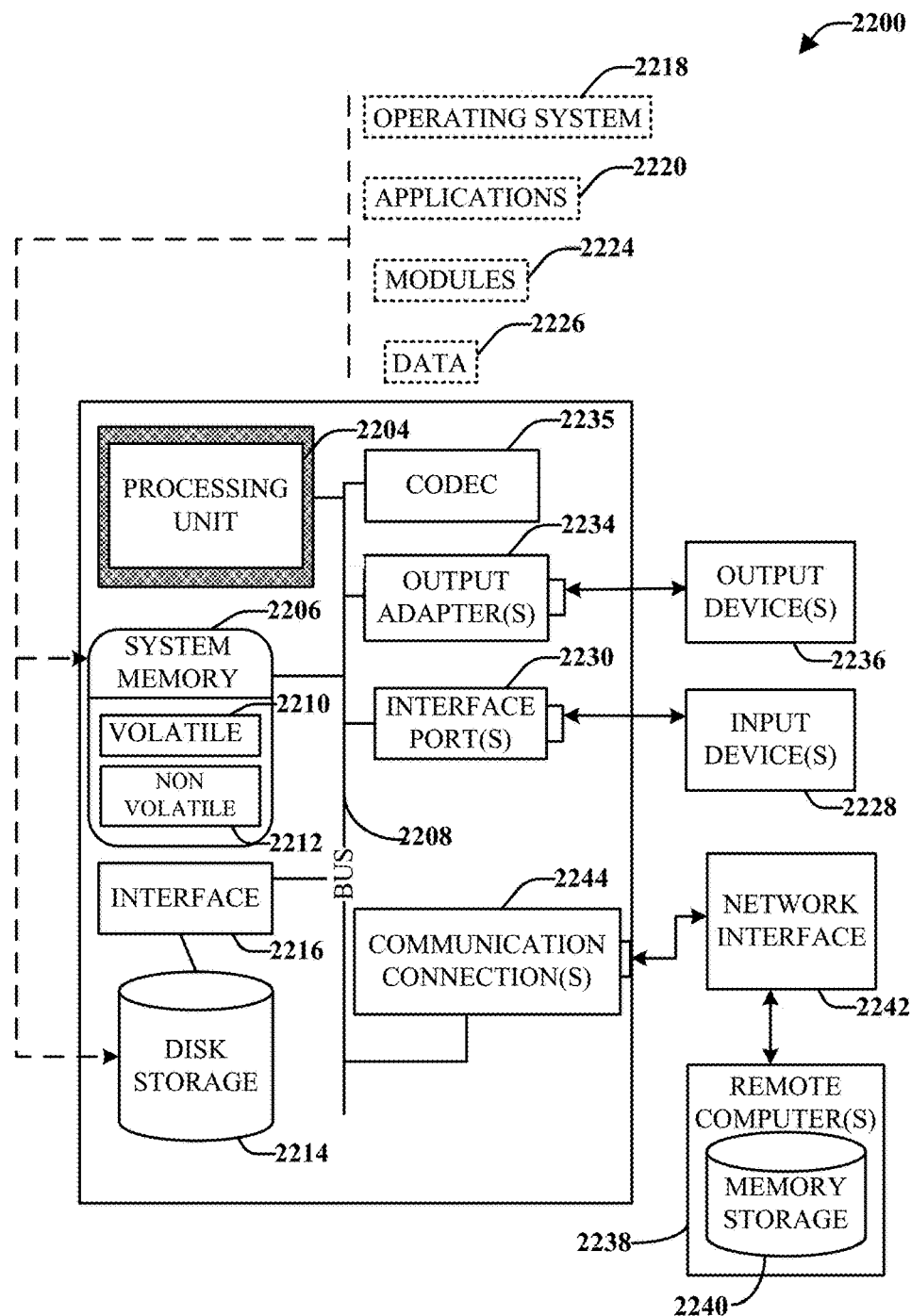
FIG. 22 is a schematic block diagram illustrating a suitable operating environment in accordance with various aspects and embodiments.

With reference to FIG. 22, a suitable environment 2200 for implementing various aspects of the claimed subject matter includes a computer 2202. The computer 2202 includes a processing unit 2204, a system memory 2206, a codec 2205, and a system bus 2208. The system bus 2208 couples system components including, but not limited to, the system memory 2206 to the processing unit 2204. The processing unit 2204 can be any of various available processors. Dual microprocessors and other multiprocessor architectures also can be employed as the processing unit 2204.

The system bus 2208 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 22104), and Small Computer Systems Interface (SCSI).

The system memory 2206 includes volatile memory 2210 and non-volatile memory 2212. The basic input/output system (BIOS), containing the basic routines to transfer information between elements within the computer 2202, such as during start-up, is stored in non-volatile memory 2212. In addition, according to present innovations, codec 2205 may include at least one of an encoder or decoder, wherein the at least one of an encoder or decoder may consist of hardware, a combination of hardware and software, or software. Although, codec 2205 is depicted as a separate component, codec 2205 may be contained within non-volatile memory 2212. By way of illustration, and not limitation, non-volatile memory 2212 can include read only memory (ROM), programmable ROM (PROM), electrically programmable ROM (EPROM), electrically erasable programmable ROM (EEPROM), or flash memory. Volatile memory 2210 includes random access memory (RAM), which acts as external cache memory. According to present aspects, the volatile memory may store the write operation retry logic (not shown in FIG. 22) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 2202 may also include removable/non-removable, volatile/non-volatile computer storage medium. FIG. 22 illustrates, for example, disk storage 2214. Disk storage 2214 includes, but is not limited to, devices like a magnetic disk drive, solid state disk (SSD) floppy disk drive, tape drive, Jaz drive, Zip drive, LS-70 drive, flash memory card, or memory stick. In addition, disk storage 2214 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2214 to the system bus 2208, a removable or non-removable interface is typically used, such as interface 2216.

It is to be appreciated that FIG. 22 describes software that acts as an intermediary between users and the basic computer resources described in the suitable operating environment 2200. Such software includes an operating system 2218. Operating system 2218, which can be stored on disk storage 2214, acts to control and allocate resources of the computer system 2202. Applications 2220 take advantage of the management of resources by operating system 2218 through program modules 2224, and program data 2226, such as the boot/shutdown transaction table and the like, stored either in system memory 2206 or on disk storage 2214. It is to be appreciated that the claimed subject matter can be implemented with various operating systems or combinations of operating systems.

A user enters commands or information into the computer 2202 through input device(s) 2228. Input devices 2228 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2204 through the system bus 2208 via interface port(s) 2230. Interface port(s) 2230 include, for example, a serial port, a parallel port, a game port, and a universal serial bus (USB). Output device(s) 2236 use some of the same type of ports as input device(s). Thus, for example, a USB port may be used to provide input to computer 2202, and to output information from computer 2202 to an output device 2236. Output adapter 2234 is provided to illustrate that there are some output devices 2236 like monitors, speakers, and printers, among other output devices 2236, which require special adapters. The output adapters 2234 include, by way of illustration and not limitation, video and sound cards that provide a means of connection between the output device 2236 and the system bus 2208. It should be noted that other devices and/or systems of devices provide both input and output capabilities such as remote computer(s) 2238.

Computer 2202 can operate in a networked environment using logical connections to one or more remote computers, such as remote computer(s) 2238. The remote computer(s) 2238 can be a personal computer, a server, a router, a network PC, a workstation, a microprocessor based appliance, a peer device, a smart phone, a tablet, or other network node, and typically includes many of the elements described relative to computer 2202. For purposes of brevity, only a memory storage device 2240 is illustrated with remote computer(s) 2238. Remote computer(s) 2238 is logically connected to computer 2202 through a network interface 2242 and then connected via communication connection(s) 2244. Network interface 2242 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2244 refers to the hardware/software employed to connect the network interface 2242 to the bus 2208. While communication connection 2244 is shown for illustrative clarity inside computer 2202, it can also be external to computer 2202. The hardware/software necessary for connection to the network interface 2242 includes, for exemplary purposes only, internal and external technologies such as, modems including regular telephone grade modems, cable modems and DSL modems, ISDN adapters, and wired and wireless Ethernet cards, hubs, and routers.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
    a memory that stores computer executable components;
    a processor that executes computer executable components stored in the memory, wherein the computer executable components comprise:
        a query component configured to retrieve indexed image data information describing native medical images associated with a medical imaging data set selected for viewing in a graphical user interface in association with a medical imaging viewing session;
        a data modeling component configured to process the indexed image data information to:
            group the native medical images into one or more sets of related images;
            for each set of the one or more sets of related images, sort the related images into one or more subsets of three-dimensional compatible images that can respectively be used to generate one or more three-dimensional representations;
            for each subset of three-dimensional compatible images, determine one or more geometric volumes respectively associated with the one or more three-dimensional representations; and
            generate a data model comprising first information identifying the one or more sets of related images, second information identifying the one or more subsets of three-dimensional compatible images, and third information in the data model identifying the more geometric volumes respectively associated with the one or more three-dimensional representations; and
        a visualization component configured to employ the data model to facilitate three-dimensional rendering functions of the graphical user interface, wherein the three-dimensional rendering functions comprise a transition function that provides for transitioning between rendering, in the graphical user interface, the native medical images and the one or more three-dimensional representations, and a thickness modification function that provides for increasing a thickness of a native medical image of the native medical images as rendered in the graphical user interface, and wherein based on reception of an input indicating an increase to the thickness, the visualization component is configured to render a three-dimensional representation of the one or more three-dimensional representations that is associated with the native medical image.

2. The system of claim 1, wherein the visualization component is configured to initially render one or more native medical images of the native medical images in the graphical user interface based on reception of a second input selecting the medical imaging data set.

3. The system of claim 2, wherein in response to the reception of the second input, the visualization component is further configured to initiate one or more back-end processing functions that enable the visualization component to render the one or more three-dimensional representations, and wherein the one or more back-end processing functions are performed concurrently with the initial rendering of the one or more native medical images.

4. The system of claim 3, wherein the one or more back-end processing functions comprise generation of the second information by the data modeling component.

5. The system of claim 4, wherein the one or more back-end processing functions further comprise generation of the third information by the data modeling component.

6. The system of claim 4, wherein the one or more back-end processing functions further comprise retrieving, from one or more external data stores, respective native medical images included in the one or more subsets of three-dimensional compatible images and loading the respective native medical images into a local cache accessible to the visualization component.

7. The system of claim 1, further comprising:
    a data loading component configured to retrieve the native medical images from one or more data stores and load the native medical images in a cache based on reception of an input selecting the medical image data set, and wherein the visualization component is configured to access the native medical images in the cache in association with rendering of the native medical images.

8. The system of claim 7, wherein the data loading component is configured to retrieve the native medical images in an order determined based on the first information and the second information.

9. The system of claim 7, further comprising:
a scheduling component configured to determine an order for the data loading component to retrieve the native medical images based on one or more contextual parameters associated with the medical imaging viewing session.

10. The system of claim 7, further comprising:
a scheduling component configured to determine an order for the data loading component to retrieve the native medical images based on user interaction with the graphical user interface in association with the medical imaging viewing session.

11. The system of claim 7, further comprising:
a three-dimensional rendering component configured to generate the one or more three-dimensional representations based on the second information and using the native medical images in the cache.

12. The system of claim 1, wherein the visualization component is further configured to enable the three-dimensional rendering functions based on addition of the second information or the third information to the data model.

13. The system of claim 1, wherein the visualization component is configured to transition between rendering a first native medical image of the native medical images and a first three-dimensional representation of the one or more three-dimensional representations in response to reception of a user input in association with usage of one or more functions of the three-dimensional rendering functions.

14. The system of claim 1, wherein the three-dimensional rendering functions further provide for interacting with the one or more three-dimensional representations, including at least one of: changing an appearance of an intensity projection characteristic of the one or more three-dimensional representations, changing an orientation of the one or more three-dimensional representations, selecting an area of the one or more three-dimensional representations for viewing, or transitioning between viewing different three-dimensional representations.

15. The system of claim 1, further comprising:
a three-dimensional rendering component configured to generate the three-dimensional representation based on the third information.

16. The system of claim 1, wherein the visualization component is further configured to render the three-dimensional representation with a volume that corresponds to an amount of the increase to the thickness.

17. A method, comprising:
retrieving, by a system comprising a processor, indexed image data information describing native medical images associated with a medical imaging data set selected for viewing in a graphical user interface in association with a medical imaging viewing session;
generating, by the system, a data model based on the indexed image data information, comprising:
grouping the native medical images into one or more sets of related images;
for each set of the one or more sets of related images, sorting the related images into one or more subsets of three-dimensional compatible images that can respectively be used to generate one or more three-dimensional representations;
for each subset of three-dimensional compatible images, determining one or more geometric volumes respectively associated with the one or more three-dimensional representations; and
incorporating first information in the data model identifying the one or more sets of related images, second information in the data model identifying the one or more subsets of three-dimensional compatible images, and third information in the data model identifying the one or more geometric volumes respectively associated with the one or more three-dimensional representations;
employing, by the system, the data model to facilitate three-dimensional rendering functions of the graphical user interface, wherein the three-dimensional rendering functions comprise a transition function that provides for transitioning between rendering, in the graphical user interface, the native medical images and the one or more three-dimensional representations, and a thickness modification function that provides for increasing a thickness of a native medical image of the native medical images as rendered in the graphical user interface; and
based on reception of an input indicating an increase to the thickness, rendering, by the system, a three-dimensional representation of the one or more three-dimensional representations that is associated with the native medical image.

18. The method of claim 17, further comprising:
initially rendering, by the system, one or more native medical images of the native medical images in the graphical user interface based on reception of a second input selecting the medical imaging data set.

19. The method of claim 17, further comprising:
retrieving, by the system, the native medical images from one or more data stores;
loading, by the system, the native medical images in a cache based on reception of input selecting the medical image data set; and
accessing, by the system, the native medical images in the cache in association with rendering of the native medical images.

20. The method of claim 19, further comprising
generating, by the system, the one or more three-dimensional representations based on the second information and using the native medical images in the cache.

21. The method of claim 19, further comprising:
activating, by the system, the three-dimensional rendering functions of the graphical user interface based on incorporation of the second information or the third information into the data model.

* * * * *